US008046427B2

(12) United States Patent
Yanagi et al.

(10) Patent No.: US 8,046,427 B2
(45) Date of Patent: Oct. 25, 2011

(54) NETWORK SYSTEM, DIRECTORY SERVER AND TERMINAL DEVICE

(75) Inventors: Satoru Yanagi, Nagoya (JP); Kazuma Aoki, Kasugai (JP); Makoto Matsuda, Aisai (JP); Masafumi Miyazawa, Nagoya (JP); Kiyotaka Ohara, Nagoya (JP); Masatoshi Kokubo, Ama-gun (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1010 days.

(21) Appl. No.: 11/266,602

(22) Filed: Nov. 4, 2005

(65) Prior Publication Data
US 2006/0117092 A1 Jun. 1, 2006

(30) Foreign Application Priority Data

Nov. 5, 2004 (JP) ................................ 2004-322946

(51) Int. Cl.
*G06F 15/16* (2006.01)
(52) U.S. Cl. ........ 709/217; 709/201; 709/202; 709/203; 709/218; 709/219
(58) Field of Classification Search .......... 709/201–203, 709/217–219; 340/1.1–16.1
See application file for complete search history.

(56) References Cited

U.S. PATENT DOCUMENTS

| | | | |
|---|---|---|---|
| 5,909,602 A | 6/1999 | Nakai et al. | |
| 5,946,457 A | 8/1999 | Nakai et al. | |
| 6,012,068 A * | 1/2000 | Boezeman et al. ................ | 1/1 |
| 6,091,413 A | 7/2000 | Takeuchi et al. | |
| 6,633,413 B1 | 10/2003 | Schlank et al. | |
| 7,386,534 B2 | 6/2008 | Horie et al. | |
| 2001/0012121 A1 | 8/2001 | Yamamoto | |
| 2001/0017712 A1 | 8/2001 | Kasatani | |
| 2001/0019359 A1 | 9/2001 | Parulski et al. | |

(Continued)

FOREIGN PATENT DOCUMENTS

JP 9-238215 9/1997

(Continued)

OTHER PUBLICATIONS

Borenstein et al., "MIME (Multipurpose Internet Mail Extensions) Part One: Mechanisms for Specifying and Describing the Format of Internet Message Bodies", RFC 1521, Sep. 1993, retrieved from http://tools.ietf.org/pdf/rfc1521.pdf on Dec. 29, 2010.*

(Continued)

*Primary Examiner* — Joon H. Hwang
*Assistant Examiner* — Thomas Lee, IV
(74) *Attorney, Agent, or Firm* — Banner & Witcoff, Ltd.

(57) ABSTRACT

A network system includes a directory server configured to provide service definition information through a network, and a terminal device configured to receive the service definition information. The directory server may include a server communication unit, a service definition information storing unit configured to store main information and auxiliary information as part of service definition information, and a service definition information transmission control unit that retrieves the service definition information from the service definition information storing unit and transmit the same to the terminal device. The terminal device may include a terminal communication unit, an outputting unit, an input receiving unit and an output control unit. When received the service definition information from the directory server, the output control unit controls the outputting unit to output the main information, and when the input receiving unit receives a predetermined input instruction, the auxiliary information is output.

10 Claims, 39 Drawing Sheets

U.S. PATENT DOCUMENTS

| | | | |
|---|---|---|---|
| 2001/0034713 | A1 | 10/2001 | Nakai et al. |
| 2002/0147757 | A1 | 10/2002 | Day et al. |
| 2003/0059221 | A1 | 3/2003 | Funahashi |
| 2003/0080988 | A1* | 5/2003 | Moran et al. .................. 345/705 |
| 2003/0086109 | A1* | 5/2003 | Fitch ........................... 358/1.14 |
| 2003/0187965 | A1 | 10/2003 | Enomoto et al. |
| 2003/0195820 | A1 | 10/2003 | Silverbrook et al. |
| 2004/0128555 | A1 | 7/2004 | Saitoh et al. |
| 2004/0160630 | A1* | 8/2004 | Iriyama et al. ............... 358/1.15 |
| 2004/0162890 | A1* | 8/2004 | Ohta ............................ 709/218 |
| 2004/0184108 | A1 | 9/2004 | Takano |

FOREIGN PATENT DOCUMENTS

| | | |
|---|---|---|
| JP | 11-053377 | 2/1999 |
| JP | 2003-125082 | 4/2003 |
| JP | 2003-141168 | 5/2003 |
| JP | 2003-288336 | 10/2003 |
| JP | 2004-005705 | 1/2004 |
| JP | 2004-192610 | 7/2004 |
| JP | 2004-228686 | 8/2004 |

OTHER PUBLICATIONS

European Search Report for corresponding European Patent No. 05256870.6.

Notification of Reasons of Rejection received for Japanese Application No. 2004-322946, mailed Sep. 16, 2008.

Summons to Attend Oral Proceedings Pursuant to Rule 115(1) EPC, dated Nov. 28, 2008, in European Patent Application No. 05256870.6.

* cited by examiner

SERVICE DEFINITION INFORMATION (1/2)

| | DATA NAME | DATA TYPE | DESCRIPTION |
|---|---|---|---|
| BASIC DATA | ID | INTEGER | IDENTIFICATION INFORMATION OF SERVICE DEFINITION INFORMATION |
| | Title | CHARACTER STRING | DISPLAY TITLE |
| | Description | CHARACTER STRING | DETAILED EXPLANATION ON DISPLAYED CONTENTS |
| | Print_Description | CHARACTER STRING | DETAILED EXPLANATION FOR PRINTING ON DISPLAYED CONTENTS |
| | Audio_Description | CHARACTER STRING | DETAILED AUDIO EXPLANATION ON DISPLAYED CONTENTS |
| | Audio_Description_disp | - | COMBINED EXPLANATION ON AUDIO AND DISPLAY (DESCRIBED LATER) |
| | Print_Description_audio | CHARACTER STRING | DETAILED AUDIO EXPLANATION USED IN COMBINED DETAILED EXPLANATION |
| | Audio_Description_Print | CHARACTER STRING | DETAILED PRINT EXPLANATION USED IN COMBINED DETAILED EXPLANATION |
| | Type | "MENU" OR "FORM" | BODY DATA TYPE |

| Body DATA (WHEN Type IS "MENU") | Num_Link | INTEGER | THE NUMBER OF LINK DATA |
|---|---|---|---|
| | Link[ ] | - | ACTUAL LINK DATA (DESCRIBED LATER) |

SERVICE DEFINITION INFORMATION (2/2)

| | | | |
|---|---|---|---|
| Link DATA | Link_Title | CHARACTER STRING | CHARACTER STRING FOR DISPLAY TO EXPLAIN SERVICE/INFORMATION OF LINK DESTINATION |
| | Link_Location | CHARACTER STRING | URL FROM WHICH SERVICE IS EXTRACTED, OR ID OF ANOTHER SERVICE DEFINITION INFORMATION |
| | Link_Description | CHARACTER STRING | DETAILED EXPLANATION ON LINK |
| | Link_Print_Description | CHARACTER STRING | DETAILED EXPLANATION ON LINK FOR PRINT |
| | Link_Audio_Description | CHARACTER STRING | DETAILED EXPLANATION ON LINK FOR AUDIO OUTPUT |
| | Link_Audio_Description disp | - | AUDIO/DISPLAY COMBINED EXPLANATION |
| | Link_Audio_Description audio | CHARACTER STRING | DETAILED AUDIO EXPLANATION USED IN COMBINED EXPLANATION |
| | Link_Audio_Description print | CHARACTER STRING | DETAILED PRINT EXPLANATION USED IN COMBINED EXPLANATION |

| | | | |
|---|---|---|---|
| Audio_Description_disp DATA AND Link_Audio_Description_disp DATA | Audio_Data | CHARACTER STRING | AUDIO DETAILED EXPLANATION |
| | Segment[ ] | - | DISPLAYED EXPLANATION IN AUDIO/DISPLAY COMBINED EXPLANATION |

| | | | |
|---|---|---|---|
| Segment DATA | Caption | CHARACTER STRING | DISPLAY TEXT USED IN AUDIO/DISPLAY COMBINED EXPLANATION |
| | wait_time | INTEGER | DISPLAY HOLD TIME OF CAPTION |

FIG. 4

SERVICE I/F INFORMATION

| | DATA NAME | DATA TYPE | DESCRIPTION |
|---|---|---|---|
| BASIC DATA | ID | INTEGER | IDENTIFICATION INFORMATION OF SERVICE I/F INFORMATION |
| | Title | CHARACTER STRING | DISPLAY TITLE |
| | Type | "MENU" OR "FORM" | BODY DATA TYPE |
| Body DATA (WHEN Type IS "Form") | Action | URL CHARACTE STRING | URL OF PROGRAM FOR RECEIVING AND PROCESSING INPUT DATA |
| | Num_Form_Elem | INTEGER | THE NUMBER OF Form_Elem |
| | Form_Elem[ ] | – | TYPE-DEPENDENT Form ELEMENT DATA |
| Form_Elem DATA (Form ELEMENT DATA) | Form_Type | "TEXT", OR "PASSEORD" OR "SELECT" | THE TYPE OF FORM ELEMENT |
| | Form_Data | – | TYPE-DEPENDENT DATA |
| Form_Data DATA ("Text" OR "Password") | Disp_Name | CHARACTER STRING | CHARACTER STRING EXPLAINING INPUT ITEMS |
| | Value_Name | CHARACTER STRING | VARIABLE NAME WHEN TRANSMITTING AS DATA |
| | Max_Byte | INTEGER | MAXIMUM NUMBER OF BYTES OF CHARACTER STRING WHICH CAN BE INPUT |
| | Default_String | CHARACTER STRING | CHARACTER STRING INITIALLY DISPLAYED IN INITIAL STATE |
| Form_Data DATA (Select) | Disp_Name | CHARACTER STRING | CHARACTER STRING EXPLAINING INPUT ITEMS |
| | Value_Name | CHARACTER STRING | VARIABLE NAME WHEN TRANSMITTING AS DATA |
| | Multi_Select | 0 OR 1 | 0: MULTIPLE SELECTIONS PROHIBITED<br>1: MULTIPLE SELECTIONS ALLOWED |
| | Num_Option | INTEGER | THE NUMBER OF SELECTION ITEMS |
| | Option[ ] | – | INFORMATION RELATED TO SELECTION ITEMS (EXPLAINED HEREAFTER) |
| Option DATA | Disp_Select | CHARACTER STRING | DISPLAYED CHARACTER STRING SHOWING CHOICES |
| | Disp_Value | CHARACTER STRING | VALUE WHEN TRANSMITTED AS DATA WHEN SELECTED |
| | Default_Select | 0 or 1 | 0: NOT SELECTED IN INITIAL STATE<br>1: SELECTED IN INITIAL STATE |

FIG. 5

TYPE-CATEGORIZED
SERVICE DEFINITION INFORMATION ID TABLE

| TYPE / REQUESTED SERVICE DEFINITION INFORMATION ID | | | | | |
|---|---|---|---|---|---|
| TYPE A | 111111 | 111112 | 111113 | 111114 | |
| TYPE B | 211111 | 211112 | 211113 | 211114 | |
| TYPE B | 211111 | 211112 | 211113 | 211114 | |
| TYPE C | 311111 | 311112 | 311113 | 311114 | |
| | | | | | |

FIG. 8

```
<ID>11111113</ID>
<Title>Directory Service</Title>
<Description>Top of Service Selection</Description>
<Print_Description>*Print Data*</Print_Description>
<Audio_Description>*Sound Data*</Audio_Description>
<Type>MENU</Type>
<Num_Link>3</Num_Link>
<Link>
  <Link_Title>Data Storing Service</Link_Title>
  <Link_Description>What Data Storing Service is.. </Link_Description>
  <Link_Print_Description>*Print Data*</Link_Print_Description>
  <Link_Audio_Description>*Sound Data*</Link_Audio_Description>
  <Link_Location>1111111</Link_Location>
</Link>
<Link>
  <Link_Title>Print Service</Link_Title>
  <Link_Description>What Print Service is ..</Link_Description>
  <Link_Print_Description>*Print Data*</Link_Print_Description>
  <Link_Audio_Description>*Sound Data*</Link_Audio_Description>
  <Link_Location>1111112</Link_Location>
</Link>
<Link>
  <Link_Title>Copy Application Service</Link_Title>
  <Link_Description>What Copy Application Service is ..</Link_Description>
  <Link_ Print_Description>*Print Data*</Link_Print_Description>
  <Link_Audio_Description>*Sound Data*</Link_Audio_Description>
  <Link_Location>1111113</Link_Location>
</Link>
```

\*Italic Characters represent data encoded in accordance with Base64
"..." indicates that part of description therein is omitted for brevity

FIG.11

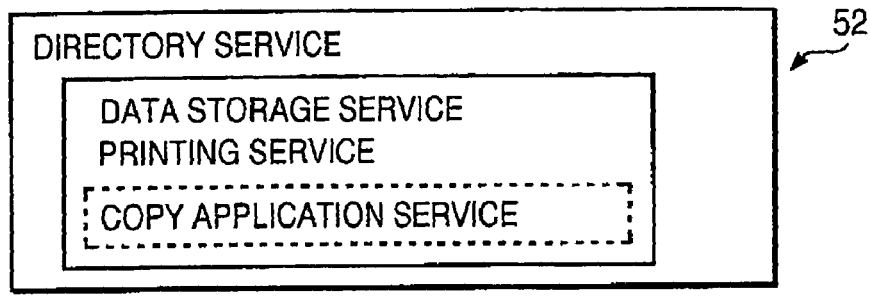
FIG.12A
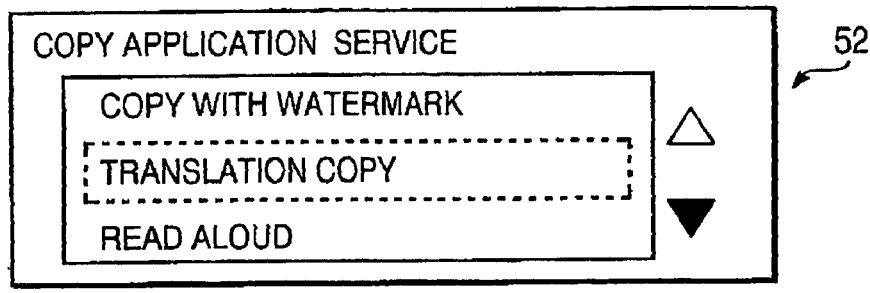
FIG.12B
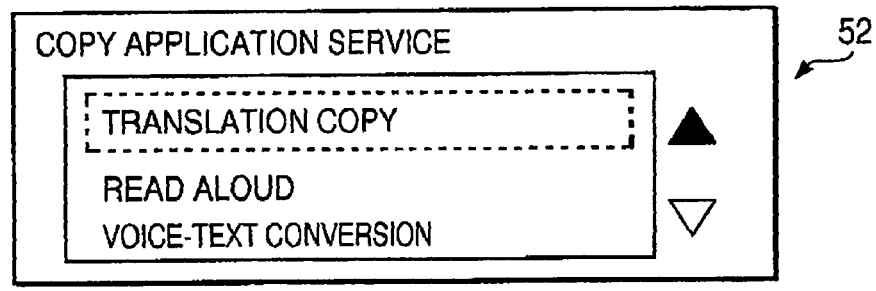
FIG.12C
What Translation Copy is:
Translation Copy is a service for translating a text read through a scanner into designated language. The supported languages are: Japanese, English, French and Chinese. To use this service, you need a scanner device and Print device.
FIG.12D

```
<ID>11111113</ID>
<Title>Copy Application Service</Title>
<Description>What Copy Application Service is ..</Description>
<Print_Description>*Print Data*</Print_Description>
<Audio_Description>*Sound Data*</Audio_Description>
<Type>MENU</Type>
<Num_Link>4</Num_Link>
<Link>
  <Link_Title>Copy with Watermark</Link_Title>
  <Link_Description>What Copy with Watermark is ..</Link_Description>
  <Link_Print_Description>*Print Data*</Link_Print_Description>
  <Link_Audio_Description>*Sound Data*</Link_Audio_Description>
  <Link_Location>http://suk.example.co.jp/cgi_bin/suktop</Link_Location>
</Link>
<Link>
  <Link_Title>Translation Copy</Link_Title>
  <Link_Description>What Translation Copy is ..</Link_Description>
  <Link_Print_Description>*Print Data*</Link_Print_Description>
  <Link_Audio_Description>*Sound Data*</Link_Audio_Description>
  <Link_Location>http://hon.example.co.jp/cgi_bin/top</Link_Location>
</Link>
<Link>
  <Link_Title>Original Read Aloud</Link_Title>
  <Link_Description>What Original Read Aloud is ..</Link_Description>
  <Link_Print_Description>*Print Data*</Link_Print_Description>
  <Link_Audio_Description>*Sound Data*</Link_Audio_Description>
  <Link_Location>http://example.yomiage.com/cgi_bin/yomi</Link_Location>
</Link>
<Link>
  <Link_Title>Voice-Text Conversion</Link_Title>
  <Link_Description>What Voice-Text Conversion is ..</Link_Description>
  <Link_Print_Description>*Print Data*</Link_Print_Description>
  <Link_Audio_Description>*Sound Data*</Link_Audio_Description>
  <Link_Location>http://ototeki.com/cgi_bin/oo</Link_Location>
</Link>
```

\*Italic Characters represent data encoded in accordance with Base64
"..." indicates that part of description therein is omitted for brevity

FIG.13

```
<ID>11111110</ID>
<Title>TRANSLATION COPY</Title>
<Type>FORM</Type>
<Action>
http://hon.example.co.jp/cgi_bin/service
</Action>
<Num_Form_Elem>4</Num_Form_Elem>
<Form_Elem>
  <Form_Type>Select</Form_Type>
  <Form_Data>
    <Disp_Name>LANGUAGE SELECTION</Disp_Name>
    <Value_Name>lang</Value_Name>
    <Multi_Select>0</Multi_Select>
    <Num_Option>2</Num_Option>
    <Option>
      <Disp_Select>ENGLISH→JAPANESE</Disp_Select>
      <Disp_Value>en_ja</Disp_Value>
      <Default_Select>1</Default_Select>
    </Option>
    <Option>
      <Disp_Select>Japanese→English</Disp_Select>
      <Disp_Value>ja_en</Disp_Value>
      <Default_Select>0</Default_Select>
    </Option>
  </Form_Data>
</Form_Elem>
<Form_Elem>
  <Form_Type>Select</Form_Type>
  <Form_Data>
CONTINUED <Disp_Name>SCANNER SETTING</Disp_Name>
    <Value_Name>scan_res</Value_Name>
    <Multi_Select>0</Multi_Select>
    <Num_Option>2</Num_Option>
    <Option>
      <Disp_Select>NORMAL FONT</Disp_Select>
      <Disp_Value>300</Disp_Value>
      <Default_Select>1</Default_Select>
    </Option>
    <Option>
      <Disp_Select>SMALL FONT</Disp_Select>
      <Disp_Value>600</Disp_Value>
      <Default_Select>0</Default_Select>
    </Option>
  </Form_Data>
</Form_Elem>
<Form_Elem>
  <Form_Type>Select</Form_Type>
  <Form_Data>
    <Disp_Name>PRINT SETTING</Disp_Name>
    <Value_Name>print_res</Value_Name>
    <Multi_Select>0</Multi_Select>
    <Num_Option>3</Num_Option>
    <Option>
      <Disp_Select>PRINT SPEED PRIORITIZED</Disp_Select>
      <Disp_Value>200</Disp_Value>
      <Default_Select>0</Default_Select>
    </Option>
CONTINUED <Option>
      <Disp_Select>NORMAL</Disp_Select>
      <Disp_Value>300</Disp_Value>
      <Default_Select>1</Default_Select>
    </Option>
    <Option>
      <Disp_Select>FINE</Disp_Select>
      <Disp_Value>600</Disp_Value>
      <Default_Select>0</Default_Select>
    </Option>
  </Form_Data>
</Form_Elem>
<Form_Elem>
  <Form_Type>Text</Form_Type>
  <Form_Data>
    <Disp_Name>COMMENT</Disp_Name>
    <Value_Name>comment</Value_Name>
    <Max_Byte>100</Max_Byte>
    <Default_String>
JAPANESE TRANSLATION OF ENGLISH TECHNICAL REPORT 0010 WITH TRANSLATION COPY SERVICE
    </Default_String>
  </Form_Data>
</Form_Elem>
```

FIG. 17

Link_Description
　Translation Copy is a service for translating a text read through a scanner into designated language. The supported languages are: Japanese, English, French and Chinese. To use this service, you need a scanner device and print device. Fee: ¥200/page

FIG.34A

Link_Print_Description

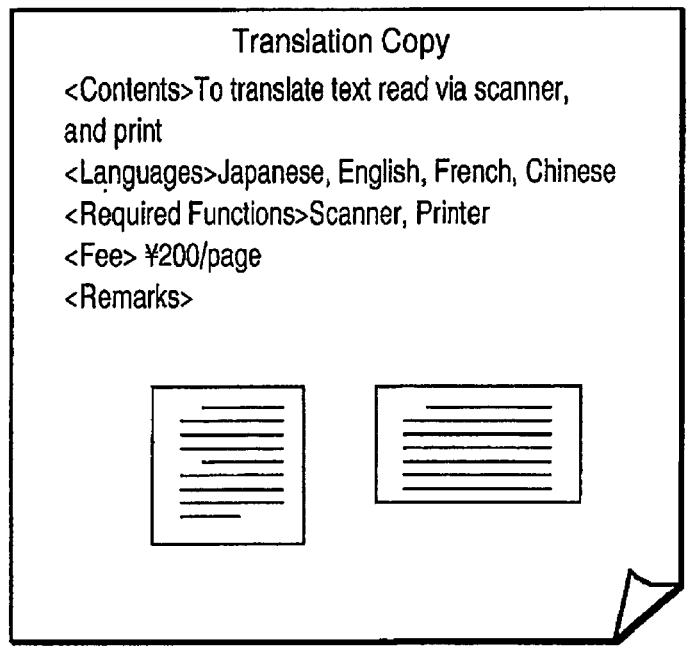

FIG.34B

Link_Audio_Description
The translation copy is a service for translating a text, which is read by a scanner, into other language and print the same. The service supports Japanese, English, French and Chinese, and bidirectional translation is a available. To use this function, a scanner device and a printing device are required. The fee for this service is 200 yen per page. If you use this service, please press the enter button. If you return. please press the cancel button.

FIG.34C

```
<ID>11111113</ID>
<Title>Copy Application Service</Title>
<Description>What Copy Application Service is ..</Description>
<Print_Description>*Print Data*</Print_Description>
<Audio_Description>*Sound Data*</Audio_Description>
<Type>MENU</Type>
<Num_Link>4</Num_Link>
              ⋮
<Link>
  <Link_Title>Translation Copy</Link_Title>
  <Link_Description>What Translation Copy is ..</Link_Description>
  <Link_Print_Description>*Print Data*</Link_Print_Description>
  <Link_Audio_Description>*Sound Data*</Link_Audio_Description>
   <Link_Audio_Description_disp>
     <Audio_Data>*Sound Data*</Audio_Data>
     <Segment>
       <Caption>Translation Copy</Caption>
       <wait_time>3</wait_time
     </Segment>
     <Caption>1.Japanese 2.English 3.French 4.Chinese </Caption>
       <wait_time>5</wait_time>
     </Segment>
              ⋮
     <Segment>
       <Caption>Fee :¥200/page</Caption>
       <wait_time>5</wait_time>
     </Segment>
   <Link_Audio_Description_disp>
   <Link_Location>http://hon.brother.co.jp/cgi_bin/top</Link_Location>
</Link>
```

*Italic Characters represent data encoded in accordance with Base64
"..." indicates that part of description therein is omitted for brevity.

FIG.35

[AUDIO OUTPUT]
The translation copy is a service for translating a text, which is read by a scanner, into other language and print the same.

The service supports Japanese, English, French and Chinese, and bidirectional translation is available.

The fee for this service is 200 yen per page.

```
<ID>11111113</ID>
<Title>Copy Application Service</Title>
<Description>What Copy Application Service is ..</Description>
<Print_Description>*Print Data*</Print_Description>
<Audio_Description>*Sound Data*</Audio_Description>
<Type>MENU</Type>
<Num_Link>4</Num_Link>

<Link>
  <Link_Title>Translation Copy</Link_Title>
  <Link_Description>What Translation Copy is ..</Link_Description>
  <Link_Print_Description>*Print Data*</Link_Print_Description>
  <Link_Audio_Description>*Sound Data*</Link_Audio_Description>
  <Link_Print_Description_audio>*Print Data*</Link_Print_Description_audio>
  <Link_Audio_Description_print>*Sound Data*</Link_Audio_Description_print>
  <Link_Location>http://hon.brother.co.jp/cgi_bin/top</Link_Location>
</Link>
L
```

*Italic Characters represent data encoded in accordance with Base64
"..." indicates that part of description therein is omitted for brevity

FIG.37

[PRINT DATA OUTPUT]

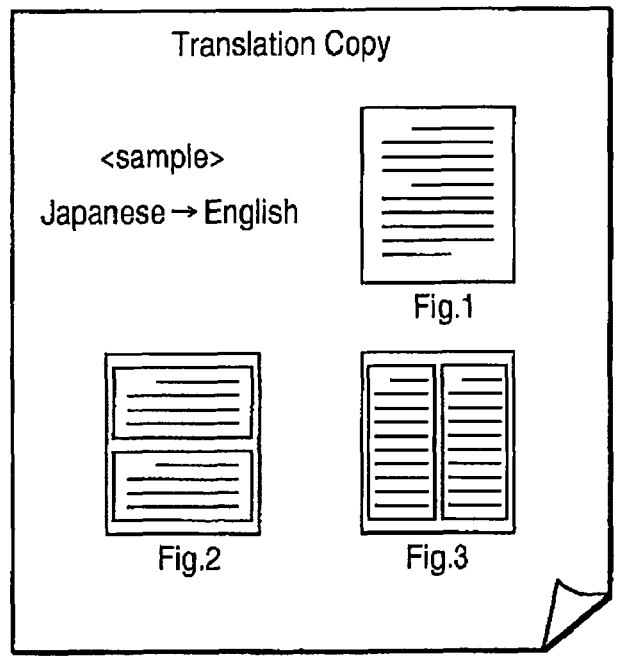

FIG.38A

[AUDIO OUTPUT]

Translation Copy is a service for translating a text read through a scanner into designated languages.

⋮

Three printing formats are available.
Fig.1: Only the translation is printed;
Fig.2: Original text i in upper area, and Translated text in lower area; and
Fig.3: Original text in left-hand side area, and Translated text in right-hand side area.

```
<ID>11111113</ID>
<Title>Copy Application Service</Title>
<Description>What Copy Application Service is:</Description>
<Print_Description>*Print Data*</Print_Description>
<Audio_Description>*Sound Data*</Audio_Description>
<Type>MENU</Type>
<Num_Link>4</Num_Link>

<Link>
  <Link_Title>Translation Copy </Link_Title>
  <recommended>Print</recommended>
  <Link_Description>What Translation Copy is ..</Link_Description>
  <Link_Print_Description>*Print Data*</Link_Print_Description>
  <Link_Audio_Description>*Sound Data*</Link_Audio_Description>
  <Link_Location>http://brothe.co.jp/cgi_bin/top</Link_Location>
<Link>
```

*Italic Characters represent data encoded in accordance with Base64
"..." indicates that part of description therein is omitted for brevity

FIG.39

NETWORK SYSTEM, DIRECTORY SERVER AND TERMINAL DEVICE

INCORPORATION BY REFERENCE

This application claims priority from Japanese Patent Application No. 2004-322946, filed on Nov. 5, 2004. The entire subject matter of the application is incorporated herein by reference.

TECHNICAL FIELD

Aspects of the invention relate to a network system configured such that a server that provides a certain service and a terminal device which can communicate with the server through the network system. The network system may include a directory server storing service definition information and a terminal device configured to obtain the service definition information and use the same.

BACKGROUND

Conventional terminal devices (e.g., a personal computer, a printer, a scanner, a facsimile device or a multi function peripheral having a network function) can enhance their functionality by communicating with servers providing various services (e.g., data processing) through a network. In such a terminal device, further information (e.g., information of a service menu) necessary for using the services may be downloaded from the server. An example of such a system is disclosed in Japanese Patent Provisional Publication No. HEI 9-238215.

In such a system, it is further preferable that information explaining respective functions, which have been newly provided or improved, can be provided to the terminal device.

However, some terminal devices may have a relatively small display device on which only a limited number of letters/numerals can be displayed, and the explanation transmitted from the server may not be fully displayed. For example, on a display of the personal computer, forty or more lines of characters can be displayed. However, a printer, a scanner or a multi function peripheral may have a display which can display only a few lines of characters.

One of the methods for solving the above problem, if a WWW scheme is utilized, a type of the terminal device is identified on a server side using a user agent. In such a case, it is possible to transmit an HTML file containing the explanation of the service and corresponding to the displaying capability of the terminal device. Then, the difference of the displaying capability of the terminal devices may be dealt with. However, to transmit the HTML files corresponding to the displaying capability of the terminal devices implies that the number of the HTML files should be the same as the number of the types of the terminal devices. In such a case, when the HTML files are to be revised or HTML files for new types of terminal devices are to be added, burden to the server administrator would be relatively large. Further, for some terminals, the quantity of the information decreases, and the service may not be explained sufficiently.

It may be possible to prepare HTML files for service titles and for service descriptions, which constitute a service menu. Such a configuration may reduce the amount of each file. If the menu has such a structure, the user can obtain the explanation of a desired service by following links to an HTML file containing the explanation.

However, such a configuration requires the terminal device to obtain appropriate HTML files form the server. Therefore, at the terminal device, a display response at transition among pages becomes lowered. This problem is significant when the terminal device is OA (Office Automation) equipment, such as a printer, a scanner, a facsimile machine, an MFP and the like. Conventionally, the OA equipment is configured to display a menu, which are displayed using the menu information stored in the equipment and sufficiently quick response is achieved. Therefore, if the menu is displayed using the data obtained through the network, the response is too slow, which is a critical problem for the OA equipment.

In the foregoing, a problem in displaying information is described. It should be noted that the similar problem exists in outputting sound and voice messages.

SUMMARY

Aspects of the invention provide an improved network system in which, even if a terminal device which can output insufficient amount of information at a time, sufficient amount of information can be output and the output response is also sufficient.

BRIEF DESCRIPTION OF THE ACCOMPANYING DRAWINGS

FIGS. 3 and 4 show a table indicating the definition of each tag in the service definition information in accordance with aspects of the present invention.

FIG. 5 shows a table indicating the definition of each tag in the service I/F information in accordance with aspects of the present invention.

FIG. 8 shows an example of a type-basis service definition information ID table in accordance with aspects of the present invention.

FIG. 11 shows an example of service definition information data in accordance with aspects of the present invention.

FIGS. 12A-12D show a service selection window in accordance with aspects of the present invention.

FIG. 13 shows another example of service definition information data in accordance with aspects of the present invention.

FIG. 17 shows an example of service I/F information data in accordance with aspects of the present invention.

FIGS. 34A-34C show examples of service definition information data in accordance with aspects of the present invention.

FIG. 35 shows an example of the service definition information data in accordance with aspects of the present invention.

FIG. 37 shows a further example of the service definition information data in accordance with aspects of the present invention.

FIGS. 38A-38B show examples of a result of the audio/print explanation process in accordance with aspects of the present invention.

FIG. 39 shows another example of the service definition information data in accordance with aspects of the present invention.

DETAILED DESCRIPTION

General Overview

Figure 1:
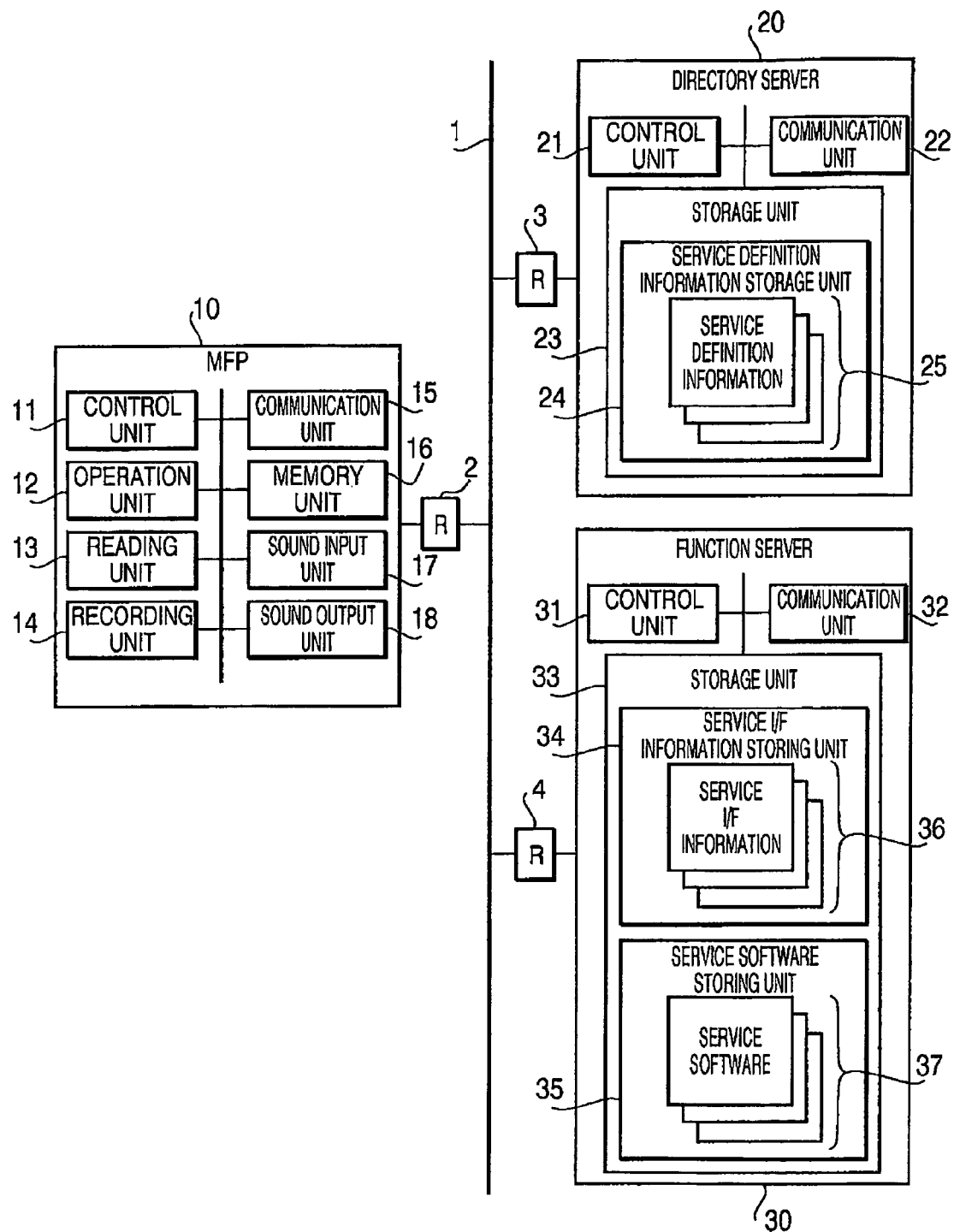
FIG. 1 is a block diagram showing a configuration of the service providing system in accordance with aspects of the present invention.
Figure 2:
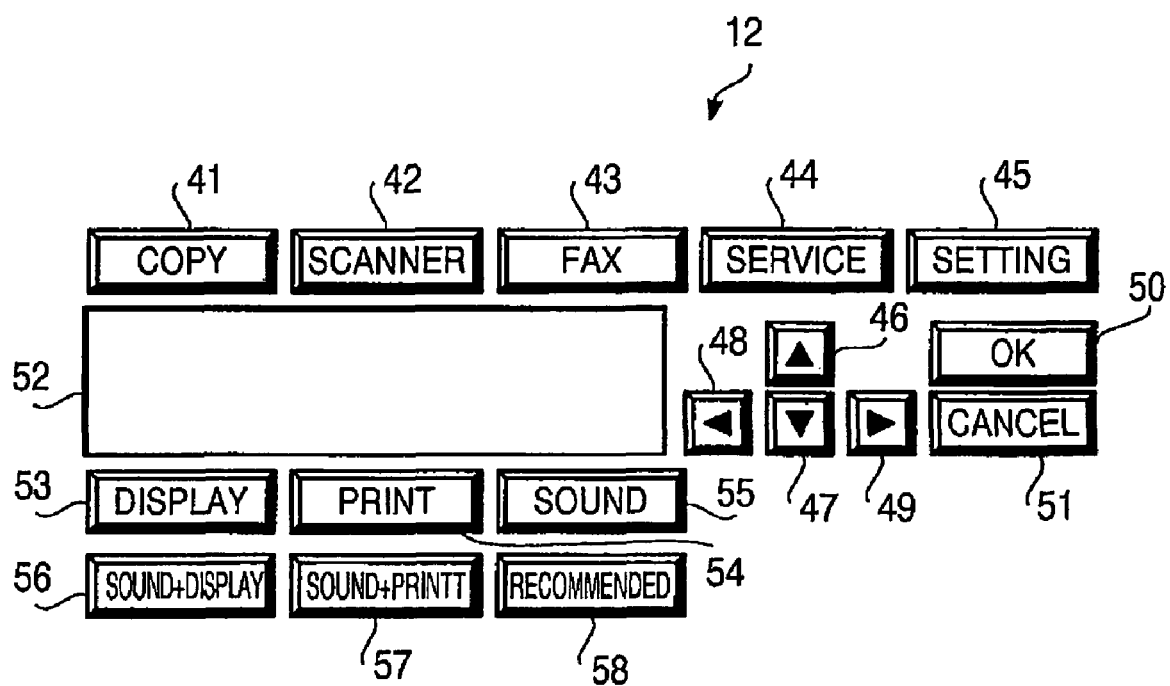
FIG. 2 is a diagram showing a configuration of the operation unit in accordance with aspects of the present invention.

It is noted that various connections are set forth between elements in the following description. It is noted that these connections in general and unless specified otherwise, may be direct or indirect and that this specification is not intended to be limiting in this respect. Aspects of the invention may be implemented in computer software as programs storable on computer-readable media including but not limited to RAMs, ROMs, Flash memory, EEPROMs, CD-media, DVD-media, temporary storage, hard disk drives, floppy drives, permanent storage, and the like.

According to aspects of the invention, there is provided a network system, which includes a directory server configured to provide service definition information regarding services through a network, and a terminal device configured to receive, for use, the service definition information provided by the directory server. The directory server may include a server communication unit configured to perform a communication with the terminal device, a service definition information storing unit configured to relate main information that is output when a service is used to auxiliary information and store the main information and the auxiliary information as part of service definition information, and a service definition information transmission control unit that retrieves the service definition information from the service definition information storing unit and transmit the retrieved information to the terminal device through the server communication unit. The terminal device may include a terminal communication unit configured to communicate with the directory server, an outputting unit configured to perform an output operation in accordance with information, an input receiving unit configured to receive input instruction by a user, and an output control unit. The output control unit may be configured such that, (1) when the output control unit receives the service definition information from the directory server through the terminal communication unit, the output control unit controls the outputting unit to output the main information contained in the service definition information, and (2) when the input receiving unit receives a predetermined input instruction by the user, the output control unit controls the outputting unit to output the auxiliary information contained in the service definition information.

It should be noted that the term "service" is used as a generic name representing a function with which a predetermined result can be achieved when the terminal device and the server communicates. The "service" may include OCR, translation, revision, sound conversion, data storing and the like.

According to the network system as above, the terminal device can obtain both the main information and the auxiliary information with a single communication operation. Then, the terminal device outputs the main information, and when instructed by a user to output the auxiliary information, it is output. Accordingly, when the user does not require auxiliary information (i.e., understand the function only with the main information), the terminal outputs less information, thereby allowing the user to operate the terminal swiftly. When the user feels difficulty in understanding the function only with the main information, the auxiliary information is output. Since the auxiliary information has been obtained, it is output immediately without performing a further communication. Therefore, the auxiliary information can be output quickly in comparison with the conventional unit, which improves the operability of the terminal device.

The above unit is applicable for any relationship between the main information and the auxiliary information. In a particular case, the auxiliary information may be explanation information corresponding to the main information. In such a case, if the explanation given by the main information is insufficient, the user can refer to the auxiliary information for further explanation. In a particular case, the main information may be a title, and the auxiliary information may be explanation corresponding to the title. If the information has such a configuration, when the user feel difficulty in understanding the meaning of the title, the user can obtain the explanation by making the terminal device output the auxiliary information explaining the title.

Optional or alternatively, the main information and the auxiliary information may be a title of a link destination, and the explanation of the title of the link destination. With such a configuration, the user can preview the contents of the link destination without actually following the link and obtaining the service definition information thereof. That is, in such a case, the user can recognize the contents of the link before connected to the link (and the contents thereof is output). Therefore, the operability is well improved.

It should be noted that the unit may be provided with more than one outputting unit. Thus, according to aspects of the invention, the terminal device is provided with a plurality of the outputting units. Further, the auxiliary information stored in the service definition storing unit of the directory server may include a plurality of pieces of auxiliary information respectively corresponding to the plurality of the outputting units, and the output control unit included in the terminal device may be configured to control a predetermined one, corresponding to the instruction received by the input instruction receiving unit, of the outputting units to output the corresponding one of the plurality of pieces of the auxiliary information.

Such a configuration may be advantageous since an outputting unit the user intends to use can be used to output the auxiliary information. Further, it may be possible to make use of characteristics of respective outputting units, which enables the user to understand the function easier.

When there are plurality of outputting units, it may be convenient if the plurality of outputting units output the auxiliary information in association with each other. In this regard, according to aspects of the invention, the output control unit of the terminal device may control the plurality of outputting units respectively corresponding to the plurality of pieces of the auxiliary information to output the respective auxiliary information in a parallel fashion at predetermined timings, respectively. The term "predetermined timings" implies a relationship among the times when respective outputting units output the auxiliary information. For example, the auxiliary information is output by a predetermined outputting unit first, and thereafter (e.g., three seconds later), the auxiliary information is output by another outputting unit.

According to such a configuration, it may be possible to have the user understand the function generally, and then provide detailed explanation. Alternatively, using a plurality of outputting units, explanation in various aspects may be provided to the user, which may help the user in understanding the function clearer.

In a particular case, the output control unit of the terminal device may control the plurality of outputting units to output the plurality of pieces of the auxiliary information one after another at different timings.

According to further aspects, the service definition information stored in the service information storing unit of the directory server may include an outputting unit designating information designating the outputting unit appropriate for outputting the auxiliary information, and the output control unit may control the designated outputting unit, in accordance with the outputting unit designating information, to output the auxiliary information if the input instruction receiving unit receives a predetermined input instruction.

With the above configuration, even if the user cannot determine an outputting unit to be used, an outputting unit which a designer or a unit administrator thinks appropriate can be used to output the auxiliary information. Such a configuration improves the operability of the unit.

The outputting unit may include at least one of a displaying unit configured to display an image, a sound output unit configured to output sound, and a printing unit configured to print an image on a recording medium. It should be noted that the term "image" may be interpreted to have broad meaning and may include not only pictorial images, but characters/letters.

If the outputting unit is a displaying unit and the main/auxiliary information transmitted from the directory server is displayed as an image, the information can be presented to the user quickly in comparison with a case where units other than the displaying unit are used. Thus, in this case, the information may be provided to the user quickly.

If the outputting unit is a sound outputting unit, and the main/auxiliary information is output by sound, the user may pay higher attention to the information in comparison with a case where the information is presented as an image. If there is sound output (e.g., the output using the speaker), the information should reach the user even if the user is not paying an attention to the outputting unit. Therefore, when the sound output is utilized, an erroneous operation in using the service may be prevented easier.

When the outputting unit is the printing unit, the main/auxiliary information transmitted from the directory server can be printed on a printing medium as an image. Since printed information can be recognized easily, the user can understand the service contents easily and quickly. It is noted that the "image" should be interpreted broadly to include not only pictorial images but also characters/letters.

The directory server may include an inquiry unit configured to inquire a type from the terminal device via the server communication unit. Further, the service definition information stored in the service definition information storing unit may include the main information and the auxiliary information which correspond to the type of the terminal device and can be output by the outputting unit of the terminal device. The service definition information transmission control unit may retrieve the service definition information corresponding to the type of the terminal device obtained by the inquiry unit from the service definition information storing unit, and the terminal device may further include a type replaying unit that transmits the type of the terminal device inquired by the directory server via the terminal communication unit to the directory server via the terminal communicating unit.

With the above configuration, the directory server may transmit the most appropriate service definition information corresponding to the type of the terminal device to the terminal device. Therefore, it becomes possible to make most use of the outputting unit. For example, if the terminal device is configured to print an image only on a post-card size sheet, summarized main/auxiliary information may be transmitted thereto. If the terminal device can use A4 size printing sheet, detailed main/auxiliary information may be transmitted. Therefore, the user can obtain relevant result depending on the type of the terminal device.

Aspects of the invention provides a directory server configured to provide service definition information regarding a service to be used by a terminal device to the terminal device through a network. The directory server may include a server communication unit configured to perform a communication with the terminal device, a service definition information storing unit configured to relate main information that is output when a service is used to auxiliary information and store the main information and the auxiliary information as part of service definition information, and a service definition information transmission control unit that retrieves the service definition information from the service definition information storing unit and transmit the retrieved information to the terminal device through the server communication unit.

If the above directory server is used together with a predetermined terminal device, the above-described configurations of the network system can be realized.

According to aspects of the invention, there is provided a terminal device configured to receive service definition information regarding a service to be used from a directory server through a network. The terminal device may include a terminal communication unit configured to communicate with the directory server, an outputting unit configured to perform an output operation in accordance with information, an input receiving unit configured to receive input instruction by a user, an output control unit. The output control unit may be configured such that (1) when the output control unit receives the service definition information from the directory server through the terminal communication unit, the output control unit controls the outputting unit to output the main information contained in the service definition information, and (2) when the input receiving unit receives a predetermined input instruction by the user, the output control unit controls the outputting unit to output the auxiliary information contained in the service definition information.

If the above terminal device is used together with a predetermined directory server, the above-described configurations of the network system can be realized.

According to further aspects of the invention, there is provided a computer program product including computer readable instructions which cause a computer to function as a directory server that provides service definition information regarding a service to be used by a terminal device to the terminal device through a network. The computer, when functioning as the directory server, may include a server communication unit configured to perform a communication with the terminal device, a service definition information storing unit configured to relate main information that is output when a service is used to auxiliary information and store the main information and the auxiliary information as part of service definition information, and a service definition information transmission control unit that retrieves the service definition information from the service definition information storing unit and transmit the retrieved information to the terminal device through the server communication unit.

If the computer functioning the directory server above is used together with a predetermined terminal device, the aforementioned configurations of the network system can be realized.

According to further aspects of the invention, there is provided a computer program product comprising computer readable instructions which cause a computer to function as a terminal device configured to receive service definition information regarding a service to be used from a directory server through a network. The computer, when functions as the terminal device, may include a terminal communication unit configured to communicate with the directory server, an outputting unit configured to perform an output operation in accordance with information, an input receiving unit configured to receive input instruction by a user. There may be further provided with an output control unit configured such that (1) when the output control unit receives the service definition information from the directory server through the terminal communication unit, the output control unit controls the outputting unit to output the main information contained in the service definition information, and (2) when the input receiving unit receives a predetermined input instruction by the user, the output control unit controls the outputting unit to output the auxiliary information contained in the service definition information.

If the computer functioning as the terminal device indicated above is used together with a predetermined directory server, the above-described configurations of the network system can be realized.

Embodiments

Hereinafter, referring to the accompanying drawings, illustrative embodiments will be described.
Entire Configuration FIG. 1 shows a configuration of a service providing system according to an illustrative embodiment of the invention. As shown in FIG. 1, the service providing system includes an MFP (Multi Function Peripheral) 10, a directory server 20, a function server 30, etc., which are interconnected to each other so that data communication can be performed via a network 1. According to this illustrative embodiment, the network 1 may be a WAN (Wide Area Network) such as the Internet. Specifically, the MFP 10, the directory server 20 and the function server 30 are connected to the network 1, respectively, via the routers 2 to 4. In this illustrative embodiment, the routers may include conventional broadband routers.

The MFP 10 includes, as shown in FIG. 1, a control unit 11, an operation unit 12, a reading unit 13, a recording unit 14, a communication unit 15, a storage unit 16, a sound input unit 17, a sound output unit 18, etc. The control unit 11 includes CPU, ROM, RAM, etc., and the CPU of the control unit 11 controls the entire operation of the MFP 10 in accordance with programs stored in the ROM of the control unit 11.

In addition, the operation unit 12 serves as a user interface, which includes a copy key 41, a scanner key 42, a FAX key 43, a service key 44, a setting key 45, up/down/right/left direction keys 46 to 49, an OK key 50 and a cancel key 51, a user interface such as a display 52, a display key 53, a print key 54, an audio key 55, an audio+display key 56, an audio+print key 57, a recommendation button 58, etc.

Further, the reading unit 13, which is an input device for realizing the scanner function, reads images recorded (for example, printed) on a sheet-type recording medium such as paper and generates image data representing the image.

The recording unit 14, which is an output device for realizing the printer function, prints out the image represented by the image data onto a sheet-type recording medium such as paper.

The communication unit 15 connects the MFP 10 to the network 1, and also performs processes for transmitting/receiving data via the network 1.

The storage unit 16 includes a nonvolatile RAM (not shown) in which input/output data can be recorded.

The sound input unit 17 receives sound through a microphone provided to a handset (not shown), which is included in the MFP 10, and generates sound data (e.g., PCM data) corresponding to the received sound.

The sound output unit 18 outputs the sound represented by the sound data (e.g., PCM data) with a speaker provided to the handset or a speaker (not shown), which is provided to a main body of the MFP 10.

The directory server 20 includes a control unit 21, communication unit 22, and a storage unit 23. The control unit 21 includes CPU, ROM, RAM, etc., and the CPU controls the entire operation of the directory server 20 in accordance with the program stored in the ROM.

The communication unit 22 connects the directory server 20 to the network 1 and also performs processes for transmitting/receiving data via the network 1.

The storage unit 23 includes a hard disk drive (not shown), in which data is stored. A service definition information storage unit 24 for recording service definition information 25, which will be explained later, is provided in the storage unit 23. This service definition information 25 is XML (eXtensible Markup Language) data described in XML and can provide a list of services (e.g., type and request destination address (URL: Uniform Resource Locator) of each service) which can be provided by function server 30 through a service selection window (refer to FIG. 12A) in accordance with the content of the XML data. Respective tag definitions in the service definition information 25 are shown in FIGS. 3 and 4.

The function server 30 includes a control unit 31, a communication unit 32, a storage unit 33, etc. The control unit 31 includes CPU, ROM, RAM, etc., and the CPU controls the entire operation of the function server 30 in accordance with programs stored in the ROM. Compared with the control unit 11 of MFP 10, the control unit 31 is configured to realize a sufficiently high performance and is capable of performing processes which could not be executed by the control unit 11.

The communication unit 32 connects the function server 30 to the network 1 and also performs processes for transmitting/receiving data via the network 1.

The storage unit 33 includes a hard disk drive (not shown), in which data is stored. The storage unit 33 includes a service I/F information storage unit 34 for storing service I/F information 36, and a service software storage unit 35 for storing service software 37 which performs processes for providing different services. This service I/F information 36 is XML data described in XML. A parameter input window (described later) is displayed on the MFP 10 (see FIG. 18) with the I/F information 36, thereby an interface for setting information (service content and request destination address) to be used for requesting the function server 30 to provide the service is realized.

Respective tag definitions in this service I/F information 36 are indicated in FIG. 5.

Mechanism for Providing Service

Figure 6:
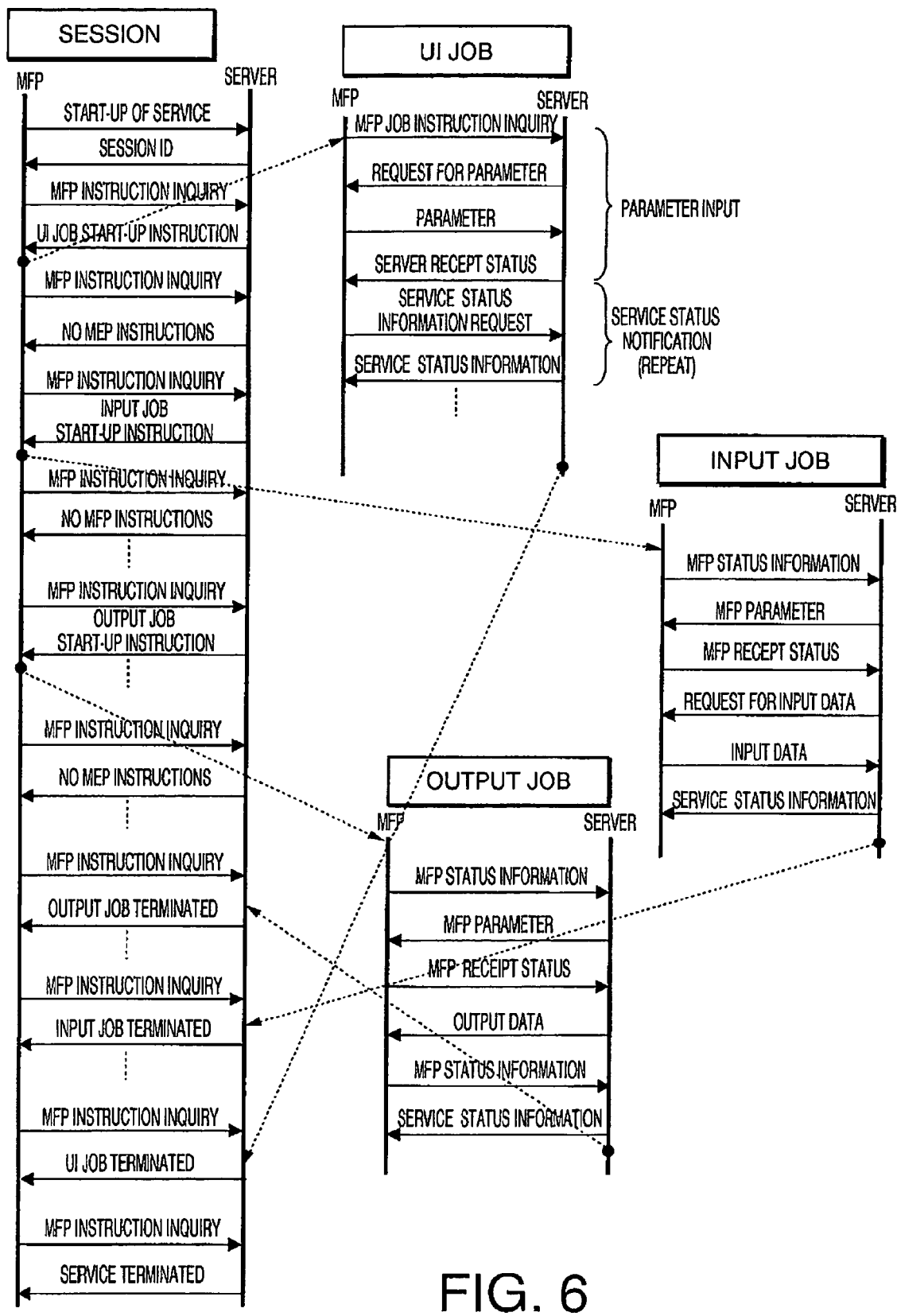
FIG. 6 is a ladder chart showing an example of a communication between an MFP and a function server in accordance with aspects of the present invention.

Next, an example of a communication performed between the MFP 10 and the function server 30 when the service is provided will be described with reference to a ladder chart shown in FIG. 6.

The MFP 10 and the function server 30 execute a series of communication processes (which will be referred to as a session) from the start-up of the service to the end of the service. In the session, the MFP 10 request the function server 30 to start up the service. Then, the function server 30 transmits a session ID to the MFP 10. The session ID is an identifier to specify a session in the function server 30. In the following communication process, the MFP 10 transmits the session ID in response to a request, and the function server 30 identifies the session based on the session ID. With this configuration, the function server 30 is capable of handle a plurality of sessions at the same time.

After receipt of the session ID, the MFP 10 periodically executes an inquiry of an instruction to the MFP 10, and receives the instruction in the form of reply from the function server 30. It should be noted that the function 30 transmits a replay indicating that there are no instructions to the MFP 10 if there are no instructions to be transmitted to the MFP 10.

In the above case, the function server 30 first transmits a UI (User Interface) job start-up instruction to the MFP 10. The UI job start-up instruction is for notifying that a UI device (e.g., the operation unit 12) provided to the MFP 10 is started to be used. Thus, a UI job communication process is started between the MFP 10 and the function server 30. The UI job communication process is executed in parallel with the session. Further, from the function server 30 to the MFP 10, a job ID, which is an identifier intrinsic to each session and is for identify a job at the function server 30, is transmitted as the UI job start-up instruction is issued. Then, the MFP 10 transmits the session ID and job ID in accordance with the request, in the UI job communication process. The function server 30 identifies the job based on the session ID and job ID. With this configuration, it becomes possible that the function server 30 executes a plurality of jobs at the same time. As above, the function server 30 can process a plurality of jobs at the same time. The communication process in the UI job will be described later.

Next, the function server 30 transmits an input job start-up instruction to the MFP 10 at a predetermined timing. It is noted that the input job startup instruction is for notifying of start-up of using an input device (i.e., the reading unit 13 or the sound input unit 17) provided to the MFP 10. Then, between the MFP 10 and the function server 30, the input job communication process is started. Similar to the UI job process, the input job communication process is executed in parallel with the session. Further, as the input job start-up instruction is transmitted, the job ID is transmitted from the function server 30 to the MFP 10. The MFP 10, then, transmits the session ID and job ID in response to the request, in the input job communication process. The function server 30 identifies a job based on the session ID and the job ID. The input job communication process will be described later.

Next, the function server 30 transmits, at a predetermined timing, an output job start-up instruction to the MFP 10. The output job start-up instruction is for notifying of usage of an output device (e.g., the recording unit 14 or the sound output unit 18) provided to the MFP 10. With this configuration, between the MFP 10 and the function server 30, an output job communication process is started. Similar to the UI job and input job, the output job communication process is executed in parallel with the session. Further, the job ID is transmitted in association with the output job start-up instruction fro the function server 30 to the MFP 10. Then, the MFP 10, in the output job communication process, transmits the session ID and job ID in response to the request. Then, the function server 30 identifies the job based on the session ID and the job ID. The output job communication process will be described later.

Next, the function server 30 transmits, at a predetermined timing, an output job end instruction which is for notifying of end of output job to the MFP 10. Then, the function server 30 transmits, at the predetermined timing, an input job end instruction which is for notifying of end of input job to the MFP 10.

Then, the function server 30 transmits, at a predetermined timing, a UI job end instruction notifying of the end of the UI job to the MFP 10. Further, the function server 30 transmits, at a predetermined timing, a service end instruction notifying of the end of the service to the MFP 10.

Next, the UI job communication process will be described.

In the UI job communication process, firstly, the MFP 10 transmits, to the function server 30, the MFP job instruction inquiry which is an inquiry regarding an instruction to the MFP 10. Then, the function server 30 transmits a parameter request to the MFP 10. The parameter request is for allowing a user of the MFP 10 to set parameters necessary for performing a service. From the function server 30 to the MFP 10, in association with the parameter request, service I/F information 36 is also transmitted.

The MFP 10 displays a parameter input window on the display 52 of the operation unit 12 (e.g., FIG. 18) in accordance with the service I/F information 36 upon receipt of the parameter request from the function server 30.

The function server 30 transmits a server receipt status, which represents whether the function server 30 has successfully received the information from the MFP 10, upon receipt of the parameter(s) from the MFP 10.

If the MFP 10 recognizes that the function server 30 has successfully received the parameter(s) based on the server receipt status received from the function server 30, the MFP 10 request the function server 30 for a service status information request.

When the function server 30 receives the service status information request from the MFP 10, it transmits the service status information which is a notification of the status of the function server 30 and its service status. Thereafter, the request for the service status information and the response thereto (i.e., transmission of the service status information) are repeated.

Next, the input job communication process will be described.

In the input job communication process, the MFP 10 transmits MFP status information to the function server 30. Then, the function server 30 transmits MFP parameters to the MFP 10. The MFP parameters are parameters for the input device that has been set by the user of the MFP 10 in the UI job communication process.

The MFP 10, upon receipt of the MFP parameters from the function server 30, transmits MFP receipt status representing whether the MFP 10 has successfully received the information from the function server 30 to the function server 30.

If the function server 30 recognizes that the MFP 10 has successfully received the information based on the MFP receipt status transmitted from the MFP 10, it transmits an input data request which requests the MFP 10 to transmit the input data corresponding to the job. The input data corresponding to the job includes: image data created in the reading unit 13 for a scan job that is a job executed in the service related to the image data generated in the reading unit 13; and PCM data for a sound input job that is a job executed in the service related to the sound data representing the sound to be output from the sound input unit 17.

The MFP 10 displays an image allowing the user to executed an input operation (e.g., the image reading operation, the sound input operation or the like) when it receives the input data request from the function server 30, and transmits the resultant input data to the function server 30.

Upon receipt of the input data from the MFP 10, the function server 30 transmits the service status information representing the notification of status of the function server 30 and the service.

Next, the output job communication process will be described.

In the output job communication process, the MFP 10 transmits the MFP status information to the function server 30. Then, the function server 30 transmits the MFP parameters to the MFP 10. The MFP parameters are parameters for the output device that has been set by the user of the MFP 10 in the UI job communication process.

When the MFP parameters are received from the function server 30, the MFP 10 transmits the MFP receipt status notifying whether the MFP 10 has successfully received the information from the function server 30 to the function server 30.

When the function server 30 has recognized that the MFP 10 has successfully received the information based on the MFP receipt status, it transmits the output data to the MFP 10.

The output data above may include: image data for the print job (i.e., a job executed in the service related to the image data representing the image to be printed by the recording unit 14); and the PCM data for the sound output job (i.e., a job executed in the service related to the PCM data representing the sound to be output by the sound output unit 18).

When the output data is received from the function server, the MFP 10 executes an output operation (i.e., printing of an image, outputting of sound and the like) based on the output data. Then, the MFP 10 transmits MFP status information to the function server 30.

Upon receipt of the output data of the function server 30, the MFP 10 executes output process based on the output data (e.g., printing of the image, sound output, or the like). Then, the MFP 10 transmits the MFP status information to the function server 30.

When the MFP status information is received from the MFP 10, the function server 30 transmits the service status information notifying of the status of the function server 30 and the service to the MFP 10.

Next, processes respectively executed by the control units 11, 21 and 31 of the MFP 10, directory server 20 and the function server 30 will be described.

(1) Process by the Directory Server

Figure 7:
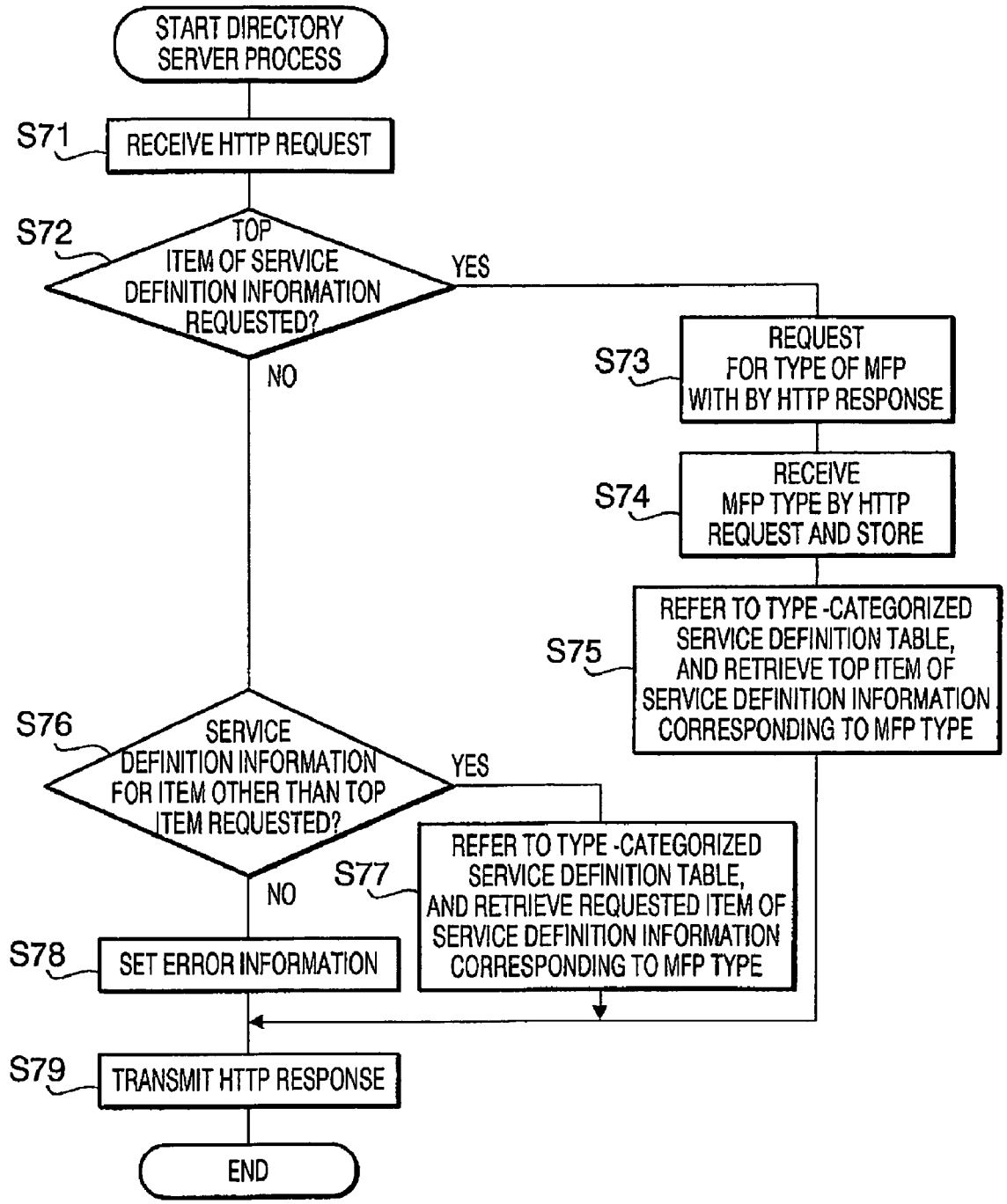
FIG. 7 is a flowchart illustrating a directory server process in accordance with aspects of the present invention.

Firstly, a directory server process which is executed by the control unit 21 of the directory server 20 will be described referring to FIG. 7.

The directory server process is started when an HTTP request is issued by the MFP 10. In S71, control receives the HTTP request. In S72, control judges whether the content of the received HTTP request is for requesting top of the service definition information 25. If the contents of the HTTP request is to request for the top of the service definition information 25 (S72: YES), control requests the MFP 10 for the type of the MFP 10 using the HTTP response (S73).

Next, as control receives the type information using the HTTP request, the type information is stored in the storage unit 23 (S74). Then, in accordance with the type-categorized service definition information ID table, the requested service definition information ID is converted, and service definition information 25 corresponding to the converted ID is retrieved from the service definition information storage unit 24 (S75). It should be noted that the type-categorized service definition information ID table is configured that an ID at an intersection of a type name row and requested service definition information ID column is used as the converted requested service definition information ID. That is, the service definition information 25 corresponding to the replaced ID has been converted to one appropriate to the function/capability of the current type. Thus, for example, if the MFP 10 is of a type which can print a color image on an A4 size sheet, the data defined by Print_Description tag is composed of pieces of data corresponding to the type of the MFP 10. Similarly, if the MFP is of a type which can print a monochromatic image on a B4 size sheet, the data defined by Print_Description tag is composed of data corresponding to such a type.

When control finishes step S75, control proceeds to S79.

If the contents of the HTTP request are not ones requesting for the top of the service definition information 25 (S72: NO), control judges whether the contents of the HTTP request are for requesting for ones other than top of the service definition information 25 (S76). If the HTTP request requests for one other than the top of the service definition information 25 (S76: YES), control refers to the type-categorized service definition ID table based on the type information stored in the storage unit 23 and the requested service definition information ID, and retrieves the service definition information 25 from the service information storing unit 24 (S77). Then, control proceeds to S79.

In S76, if the contents of the HTTP request are not ones requesting for one other than the top of the service definition information 25 (S76: NO), control sets error information (S78), and proceeds to S79.

In S79, control transmits the service definition information 25 or error information to the MFP 10 as the HTTP response, and finishes the directory server process.

(2) Process Executed by MFP

Next, processes performed by control unit 11 of the MFP 10 will be described.

(2-1) MFP Process

Figure 9:
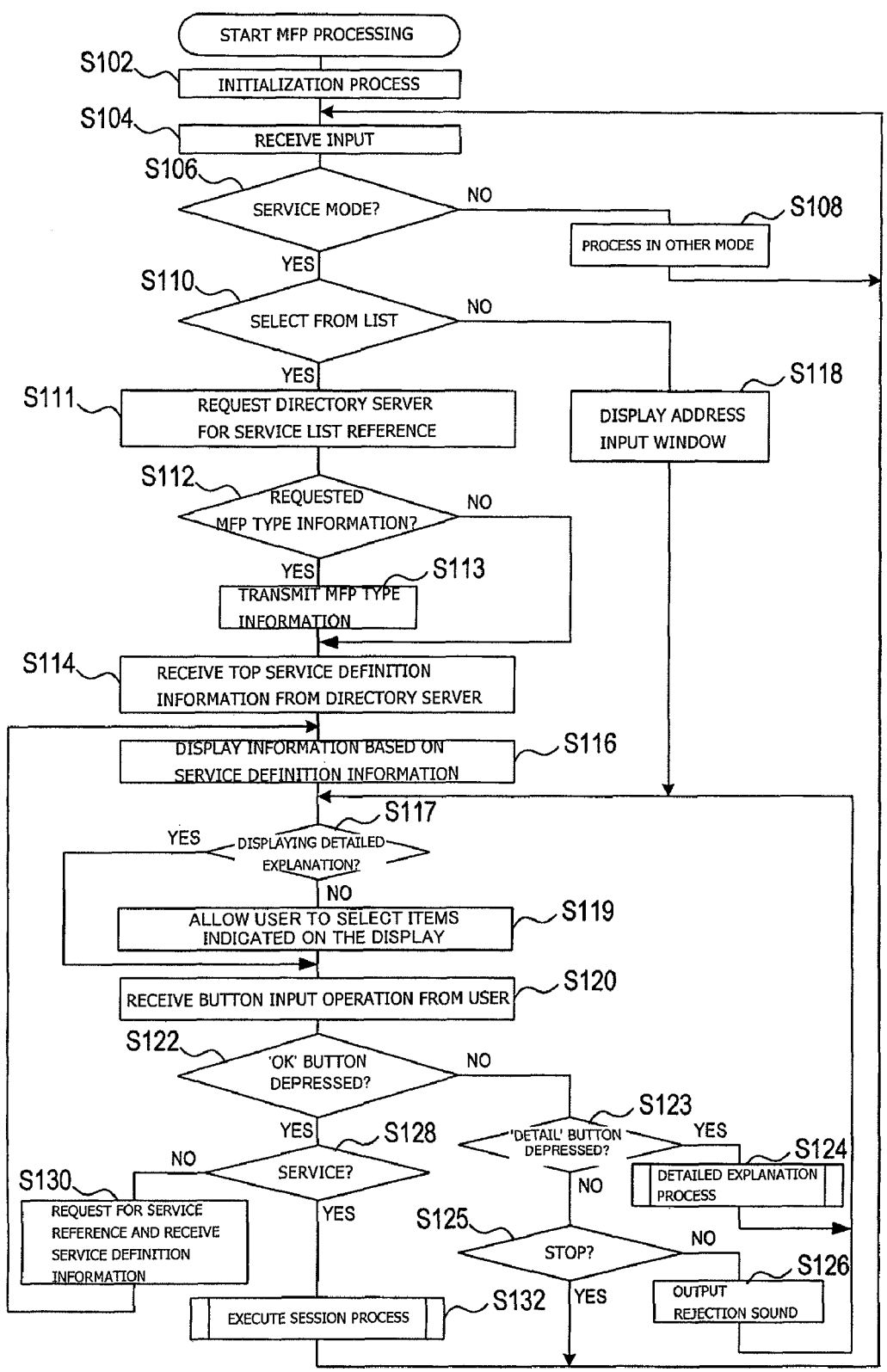
FIG. 9 is a flowchart illustrating an MFP process in accordance with aspects of the present invention.

First, an MFP processing which is repeatedly performed after MFP 10 has been booted is explained, referring to FIG. 9.

When the MFP process has been booted, initialization processing is performed (S102). After completion of the initialization process, if an instruction from an external source, for example, input operation using the operation unit 12 or input of instruction signals via the network 1 is generated (S104), whether the content of the input is for changing the operation mode to a service mode is judges (S106). In this illustrative embodiment, when the service key 44 of the operation unit 12 is depressed, it is determined that the input instruction is for changing the operation mode to the service mode. As will be described later, the "service mode" is to request the function server 30 to provide a service.

If it is determined in S106 that the content does not call for change to service mode (S106: NO), the process is returned to S104 after performing a process for another operation mode according to the input content (S108).

Figure 10:
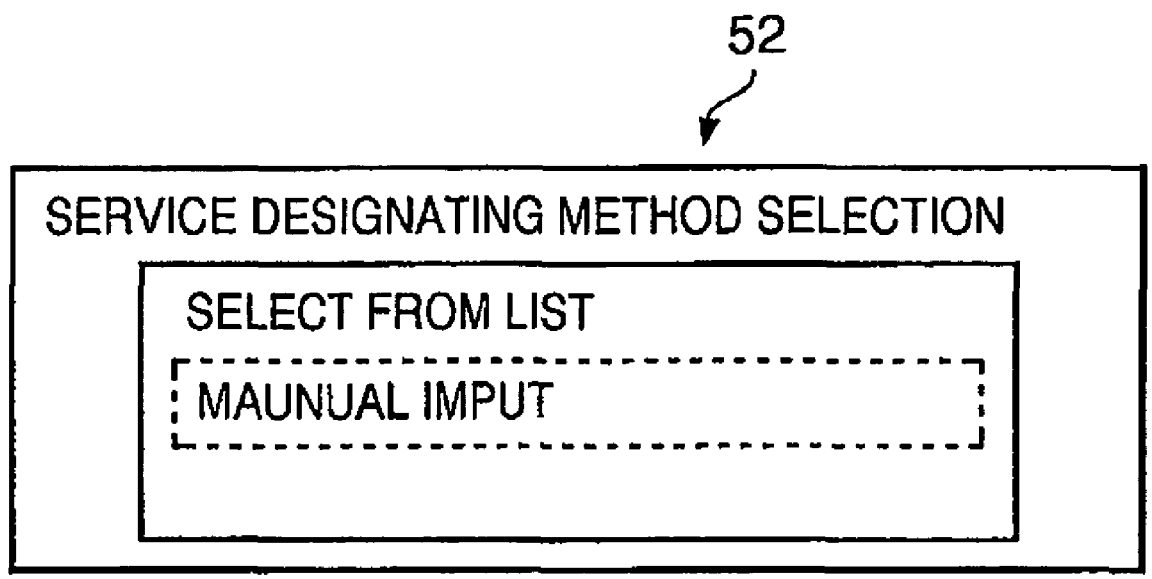
FIG. 10 shows a designation method selecting window in accordance with aspects of the present invention.

If it is determined in S106 that the content is for the change to the service mode (S106: YES), the process allows the user to select a method for specifying the service to be requested from the function server 30 (S110). According to the illustrative embodiment, a method selection window shown in FIG. 6 is displayed on the display 52, and the user is asked to select whether to specify the service from a list ("Select from list" in FIG. 10) or by directly entering the request destination address ("Direct input" in FIG. 10). After the selection window has been displayed, the user can select either designating method using the operation unit 12.

In S110, if the designation from the list is selected (S110: YES), the process requests the directory server 20 for the top item of the service definition information 25 (S111). In this illustrative embodiment, as an address at which a request for the top item of the service definition information 25 is transmitted, the address preliminarily stored in the storage unit 16 is used, and the HTTP request is transmitted to the directory server at the address, thereby requesting for a list of the services.

When the service definition information 25 is requested, the directory server 20 may request for the type information of the MFP 10 with the HTTP response. Therefore, in S112, the process judges whether the directory server 20 requests for the type information of the MFP 10. If the type information has been requested (S112: YES), the process transmits the type information of the MFP 10 to the directory server 20 using the HTTP request (S113). If the type information has not been requested for (S112: NO) or if the type information has been transmitted to the directory server 20, the top item of the service definition information 25 is transmitted form the directory server 20. Thus, the process receives the service definition information 25 (S114). Then, in accordance with the received service definition information 25, a service selection window is displayed on the display 52 (S116).

If a step S116 is performed after the top item of the service definition information 25 is received, a category selection window is displayed. The category selection window is configured such that, as shown in FIG. 12A, the characters "Directory Service" are allocated to the upper part of the display area of the display 52 as the display title (Title) and characters "data storage service", "printing service" and "copy application services", which are the items representing selectable categories (Link_Title), are allocated to the lower part of the display area, in accordance with the top item of the service definition information 25 (XML description) as shown in FIG. 11. In the service selection screen in this case, the ID of different service definition information 25 corresponding to the category is assigned as a link (see "Link_Location" in FIG. 11). If one of the items is selected and the OK key 50 is depressed by the user, a request for the service definition information 25 of the ID corresponding to the selected item is transmitted to the directory server 20. After one of the items (including a title for display) is selected, if the display key 53, the print key 54, the sound key 55, the sound+display key 56, the sound+print key 57 or the recommendation key 58 is depressed, the selected item is explained in detail in accordance with the selected method.

If a step S116 is performed after receiving an item other than the top time of the service definition information 25, as an illustrative example, If the service definition information 25 related to "copy application services" is received, the service selection window is displayed such that the characters "Copy Services" are allocated to the upper part of the display area as the display title (Title) and characters "copy with watermark", "translation copy", "manuscript read out" and "voice-text conversion", which are the selectable categories (Link_Title), are allocated to the lower part of the display area as shown in FIGS. 12B and 12C, in accordance with the service definition information 25 (XML description) as shown in FIG. 13.

In this illustrative embodiment, since the display is limited, if all the items cannot be displayed at a time, the image window can be scrolled so that the arranged items are scrolled up/down. FIGS. 12B and 12C show the window when the list has been scrolled up/down. In addition, in the service selection window in this case, the ID of different service definition information corresponding to the items are assigned as link (see "Link_Location" in FIG. 13). When one of the items is selected, if the OK key 50 is depressed by the user, a request for the service definition information 25 of the ID corresponding to the selected item is transmitted to the function server 30. After one of the items (including a title for display) is selected, if the display key 53, the print key 54, the sound key 55, the sound+display key 56, the sound+print key 57 or the recommendation key 58 is depressed, the selected item is explained in detail in accordance with the selected method. For example, if a service item "translation copy" is selected and the display key 53 is depressed, the explanation of the translation copy service as shown in FIG. 12D is displayed on the display 52.

In S110, if designation by direct input of the request destination address is selected (S110: NO), the process displays an address input window (not shown) for allowing the user to directly input the address on the display 52 (S118), and the process proceeds to the next step (S120).

In this way, after the service selection screen or the address input screen has been displayed, the user can select any of the items (address input operation), depress each key, or terminate the service mode (termination operation) through the operation unit 12.

In S116 following S117, the process checks whether the detailed explanation is currently displayed on the display 52. If the detailed explanation is not displayed (S117: NO), the process allows the user to select an item (including the title for display) (S119), and proceeds to S120.

If the detailed explanation is currently displayed on the display 52 (S117: YES), the process proceeds to S120 where the process allows the user to perform a key operation. In S122, the process judges whether the OK key 50 is depressed in S120.

If it is determined that the operation is not an operation to depress the OK key 50 (S122: NO), the process checks whether a detail explanation key (i.e., the display key 53, the print key 54, the sound key 55, the sound+display key 56, the sound+print key 57 or the recommendation key 58) is depressed (S123). If it is determined that the detailed explanation key is depressed (S123: YES), a detailed explanation process (described later) is executed (S124), and the process returns to S117.

If it is determined that the detailed explanation key has not been depressed (S123: NO), the process judges whether the cancel key 51 has been depressed (S125). If it is determined that the cancel key 51 has been depressed (S125: YES), the process returns to S104 and finishes the operation in the service mode. If it is determined that the cancel key 51 has not been depressed (S125: NO), the process output a rejecting sound (e.g., buzzer sound) in S126, and returns to S117.

If it is determined in S122 that the input operation is an operation to depress the OK key 50 (S122: YES), the process further checks whether a link selected at that time is a link to a service (i.e., an ID for requesting the function server 30 to provide a service) (S128).

If it is determined in s128 that it is not a link to a service, or in other words, it is an ID for different service definition information 25 (S128: NO), the process requests the directory server 20 for the service definition information 25 for the ID. Then, after receiving the service definition information 25 (S130), the process returns to S116 and displays the service selection window on the display 52.

If it is determined in S128 that it is a link to a service (S128: YES), the process executes a session process (see FIG. 14) in S132, and then returns to S104, thereby finishing the process in the service mode.

(2-2) Session Process

Next, the session process, which is called at S132 in FIG. 9, will be explained in detail with reference to FIG. 14 and FIG. 15.

In the session process, first, the service to be used is selected and the service is booted in accordance with Link_Location of service definition information 25 (or the address, if it has been directly entered) (S202). That is, by transmitting a service start-up instruction to the service address by the HTTP request, the service selected by the user is booted on the function server 30. A session ID is returned as the HTTP response from the function server 30 which has received the service start-up instruction.

Next, the process receives the session ID returned from the function server 30 in accordance with the service start-up instruction at S204. It should be noted that, unless explicitly stated, the HTTP requests and HTTP responses transmitted/received in subsequent processes are all transmitted/received with the session ID included therein. The function server 30, which is to receive the HTTP request, is configured to manage the currently communicating device in accordance with the session ID (known session management).

Next, an "MFP instruction inquiry" for inquiring the existence of instructions for the MFP 10 is transmitted to the function server 30 as an HTTP request (S206). If an instruction for MFP 10 has been generated, the function server 30 which received the "MFP instruction inquiry" returns an instruction indicating the generated instruction (otherwise, an instruction indicating "no instructions" if no instructions have been generated) as the HTTP response.

Next, after the instruction (i.e., the MFP instruction) returned in response to the inquiry in S206 has been received (S208), the process judges whether the received instruction is a job start-up instruction (S208). The "job start-up instruction" is generated by the function server 30 after transmitting the service start-up instruction in S202. The job start-up instruction includes instructions to start one of "UI job", "input job (scan job or voice job)", and "output job (print job or speaker job)", depending on the timing and service content. To this job start-up instruction, a job ID of the job to be activated, a type of job (UI job, input job (scan job or voice job), or output job (print job or speaker job)) and the communication destination address of the job have been added.

If it is determined in S210 that the received instruction is a job start-up instruction (S210: YES), the resources required to start up the job is secured (S212), and then the job that is instructed to start is performed in steps S252 to S266, described below.

Next, steps S252 through S266 will be described with reference to FIG. 15.

First, the process judges whether the job instructed by the job start-up instruction is a UI job (S252). If it is determined to be the UI job (S252: YES), the job is started according to the job ID and communication destination address attached to the job start-up instruction (S254). Then, the process proceeds to the next step (S214 of FIG. 14). The UI job is performed simultaneously with other process after being started-up in S254 and is described in detail in "UI Job process" with reference to FIG. 16.

If the process determines that the job designated by the job start-up instruction is not the UI job (S252: NO), but is the scan job (S256: YES) or the voice job (S256: NO, S262: YES), which belong to the input job, the process proceeds to the next step (S214 in FIG. 14) after the input job is started up in accordance with the job ID and communication destination address attached to the job start-up instruction (S260). The input job is performed in parallel with other process after being started up in S260 and is described in further detail in "Input Job" with reference to FIG. 19.

If has been determined that the job designated by the job start-up instruction is not any of the foregoing jobs (S258: NO), but a print job (S258: YES) or a speaker job (S262: NO, S264: YES), which belong to the output job, the process proceeds to the next step (S214 in FIG. 14) after the output job is started up in accordance with the job ID and communication destination address attached to the job start-up instruction (S266). This output job is performed in parallel with other process after being started up in S266 and will be described in further detail in "Output Job" with reference to FIG. 20.

If it has been determined that the job instructed by the job start-up instruction is not any of the foregoing jobs (S264: NO), the process proceeds to the next step (S214 in FIG. 14) without starting up a job.

Figure 14:
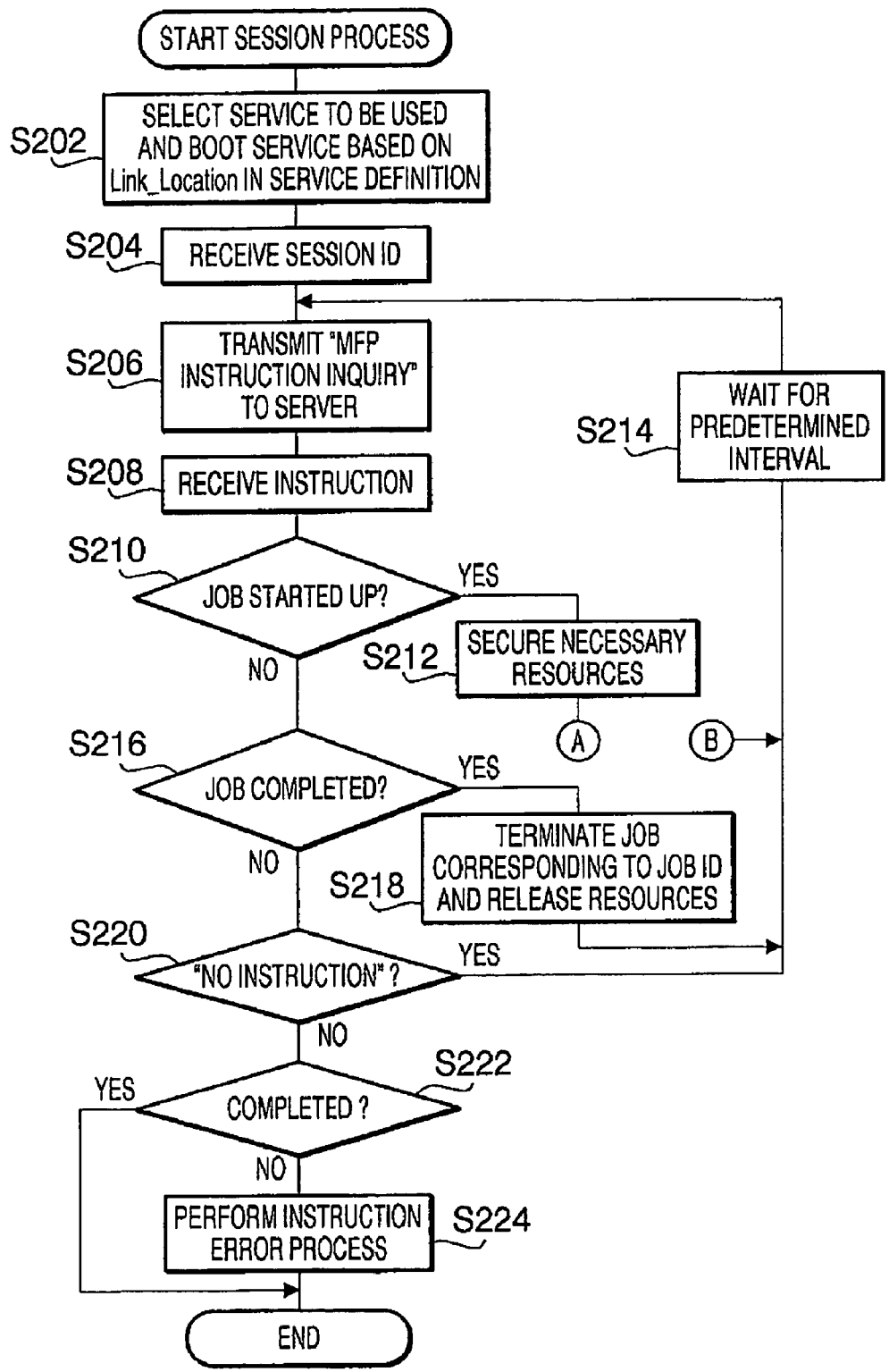
FIGS. 14 and 15 show a flowchart illustrating a session process in accordance with aspects of the present invention.

After the job is started up, the process returns to FIG. 14 and, after pausing for a predetermined interval (S214), returns to S206.

If the process determines that the instruction is not the job start-up instruction (S210: NO), the process judges whether the instruction received in S208 is a job completion instruction (S216). This "job completion instruction" is generated by the function server 30 when the job is finished after started up in respective steps in FIG. 15. In the job completion instruction, a job ID of the completed job is attached.

If the process determines that the instruction is a job completion instruction (S216: YES), the job having the job ID attached to this job completion instruction is terminated (a completion instruction is sent to the relevant job) and the process proceeds to S214 after the resources, which was secured in S212 before the job was started up, is released (S218).

If the process determines that the received instruction is not the job completion instruction (S216: NO), the process judges whether the instruction indicates "no instructions" (S220). If "no instructions" is indicated (S220: YES), the process proceeds to s214. If "no instruction" is not indicated, the process judges whether the instruction is a session completion instruction (S222). The "session completion instruction" is generated by the function server 30 when the provision of service to the MFP 10 has been completed.

If the process determines that the instruction is a session completion instruction (S222: YES), the present session process is completed. If the instruction received in S208 is not any of the foregoing instructions, the session process is completed after a process for notifying an error (i.e., an instruction error process) is performed (S224). In S224, an error message is displayed 52.

(2-3) UI Job

Figure 15:
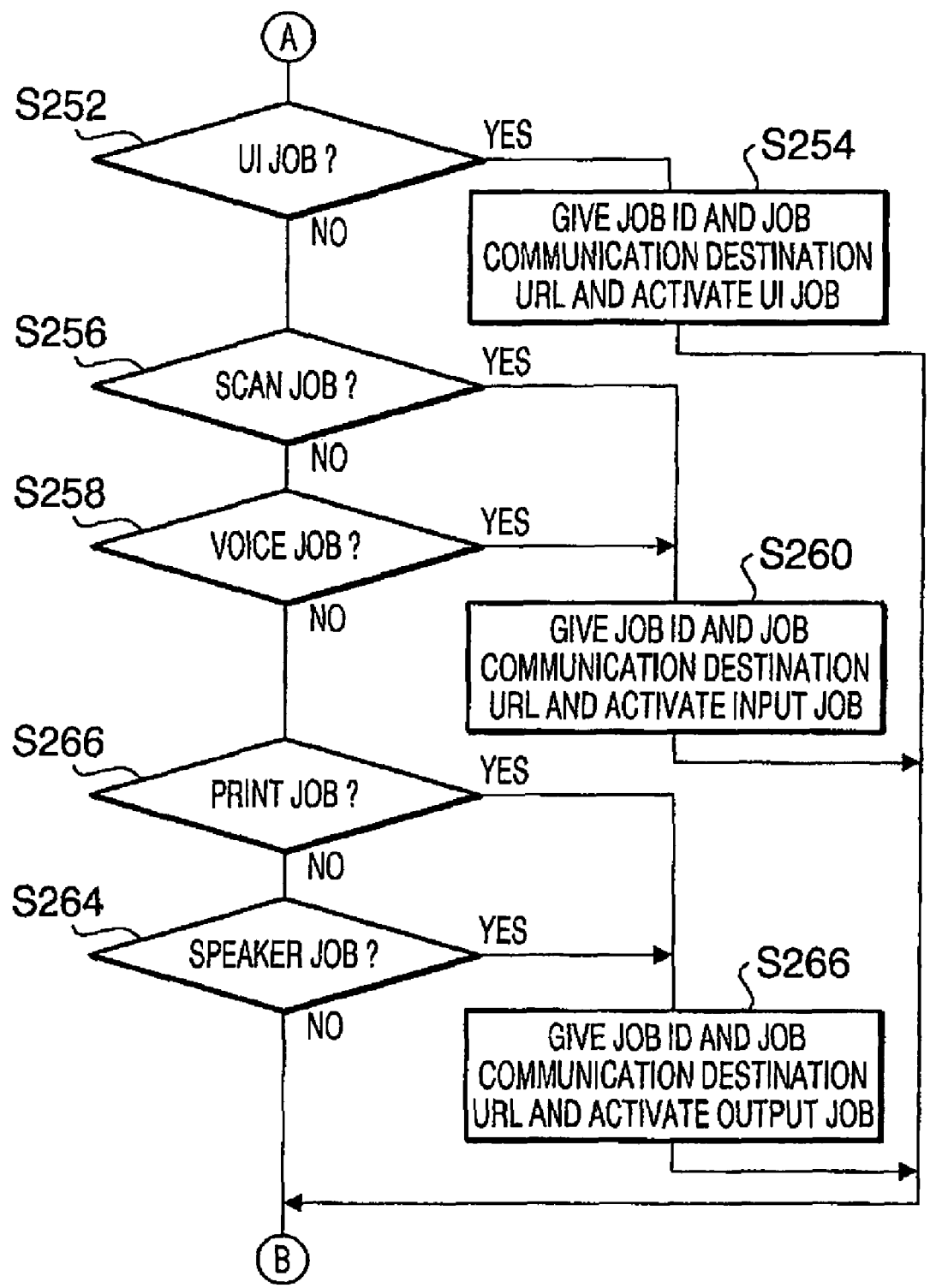
Figure 16:
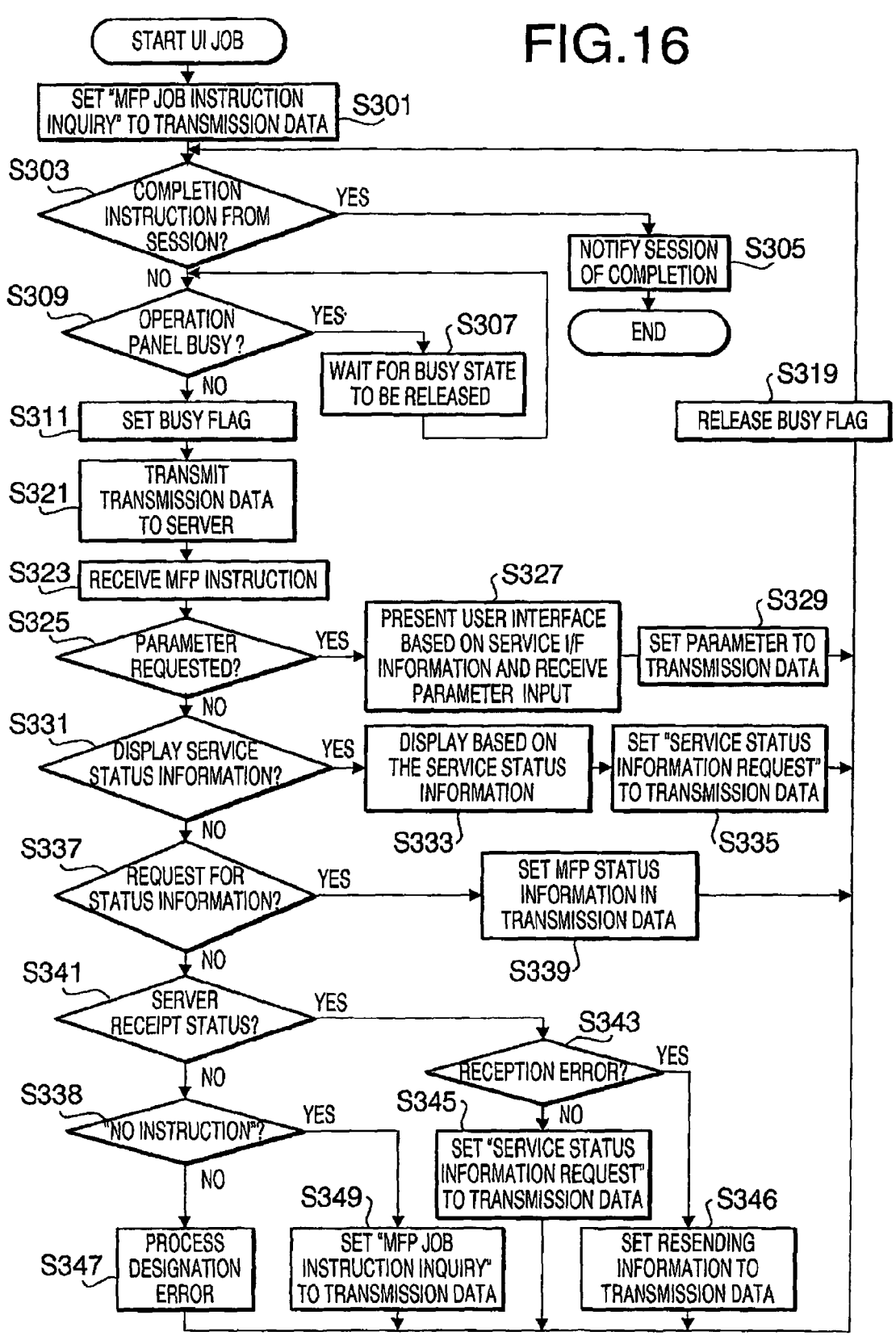
FIG. 16 is a flowchart showing a UI job process executed by an MFP in accordance with aspects of the present invention.

Next, the UI job started up in S254 in FIG. 15 is explained in detail with reference to FIG. 16.

When the UI job is started, a "service I/F information transmission request" for requesting the function server 30 to transmit the service I/F information 36, and an URL specifying the request destination of the request are stored in a predetermined area as transmission data. The transmission data will be used in S321 (described later), and the information stored as the transmission data will be transmitted to the function server 30 together with the session ID and job ID. It should be noted that the storage area of the transmission data is defined in a RAM (not shown) provided in the control unit 11 of the MFP 10 (S301).

Next, the process judges whether the completion instruction is received from the session process (S303). This completion instruction is given in S218 of FIG. 14.

If it is determined that there has been a completion instruction from the session processing (S302: YES), the present UI job is terminated after the completion of UI job is notified to the session process (S305). The session completion instruction is received during the processing in S218 of FIG. 14. In step S218, when the instruction is received, it is determined that the job has been completely terminated, and subsequent processes will be performed.

If it is determined that the completion instruction has not been received from the session process (S303: NO), the process determines whether the operation unit 12 is in a busy status (S309). In this step, a busy flag Fu is referred to. The busy flag Fu is set ("1" is set) when each job has been started up. If the busy flag Fu is set (i.e., equal to "1"), the operation unit 12 is in the busy status, while, if the busy flag Fu is not set (i.e., equal to "0"), the operation unit 12 is not in the busy status.

If the operation unit 12 is busy (S309: YES), the process returns to S309 after waiting until the operation unit 12 is released from its busy state, i.e., until the busy flag Fu is released (S307). If the operation unit 12 is not busy (S309: NO), the busy flag Fu is set (S311) and the operation unit 12 becomes busy as the present UI job is being performed.

Next, the information stored in the transmission data storage area is transmitted to the function server 30 with session ID and job ID as an HTTP request (S321). The function server 30 received the HTTP request returns the MFP instruction as the HTTP response if there is an instruction to the current UI job.

If the process receives the MFP instruction transmitted as the HTTP response (S323), the process judges whether the instruction is a parameter request (S325). The parameter request is a request transmitted in S904 of FIG. 25 (UI job process) executed in the function server 30. Based on the service I/F information 36 added to the parameter request, the user is requested to designate parameters necessary for using the service.

If the process determines that the received instruction is a parameter request (S325: YES), based on the service I/F information 36 added to the parameter request, a parameter input window is displayed on display 52 and the user is asked to perform parameter setting operation (S327).

The parameter input screen display is described using service I/F information 36 corresponding to the translation copy service as an example. When the translation copy service is executed, the function server 30 recognizes text information by applying an OCR (Optical Character Recognition) process to image data, which is read by the reading unit 13 of the MFP 10, then generates image data representing text translated into a predetermined language, which is printed by the recording unit 14 of the MFP 10.

Figure 18A:
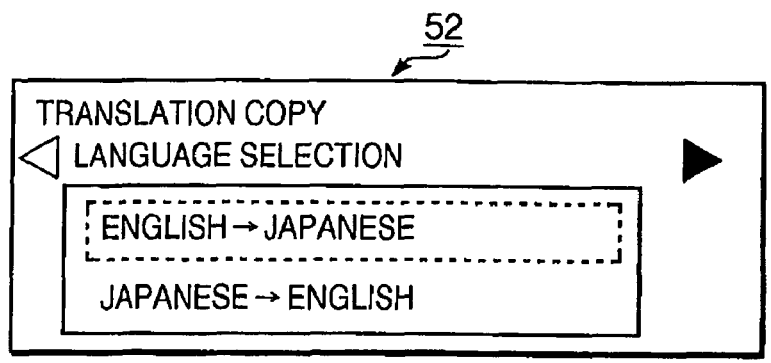
FIGS. 18A-18E show a parameter input window in accordance with aspects of the present invention.

First, based on a XML description shown in FIG. 17, a parameter input window as shown in FIG. 18A is displayed. In the parameter input window, as shown in FIG. 18A, the letters "translation copy" are indicated at the upper part of the display area as the display title (Title), the characters "language selection" are allocated below the display title as an input item (Disp_Name), and below the "language selection", the characters "English→Japanese" and "Japanese→English", which are items (Disp_Select) indicating the selectable parameters of the input item, "language selection", are indicated. Although there are further input items "scanner setting", "print setting", and "comments" related to "translation copy", in addition to the foregoing "language selection", only input items regarding "language selection" is shown at this time. This is merely due to limitations in the size of the display 52, and in this illustrative embodiment, the input items shown in the lower part of the display area can be switched between four types, including "scanner setting", "print setting", and "comments", by pressing the left and right direction keys 48 and 49 (switching operation, described hereafter) from this state as shown in FIGS. 18B-18E.

Figure 18B:
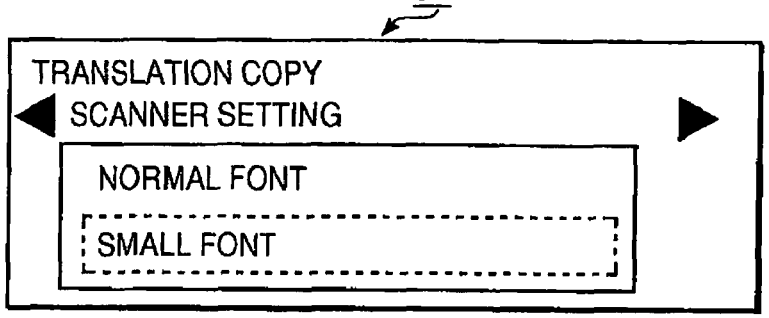

With regards to the selectable parameters of the input items, the characters "normal font" and "small font" are shown as the items (Disp_Select) indicating selectable parameters for "scanner setting" (see FIG. 18B). The "normal font", in this illustrative embodiment, means that the resolution (reading resolution), which is a parameter of reading unit 13, is 300×300 dpi, and the "small font" means the resolution is 600×600 dpi.

Figure 18C:
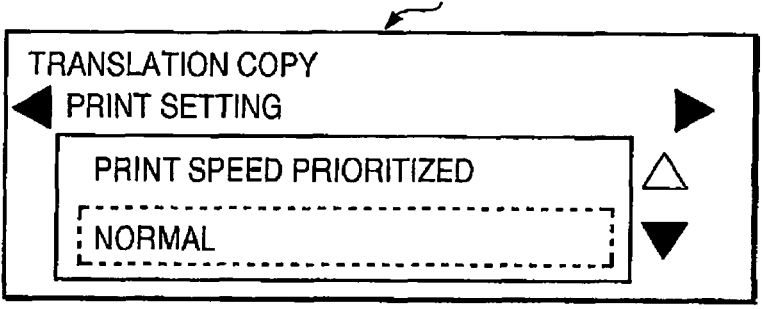
Figure 18D:
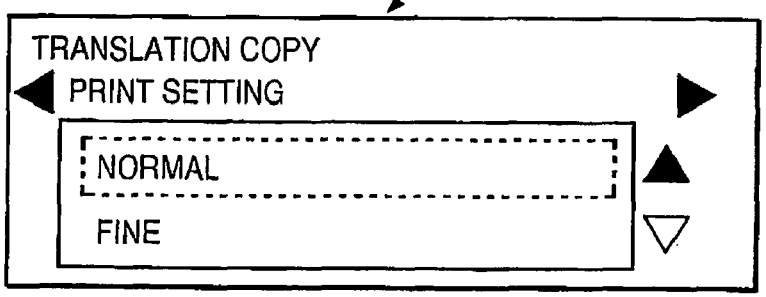

Characters "printing speed prioritize", "normal", and "fine" are shown as the items (Disp_Select) indicating selectable parameters for "print setting" (refer to FIG. 18C). Although "fine" is not initially shown due to limitations in the size of display 52 (refer to FIG. 18C), it can be shown by scrolling the window (refer to FIG. 18D). The "printing speed prioritized" means the resolution (printing resolution), a parameter of the recording unit 14, is set to 200×200 dpi, "normal" means the resolution is set to 300×300 dpi, and "fine", 600×600 dpi in this illustrative embodiment.

Figure 18E:
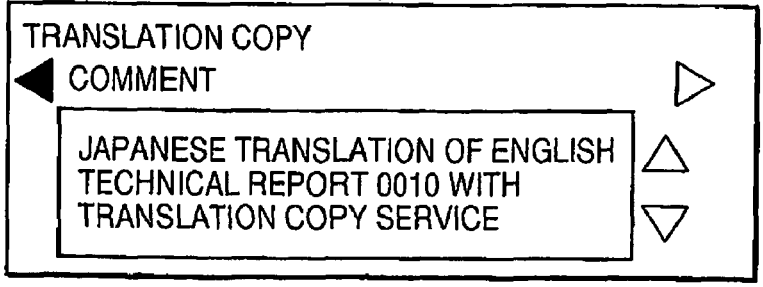

With regards to "comments", an entry field is shown below the characters "comment" and the set character string (Default_String) is entered (refer to FIG. 18E). The character string entered in the entry field as a comment may be used as the header or footer of an image when printed.

When the parameters are designated for each input item, character strings are input in entry fields, and a confirming operation of the designated items are performed after the parameter input window is displayed, the process stored the input information (i.e., parameters) in a storage area as the transmission data (S329). Then, the process releases the busy flag Fu (i.e., set the flag Fu to "0") (S319), and returns to S303.

If the MFP instruction received in S323 is determined not to be the parameter request (S325: NO), the process judges whether the received MFP instruction is a display instruction of the service status information (S331). The service status information display instruction is an instruction issued by the function server 30 (S926 of FIG. 25), which is for notifying whether an operation regarding the service is performed without any problem, the service will be terminated due to some problem, or the like.

If the process determines that the instruction is a display instruction of the service status information (S331: YES), a display based on this service status information is displayed on the display 52 (S333), and a service status information request which requests for information on the service operation status provided by the function server 30 is stored in the transmission data storage area as the transmission data (S335). Then, the process releases the busy flag Fu (S319), and returns to S303.

If the process determines that the instruction is not the service status information display instruction (S331: NO), the process judges whether the MFP instruction received in S323 is the status information request (S337). The status information request is an instruction requesting for the information regarding the status of the MFP 10.

If the process determines that the instruction is the status information request (S337: YES), the process stores the information regarding the status of the MFP 10 (e.g., run-out of sheet, cover opened, etc.) in the storage area as the transmission data (S339). The, the process releases the busy flag Fu (S319), and returns to S303.

If the process determines that the instruction is not the status information request (S337: NO), the process judges whether the MFP instruction received in S323 is an instruction representing the server receipt status (S341). The server receipt status is the instruction for notifying whether the function server 30 was able to receive the information transmitted from the MFP 10.

If the instruction is a server reception status (S341: YES), control proceeds to S343. Then, if the content of this server reception status indicates abnormal reception (NG) (S343: YES), information that triggers the transmission of this server reception status is stored in the storage area as the transmission data (S346). Then, the process releases the busy flag Fu (S319), and returns to S303. If the content of the server reception status does not indicate the abnormal reception (S343: NO), the process proceeds stores the service status information request in the storage area as the transmission data (S345), releases the busy flag Fu (S319), and returns to S303.

If the instruction received in S323 is not the server reception status (S341: NO), the process judges whether the MFP instruction received in S323 represents "no instructions" (S338). If the instruction represents "no instructions" (S338: YES), the process proceeds to S349 where the process stores the MFP job instruction inquiry in the data storage area as the transmission data. Thereafter, the process releases the busy flag Fu (S319), and returns to S303. If the received instruction does not represent "no instructions" (S338: NO), an error processing is performed (S347), and the process releases the busy flag Fu (S319), and returns to S303. The error processing in S347 may include storing information indicating the occurrence of an error as the transmission data, displaying information indicating the occurrence of the error on the display 52, and the like.

(2-4) Input Job

Figure 19:
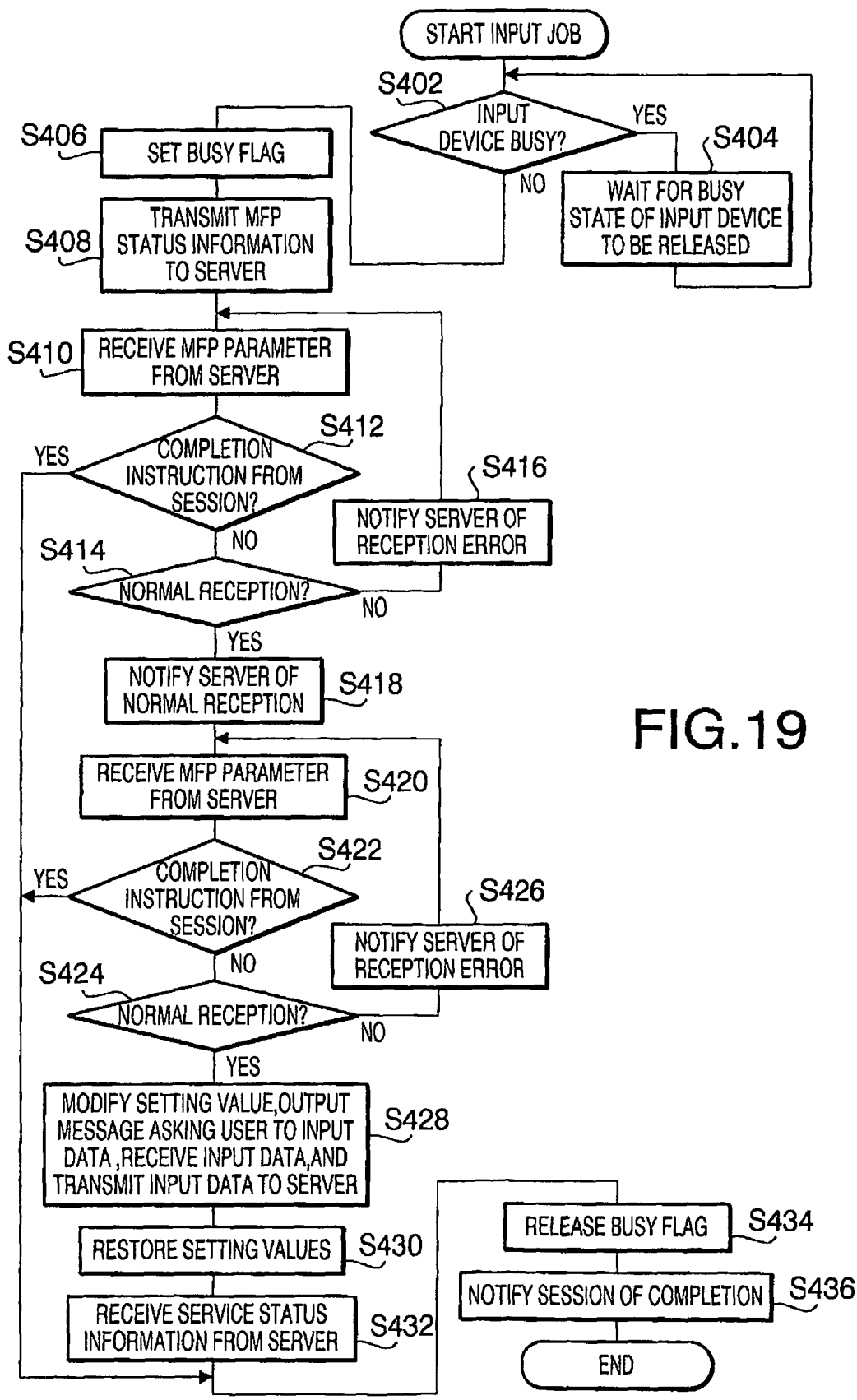
FIG. 19 is a flowchart illustrating an input job process executed by the MFP in accordance with aspects of the present invention.

Next, the input job process activated in S260 of FIG. 15 will be described in detail with reference to FIG. 19. The input job shown in FIG. 19 is executed in parallel with the session process and the UI job described above.

When the input job is started, the process judges whether the input device is in the busy state (S402). In this illustrative embodiment, the input device is determined to be in the busy state if the busy flag Fi is set (i.e., set to "1"), while the input device is determined not to be in the busy state if the flag is released (i.e., set to "0"). It should be noted that, according to the illustrative embodiment, the "input device" may be the reading unit 13 when receiving the service related to the image data generated in the reading unit 13, and may be the sound input unit 17 when receiving the service related to the sound data generated in the sound input unit 17.

If the process determines that the input device is in the busy state (S402: YES), the process waits until the input device is released from its busy state (S404), then returns to S402. If the input device is not in the busy state, the process sets the busy flag Fi (S406).

Next, the process transmits the MFP status information, related to the MFP 10 status, by the HTTP request to function server 30, together with the job ID assigned to in S260 in the session process (S408). When the MFP status information is received, the function server 30 returns the MFP parameter, which is information generated based on the parameter transmitted to function server 30 in S321 of FIG. 16 as the HTTP response.

If the MFP parameter is returned (S410) in response to the MFP status information transmitted in S408, the process judges whether the completion instruction has been received from the session process (i.e., whether the completion instruction is issued by the session process) in S412. The completion instruction is given from the session process to the input job when the job to be completed in S218 of FIG. 14 is the input job.

When the completion instruction has not been given from the session process (S412: NO), if the MFP parameter returned in S410 has not been received successfully (S414: NO), the MFP reception status for notifying that the information from the function server 30 cannot be received normally (i.e., abnormal reception (NG)) is transmitted to the function server 30 by the HTTP request (S416), together with the job ID given in S260 in the session process. As the function server 30 which received the MFP reception status transmits the MFP parameter again as the HTTP response, the process returns to S410 after execution of S416.

If, in S410, the MFP parameter has been received successfully (S414: YES), the MFP reception status for notifying that the information from the function server 30 was received normally (i.e., normal reception (OK)) is transmitted to the function server 30 by the HTTP request (S418), together with the job ID assigned to in S260 in the session process. The function server 30 which received the MFP reception status returns an input data request requesting for transmission of data to be processed by the function server 30, as will be described later.

Next, if the input data request is returned from the function server 30 which received the MFP reception status (S420), the process judges whether the completion instruction is given by the session process (S422).

When the session process has not given the completion instruction (S422: NO), if the input data request returned in S420 has not been received successfully (S424: NO), the MFP reception status for notifying of the abnormal reception (NG) is transmitted to the function server 30 (S426), as in s416. When received the MFP reception status, the function server 30 transmits the input data request again, as explained later, and thus, the process returns to S420 after execution of S426.

If the input data request returned in S420 has been received successfully (S424: YES), the input data to be processed by the function server 30 is transmitted by the HTTP request to the function server 30 (S428), together with the job ID assigned to in S260 of the session process.

Specifically, the setting values of the input device is changed to the values indicated by the MFP parameter received in S410, and then a data input window asking the user to input data to be processed by the function server 30 on the display 52, thereby asking the user to perform input operation for inputting data in the MFP 10. Then, the data obtained from the user (i.e., input data) is transmitted to the function server 30 by the HTTP request, together with the job ID assigned to in S260 in the session process. For example, messages such as "set original and press OK key", "pick up handset and speak" and the like are displayed on the display 52, and then, data acquired through the reading unit 13 and/or the sound input unit 17 is transmitted to the function server 30 subsequently. The function server 30 which received the input data may return the service status information for notifying whether the data processing according to the input data has been completed successfully.

The method for acquiring data in the process may be retrieval of data from a memory card set in a memory card slot (not shown) or readout of data from a certain storage area in the storage unit 16. In such a case, a message asking the user to specify the storage area from which the data is retrieved is to be displayed on the display 52.

After the input data is transmitted to the function server 30, the setting of the input device modified in S428 is returned to the original values (S430), and subsequently, the service status information returned from the function server 30 is received (S432).

When the service information is received in S432, or if, in S412 and S422, the session process gave the completion instruction (S412: YES; S422: YES), the busy flag Fi set in s406 is released (S434), and the completion of the input job is notified to the session process together with the job ID assigned in S260 in the session process (S436), and the input job is finished. The notification of completion of the input job is received during the step S218 of the session process shown in FIG. 14. That is, in S218, when the instruction is received, the process determines that the job has been completely terminated and following steps are executed.

(2-5) Output Job

Next, the output job process activated in S266 of FIG. 15 will be described with reference to FIG. 20. The output job operates in parallel with the session process and the UI job.

When the output job is started, first, the process judges whether the output device is in the busy state (S502). In this step, the output device is determined to be in the busy status if a busy flag Fo is set (i.e., set to "1") and is determined not to be in the busy state when the flag is released (i.e., set to "0"). According to the illustrative embodiment, the "output device" is the recording unit 14 when receiving the service related to image data that is to be printed by the recording unit 14, and is the sound output unit 18 when receiving the service related to sound data that is to be output from the sound output unit 18.

If the process determines that the output device is in the busy status (S502: YES), the process waits until the output device is released from its busy state (S504), and the returns to S502. If the process determines that the input device is not in the busy status (S502: NO), busy flag Fo is set (S506).

Next, the MFP status information representing the MFP 10 status is transmitted by the HTTP request to the function server 30, together with the job ID assigned to in S266 in the session process (S508). The function server 30, which received the MFP status information, returns the MFP parameter, which is information based on parameter transmitted to the function server 30 in S321 of FIG. 16 as the HTTP response.

Next, when the MFP parameter is returned in response to the MFP status information transmitted in S508 (s510), the process judges whether the completion instruction has been given from the session process (i.e., whether there is a completion instruction from session) in S512. This completion instruction is given from the session process to the output job when the job to be completed in S218 of FIG. 14 is the output job.

When the process determines in S512 that the completion instruction has not been received from the session process (S512: NO), if the MFP parameter returned in S510 has not been successfully (S514: NO), the MFP reception status for notifying that the information from function server 30 has not been received successfully (i.e., abnormal reception (NG)) is transmitted to the function server 30 by the HTTP request (S516), together with the job ID assigned to in S266 in the session process. The function server 30 which received the MFP reception status transmits the MFP parameter again, and thus, the process returns to S510 after execution of S516.

If the MFP parameter can be received successfully (S514: YES), the MFP reception status for notifying that the information from the function server 30 has been received successfully (normal reception (OK)) is transmitted to the function server 30 by the HTTP request (S518), together with the job ID assigned to in S266 in the session process. The function server 30 which has received the MFP reception status returns data (i.e., the output data) created by the process based on the input data transmitted in S428 of FIG. 19, as will be described later.

If the output data is returned from the function server 30 which has received the MFP reception status (S520), the process judges whether the session process has given the completion instruction (S522), as in s512.

When it is determined in S522 that the completion instruction has not been given by the session process (S522: NO), if the output data returned in S520 has not been received successfully (S524: NO), the MFP reception status for notifying of the abnormal reception (NG) is transmitted to the function server 30 (S526), as in S516. The function server 30 which received the MFP reception status transmits the output data again, as will be described later, and thus, the process returns to S520 after execution of S526.

If the output data returned in S520 has been received successfully (S524: YES), the process outputs the output data through the output device (S528). Specifically, the setting values of the output device are modified to the values represented by the MFP parameter received in S510, and then, the output data is output through the output device (e.g., images are printed in accordance with the image data, sound waves are output in accordance with the sound data).

When the output data has been output by the output device, the setting of the output device modified by the processing in S528 is returned to the original values (S530), and the MFP status information, which is information related to the MFP 10 status, is sent to the function server 30 by the HTTP request (S532), together with the job ID assigned to in S260 in the session process. The function server 30 which received the MFP status information returns the service status information, as will be described later.

After the service status information returned from function server 30 has been received (S534), or when the completion instruction has been received from the session process (S512: YES; S522: YES), the busy flag Fo set in s406 is released (S536) and the completion of the input job is notified to session processing together with the job ID assigned in S260 of the session process (S538), the present input job is finished. The notification of the completion of the input job is received during the process executed in S218 of FIG. 14. In S218, when the instruction is received, it is determined that the job has been completely terminated and the following processes are executed.

(2-6) Detailed Explanation Process

Figure 28:
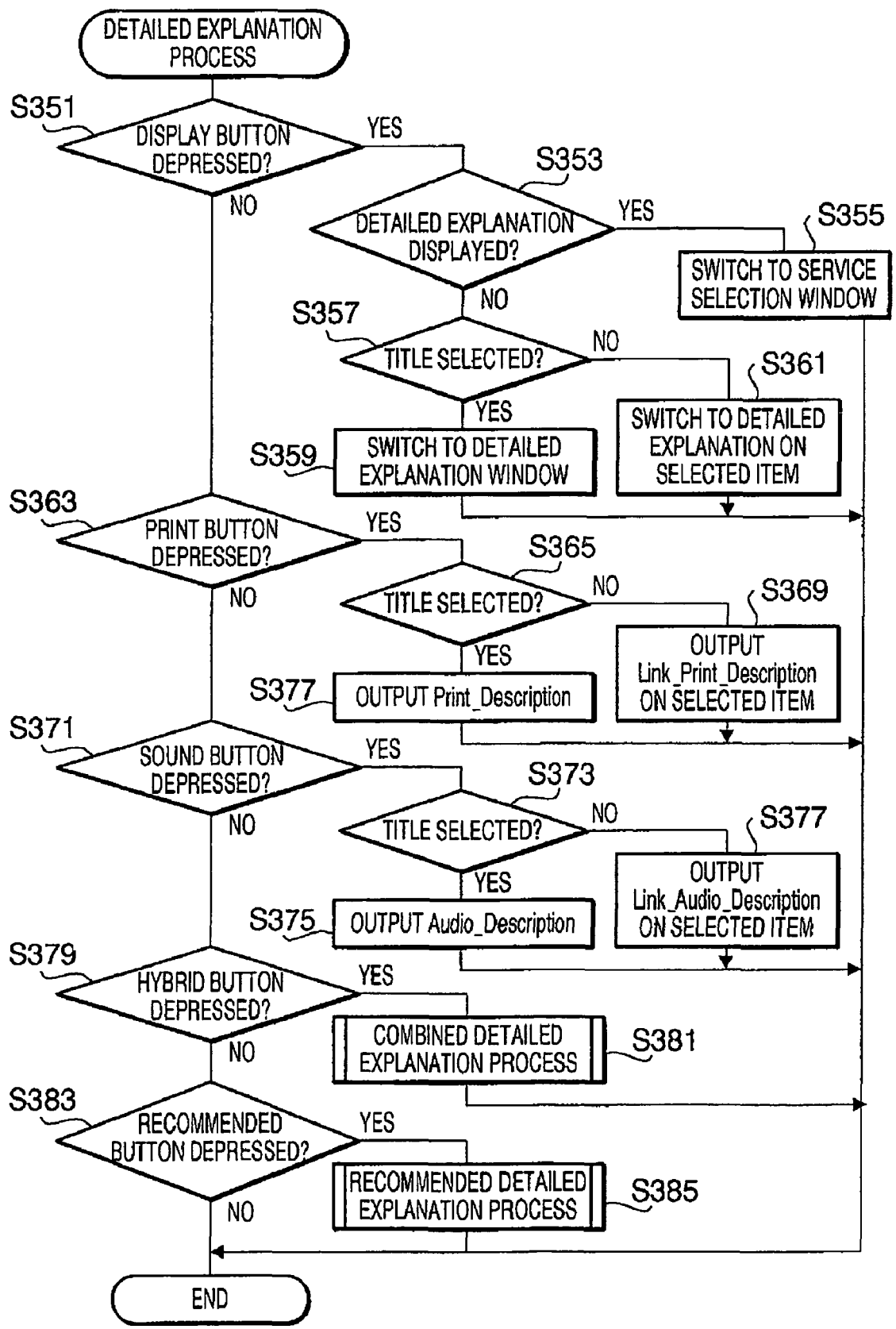
FIG. 28 is a flowchart illustrating a detailed explanation process executed by the MFP in accordance with aspects of the present invention.

Next, referring to FIG. 28, the detailed explanation process stared in S124 of FIG. 9 will be described. It should be noted that when the detailed explanation process is finished, the process proceeds to a step following S124 of FIG. 9.

When the detailed explanation process is stared, the process judges whether the display key 53 is depressed (S351). If the display key 53 has not been depressed (S351: NO), the process judges whether the print key 54 is depressed (S363). If the pint key 54 is not depressed (S363: NO), the process judges whether the sound key 55 is depressed (S371). If the sound key 55 is not depressed (S371: NO), the process judges whether one of the hybrid keys (i.e., sound+display key 56, sound+print key 57) is depressed (S379). If none of the hybrid keys are depressed (S379: NO), the process judges whether the recommendation key 58 is depressed (S383). If the recommendation key 58 is not depressed (S383: NO), the process finishes the detailed explanation process, and returns to the step following S124 of FIG. 9.

If the process determines that the display key 53 is depressed (S351: YES), the process judges whether a detailed explanation is being displayed in S353. If the detailed explanation is being displayed (S351: YES), the process return to display the service selection window (S355), and finishes the detailed explanation process.

If the process determines that the detailed explanation is not being displayed (S353: NO), the process judges whether the tile displayed on the display 52 is being selected (S357). The title referred to the above is an item on the display corresponding to a character string sandwiched by <Title> tag and </Title> tag. When the title displayed on the display 52 is selected (e.g., highlighted) (S357: YES), the display is switched to a detailed explanation window in which character strings sandwiched by <Description> tag and </Description> tag of the service definition information 25 are displayed on the display 52 (S359), and the process finishes the detailed explanation process. In the following description, item(s) sandwiched by start tag and end tag will be referred to as " item(s)", where "" will be replaced with a name of the tag.

In the above example, the character strings sandwiched by the <Description> tag and </Description> tag will be referred to as a Description item(s).

If the title displayed on the display 52 is not being selected, that is, a link is being selected (S357: NO), the detailed description window is displayed by displaying a Link_Description item corresponding to the selected link is displayed on the display 52 (S361), then the process finishes the detailed explanation process. It should be noted that the Description item and the Link_Description item are configured as shown in FIG. 34A. It should be noted that the example shown in FIG. 34A is a detailed explanation regarding a translation copy. The user can manually display the detailed explanation on the display 52 intentionally, and from which the user can learn the function of the translation copy.

If it is determined that the print key 54 is depressed (S363: YES), the process judges whether the title displayed on the display 52 is being selected (S365). If the title on the display 52 is being selected (S365: YES), a Print_Description item is output as a printed material using the recording unit 14 (S367), and the process finishes the detailed explanation process. If the title on the display 52 is not being selected but a link is being selected (S367: NO), a Link_Print_Description item corresponding to the selected link is output as a printed material using the recording unit 14 (S369), and the process finishes the detailed explanation process. It should be noted that the Print_Description item and the Link_Print_Description item are composed of data, which is created by encoding data capable of providing the printed material as shown in FIG. 34B in accordance with the well-known Base64 algorithm. The example shown in FIG. 34B is the detailed explanation regarding the translation copy. The user can learn the function of the translation copy by reading the printed explanation, which is output in accordance with the user's intention.

If it is determined that the sound key 55 is depressed (S371: YES), the process judges whether the title shown on the display 52 is being selected (S373). If the title is being selected (S373: YES), the process outputs the Audio_Description item to the sound output unit 18. According to the illustrative embodiment, the Audio_Description item is encoded in accordance with the Base64 algorithm, and it is transmitted to the sound output unit 18 after decoded. It should be noted that all the pieces of data to be transmitted to the sound output unit 18 are encoded, and should be decoded when transmitted to the sound output unit 18. In the following description, for the brevity, such an explanation regarding the decoding of the data may be omitted.

If the title displayed on the display 52 is not being selected, that is a link is being selected (S373: NO), a Link_Audio_Description item corresponding to the selected link is output to the sound output unit 18. For example, the Audio_Description item and the Link_Audio_Description item are composed of data, which is created by encoding character strings as shown in FIG. 34C in accordance with the Base64 algorithm. The example shown in FIG. 34C is the explanation regarding the translation copy. The user can learn the function of the translation copy by listening to the explanation which is output in accordance with the intension of the user, and is converted from the text to sound (voice) by the sound output unit 18.

If the hybrid key (i.e., sound+display key 56, sound+print key 57) is depressed (S379: YES), a combined detailed explanation process is executed (S381), which will be described later. After the combined detailed explanation process is executed, the process finishes the detailed explanation process.

If the recommendation key 58 is depressed (S383: YES), a recommendation detailed explanation process, which will be described later, is executed (S385). Thereafter, the process finishes the detailed explanation process.

(2-7) Combined Detailed Explanation Process

Figure 29:
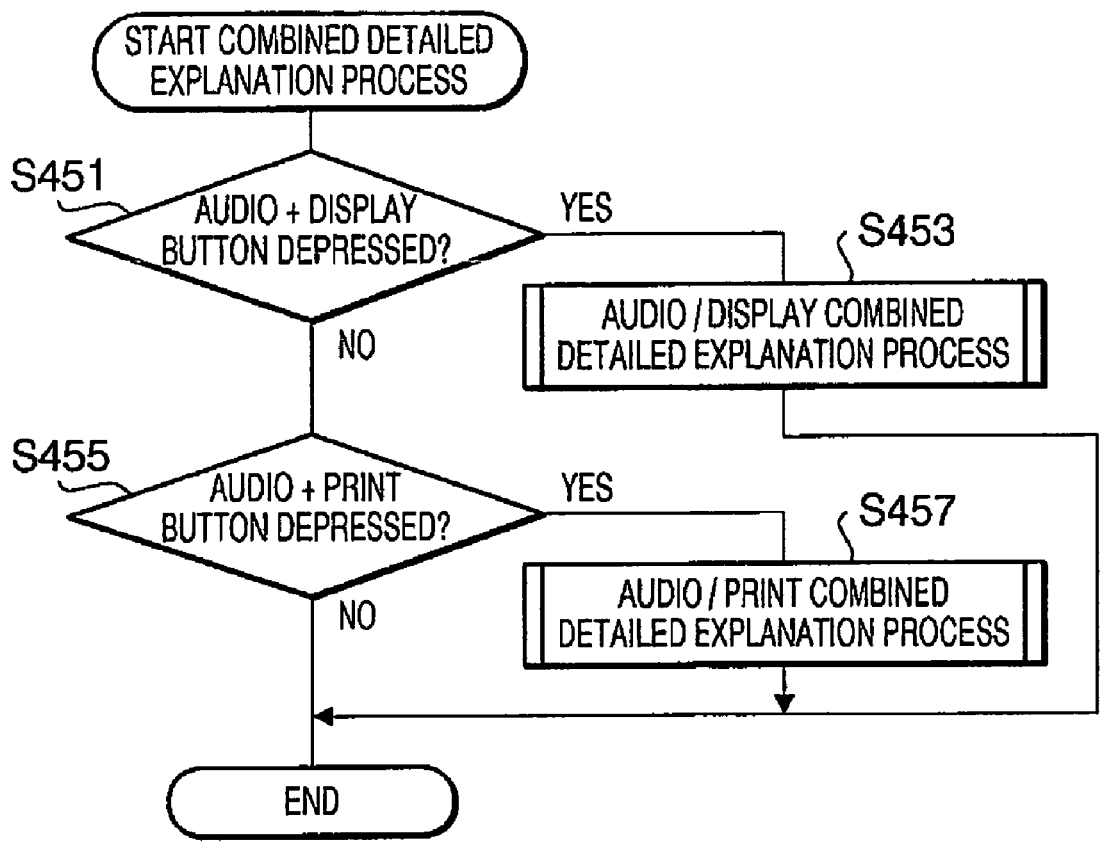
FIG. 29 is a flowchart illustrating a hybrid explanation process executed by the MFP in accordance with aspects of the present invention.

Referring to FIG. 29, the combined detailed explanation process, which is executed in S381 of FIG. 28, will be described. It should be noted that, upon completion of the combined detailed explanation process, the process executes a step following S381 of FIG. 28.

When the combined detailed explanation process is started, the process first judges whether the sound+display key 56 is depressed (S451). If it is determined that the sound+display key 56 is depressed (S451: YES), the process executes the combined detailed explanation using sound and display (S453), and thereafter finishes the combine detailed explanation process.

If it is determined that the sound+display key 56 is not depressed (S451: NO), the process judges whether the sound+print key 57 is depressed (S455). If it is determined that the sound+print key 57 is depressed (S455: YES), a combined detailed explanation using sound and print is executed (S457), and thereafter the combined detailed explanation process is finished.

If it is determined that the sound+print key 57 is not depressed (S455: NO), the process finishes the combined detailed explanation process.

(2-8) Combined Detailed Explanation Using Sound and Display

Figure 30:
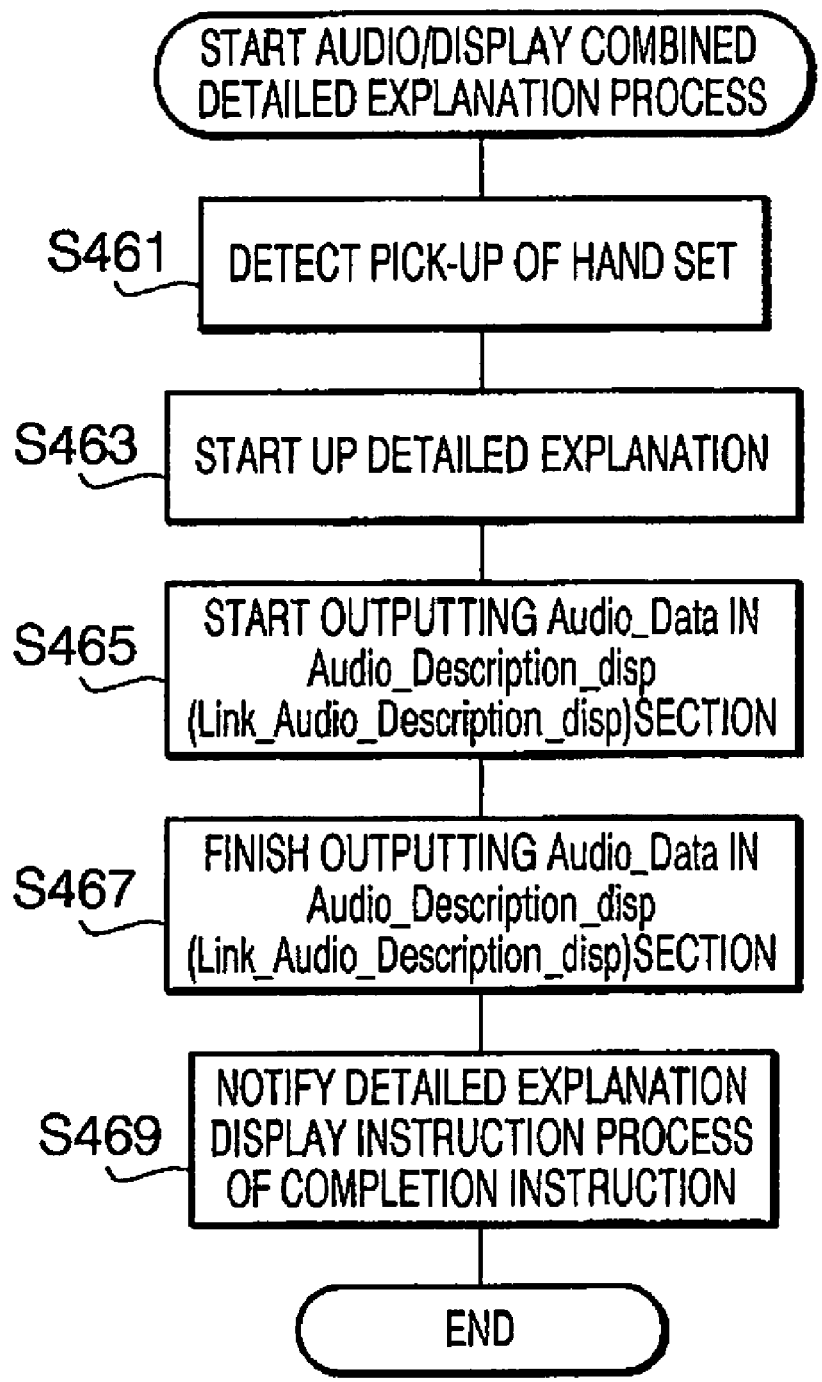
FIG. 30 is a flowchart illustrating an audio/visual explanation process executed by the MFP in accordance with aspects of the present invention.

Next, referring to FIG. 30, the combined detailed explanation using sound and display process will be described. It should be noted that the present process is finished, the process proceeds to a step following S453 of FIG. 29.

When the combined detailed explanation using sound and display process is started, the process judges whether the hand set is picked up (S461). Until the handset is picked up, the process stays at S461. When the hand set is picked up (S461), a detailed explanation display process (described later) is started up (S463). The detailed explanation display process is executed in parallel with the combined detailed explanation using sound and display process.

Next, if the title displayed on the display 52 is being selected, the Audio_Data of an Audio_Description_disp section is retrieved from the service definition information 25 and the process starts transmitting the retrieved data to the sound output unit 18 (S465). Alternatively, if a link displayed on the display 52 is being selected, an Audio_data item of the Link_Audio_Description_disp section is retrieved from the service definition information 25, and the process starts transmitting the retrieved data to the sound output unit 18 (S465).

When the process finished transmitting the retrieved item (S467), the process transmits a completion instruction to the detailed display process started up in S463 (S469), and finishes the combined detailed explanation using sound and display process.

(2-9) Detailed Explanation Display Process

Figure 31:
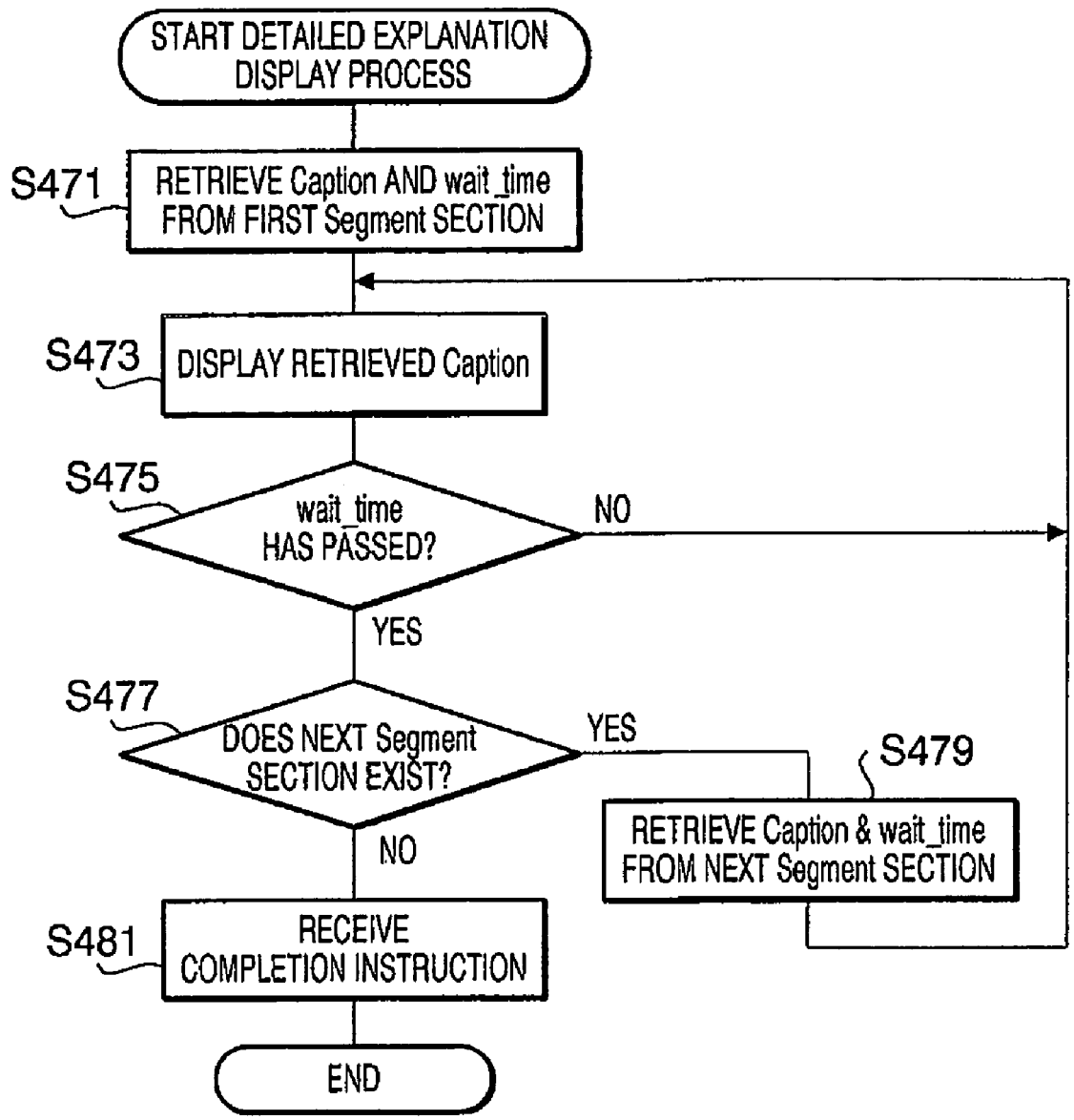
FIG. 31 is a flowchart illustrating an explanation display process executed by the MFP in accordance with aspects of the present invention.

Referring now to FIG. 31, the detailed explanation display process called in S463 of FIG. 30 will be described.

When the detailed explanation display process is started, if the title displayed on the display 52 is being selected, Caption item and wait_time item are retrieved from the service definition information 25 at a first segment section of the Audio_Description_disp section (S471). Otherwise, if a link displayed on the display 52 is designated, the Caption item and a wait_time item is retrieved from the service definition information 25 at the first segment section and the Link_Audio_Description_disp section (S471).

Next, the process displays the retrieved Caption item on the display 52 (S473). Next, the process judges whether a time has elapsed by an amount indicated by the wait_time item (S475). If the time has elapsed, the process keeps displaying the Caption item on the display 52 until the time has elapsed (S475: NO; S473).

In S475, if it is determined that the time corresponding to the amount indicated by the wait_time item has elapsed (S475: YES), the process judges whether another segment section exists (S477). If there is another segment section (S477: YES), the process retrieves the next Caption item and wait_time item from the service definition information 25 in the subsequent section (S479), thereafter the process returns to S473.

If it is determined that there does not there is no segment section (S477: NO), the process waits until the combined detailed explanation using sound and display process issues the completion instruction (see S469 of FIG. 30) in S481. After receiving the completion instruction, the process finishes the detailed explanation display process.

Now, illustrative results of execution of the combined detailed explanation process using sound and display (see FIG. 30) and the detailed explanation display process (see FIG. 31) will be described.

Figure 36A:
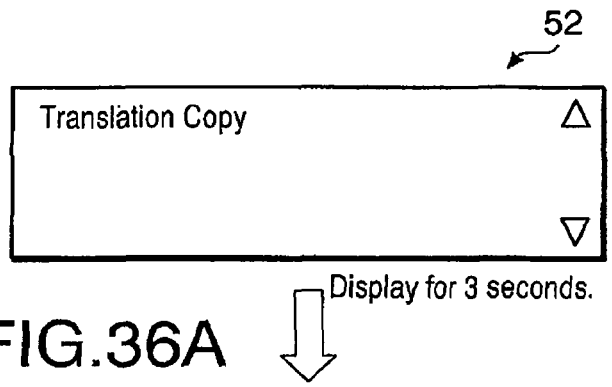
FIGS. 36A-36C show examples of a result of the audio/visual explanation process in accordance with aspects of the present invention.
Figure 36B:
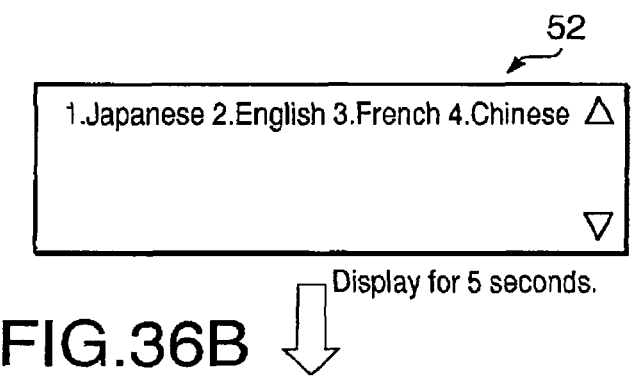
Figure 36C:
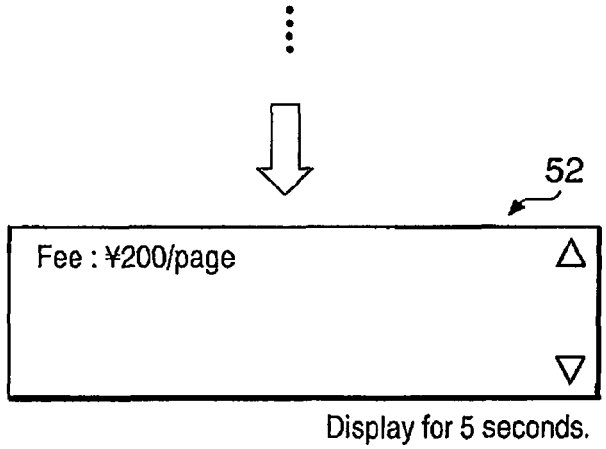

When the process proceeds based on the service definition information 25 shown in FIG. 35, if the user select a link of the translation copy displayed on the display 52, and further depresses the sound+display key 56, a window shown at the top of FIG. 36A is displayed on the display 52 for three seconds. In the window, as shown in FIG. 36A, a character string "Translation Copy" is displayed. This indication corresponds to a caption item of the first segment section of the service definition information 25 shown in FIG. 35. Simultaneously with the display of the window shown at the top of FIG. 36A, the sound (voice message) announcing the text shown at the top section of FIG. 36B is output from the sound output unit 18. Specifically, the voice message saying "The translation copy is a service for printing a translation of a text read through a scanner" is output. The voice message is output based on the result of decoding the Audio_Data item of the service definition information 25 shown in FIG. 35 in accordance with the Base64 algorithm.

When three seconds have elapsed since the window shown at the top of FIG. 36A is displayed on the display 52, a second window shown in FIG. 36A is displayed on the display 52 for five seconds. Specifically, in the second window, character strings "1. Japanese, 2. English, 3. French, 4. Chinese" are displayed. These character strings correspond to Caption items in the of the second segment section shown in FIG. 35. Further_Data item follows the start of the display above substantially at the same time. The output sound is indicated at the second block in FIG. 36B. Specifically, an announcement is "In this service, a text written in Japanese, English, French and Chinese can be translated into a text in another language."

As above, in accordance with the service definition information 25 shown in FIG. 35, the detailed explanation is output by display and sound. At last, the image as shown in the bottom of FIG. 36A for five seconds on the display 52. Specifically, a character string "Usage fee is ¥200/page" is displayed on the display 52, which is followed by the corresponding sound output in accordance with the Audio_Data item substantially at the same time, and the sound (voice) announcement corresponding to the text shown at the bottom block in FIG. 36B is output by the sound unit 18. After the display and sound output above are finished, an image before the present process is executed is displayed on the display 52, and the sound output is terminated. It should be noted that the fee rate "¥200/page" above is only an example, directed to show how the information is displayed.

(2-10) Detailed Explanation Process Using Sound and Print

Figure 32:
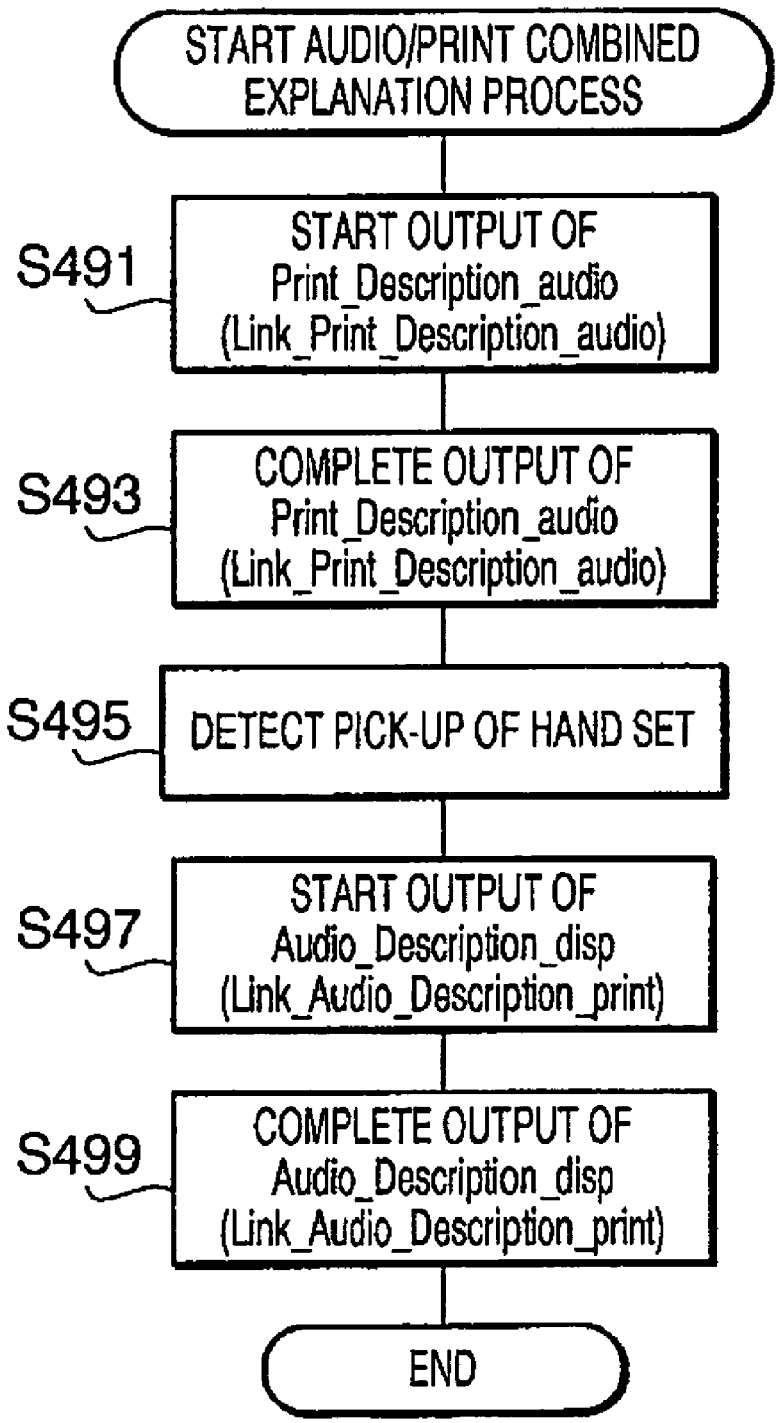
FIG. 32 is a flowchart illustrating an audio/print explanation process executed by the MFP in accordance with aspects of the present invention.

Next, referring to a flowchart shown in FIG. 32, the combined detailed explanation using sound and print will be described. It should be noted that when the combined detailed explanation using sound and print is finished, the process returns to a step following S457 of FIG. 29.

When the combined detailed explanation using sound and print is started, if the tile displayed on the display 52 is being selected, the process retrieves a Print_Description_audio item from the service definition information 25 and have the recording unit 14 output the same (S4919). If a link displayed o the display 52 is being selected, the process retrieves a Link_Print_Description_audio item from the service definition information 25 and has the recording unit 14 output the retrieved item (S491).

After all the items have been output (S493), the process detects pick-up of the handset (S495). It should be noted that, until the handset is picked-up, the process stays at S495. When the pick-up of the handset is detected in S495, if the title displayed on the display 52 is being selected, the process retrieves the Audio_Description_print item from the service definition information 25 and has the sound output unit 18 output the same (S497). If a link displayed on the display 52 is being selected, the process retrieves a Link_Audio_Description_print item from the service definition information 25 and let the sound output unit 18 output the same (S497).

When all the above items have been output (S499), the process finishes the combined detailed explanation using sound and print process.

Illustrative results when the combined detailed explanation using sound and print process is executed will be described.

When the service definition information 25 is used, if the user selects the link of the translation copy and further depresses the sound+print key 57, printed material as shown in FIG. 38A is output from the recording unit 14. The printed material is output based on the result of decoding the Link_Print_Description_audio item of the service definition information 25 shown in FIG. 37 in accordance with the Base64 algorithm. After the printed material has been output, and when the user picks up the handset, a voice message explaining the function/operation of the translation copy as transcribed in FIG. 38B is output from the sound output unit 18. The voice message is output as a result of decoding the Link_Audio_Description_print item in accordance with the Base64 algorithm.

(2-11) Recommendation Detailed Explanation

Figure 33:
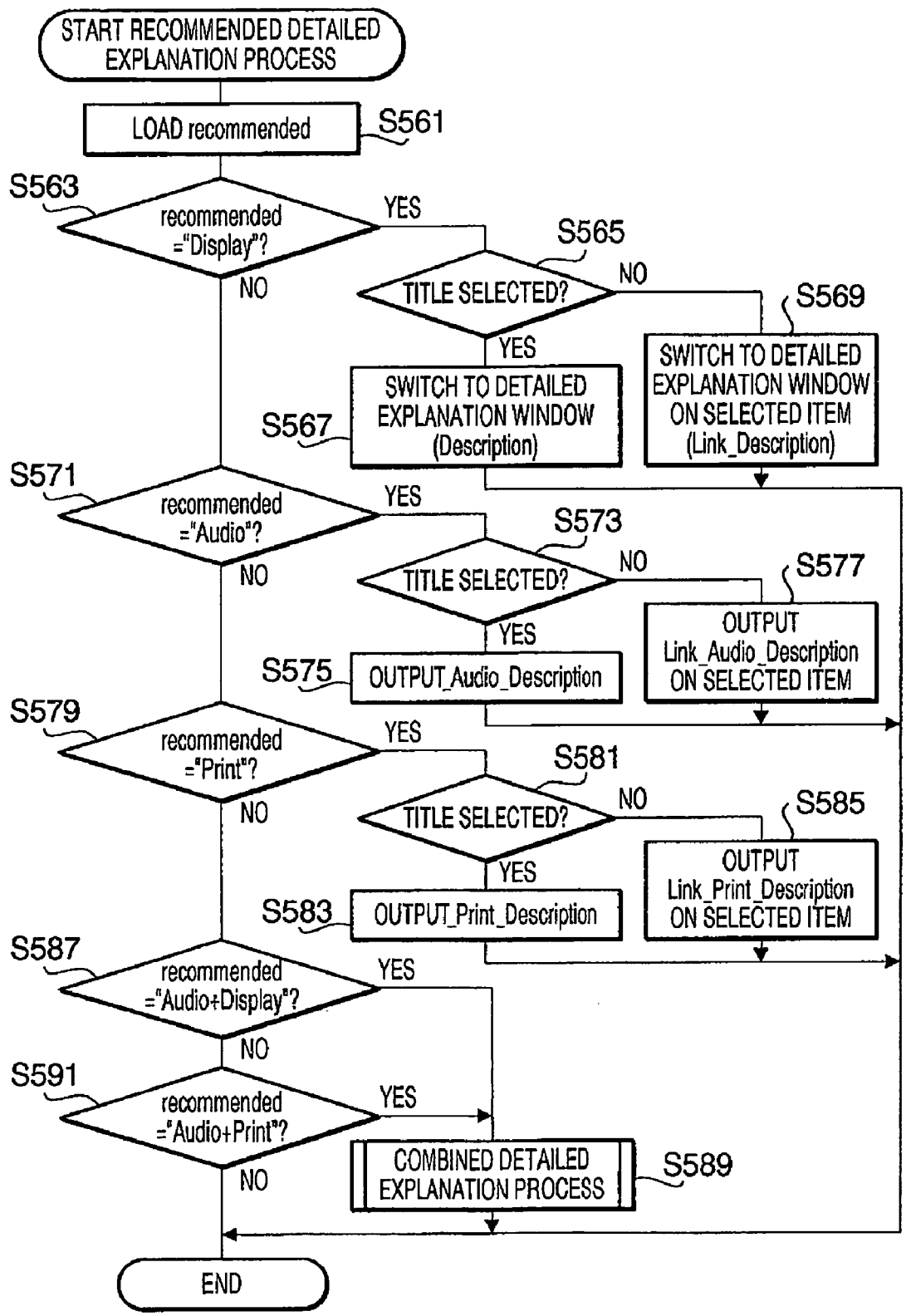
FIG. 33 is a flowchart illustrating a recommended explanation process executed by the MFP in accordance with aspects of the present invention.

Next, referring to FIG. 33, the recommendation explanation process will be described. It should be noted that when this process is finished, the process returns to a step following S385 of FIG. 28.

When the recommendation explanation process is started, the process retrieves a recommended item from the service definition information 25 (S161). Then, depending on the contents of the recommended item, the process diverges (i.e., to S563, S571, S579, S587 or S591).

Specifically, the process firstly judges whether the recommended item is "Display" in S563. If the recommended item is note "Display" (S563: NO), the process judges whether the recommend item is "Audio" (S571). If the recommended item is not "Audio" (S571: NO), the process judges whether the recommended item is "Print" (S579). If the recommended item is not "Print" (S579: NO), the process judges whether the recommended item is "Audio+Display" (S587). If the recommended item is not "Audio+Display" (S587: NO), the process judges whether the recommended item is "Audio+Print" (S591). If the recommended item is not "Audio+Print" (S591: NO), the process finishes the recommendation explanation process.

If the recommended item is "Display" (S563: YES), the process judges whether the title displayed on the display 52 is being selected (S565). If the title is being selected (S565: YES), the process displays a detailed explanation window showing the Description item of the service definition information 25 on the display 52 (S567). If a link is being selected (S565: NO), the process displays the detailed explanation window showing the Link_Description item of the service definition information 25 on the display 52 (S569), then the process finishes the recommendation explanation process.

If the recommended item is "Audio" (S571: YES), the process judges whether the title displayed on the display 52 is being selected (S573). If the title is being selected (S573: YES), the process retrieves the Audio_Description item from the service definition information 25 and let the sound output unit 18 output the same (S575). If a link is being selected (S573: NO), the process retrieves the Link_Audio_Description item from the service definition information 25 and let the sound output unit 18 output the same (S577), then the process finishes the recommendation explanation process.

If the recommended item is "Print" (S579: YES), the process judges whether the title displayed on the display 52 is being selected (S581). If the title is being selected (S581; YES), the process retrieves the Print_Description item from the service definition information 25 and let the recording unit 14 output the same (S583). If a link is being selected (S581: NO), the process retrieves the Link_Print_Description item from the service definition information 25, and let the recording unit 14 output the same (S585), then the process finishes the recommendation explanation process.

If it is determined that the recommended item is "Audio+Display" item (S587: YES), or the recommended item is "Audio+Print" item (S591: YES), the process executes the combined detailed explanation process described above (S589), and thereafter finishes the recommendation explanation process.

An illustrative result of execution of the recommendation explanation process will be described.

When the service definition information 25 shown in FIG. 39 is used and if the user selects the link of the translation copy displayed on the display 52 and depresses the recommendation key 58, the process retrieves the recommended item of the corresponding Link section in the service definition information 25 shown in FIG. 35, i.e., a character string "Print". Then a process when the recommended item is "Print" is executed. That is, the Link_Print_Descritpion item is retrieved from the service definition information 25 and output as printed material from the recording unit 14 (see FIG. 34C or FIG. 38A). The printed material is output based on a result of decoding the Link_Print_Description item in accordance with the Base64 algorithm.

(3) Processing by Function Server 30

Each processing performed by control unit 31 of the function server 30 will be described hereinafter.

(3-1) Function Server Process

Figure 21:
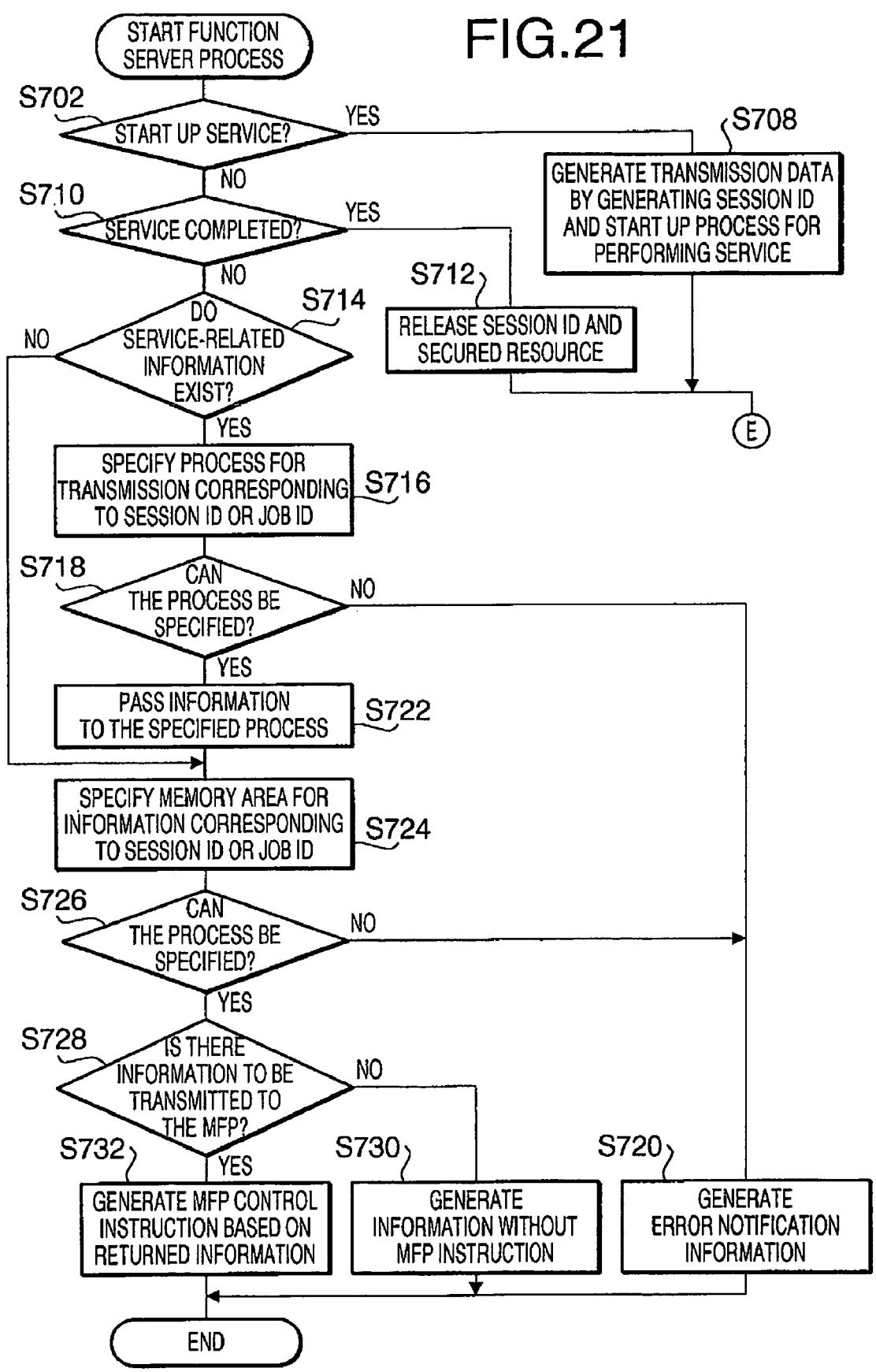
FIGS. 21 and 22 show a flowchart illustrating a function server process executed by a function server in accordance with aspects of the present invention.
Figure 22:
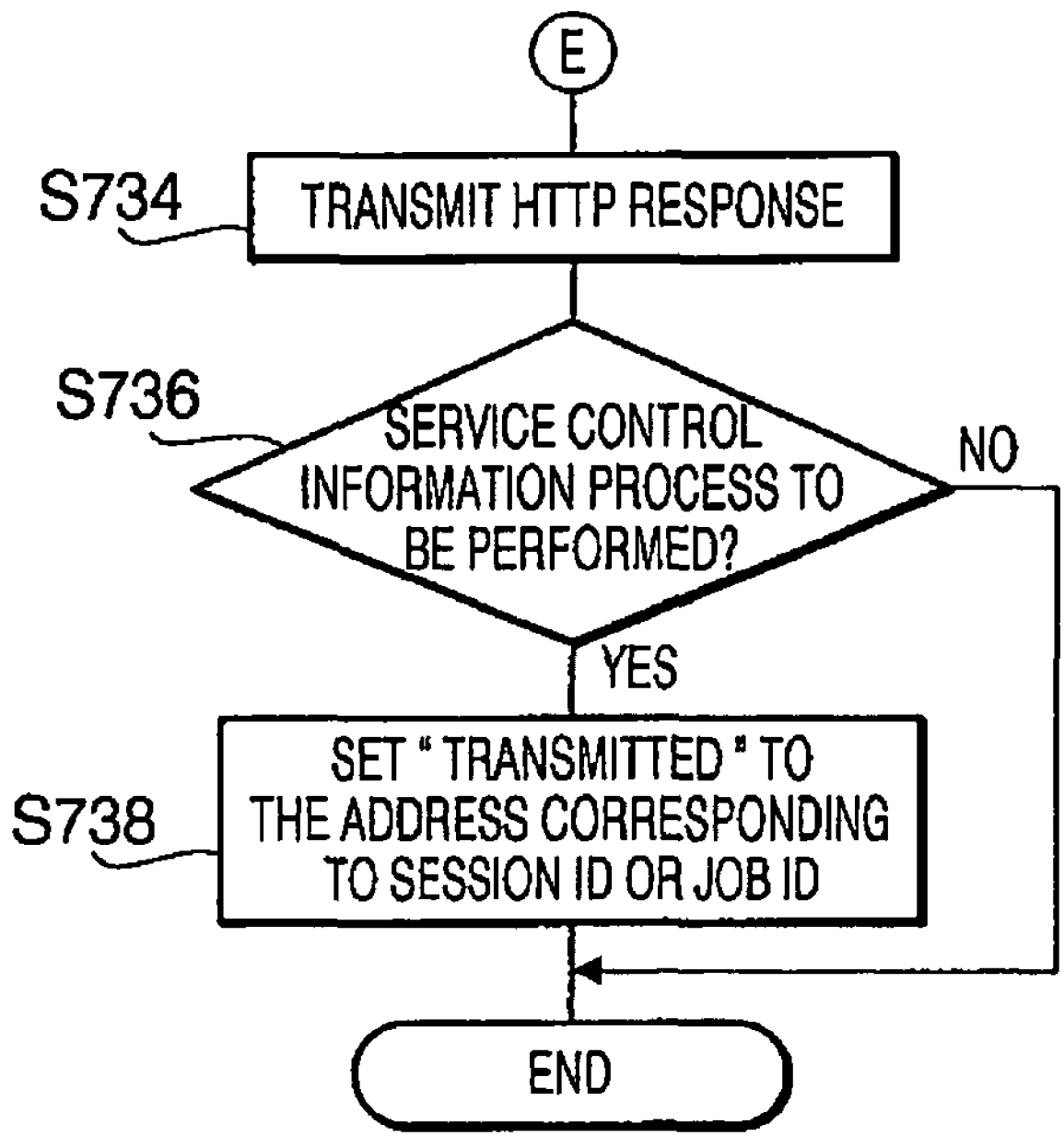

First, the procedures of function server process performed every time when the HTTP request is received is explained, referring to FIGS. 21 and 22.

When the function server process is started, the process judges whether the received HTTP request is a service boot instruction (S702). The "service boot instruction" is transmitted by the MFP 10 in S202 of FIG. 14.

Figure 23:
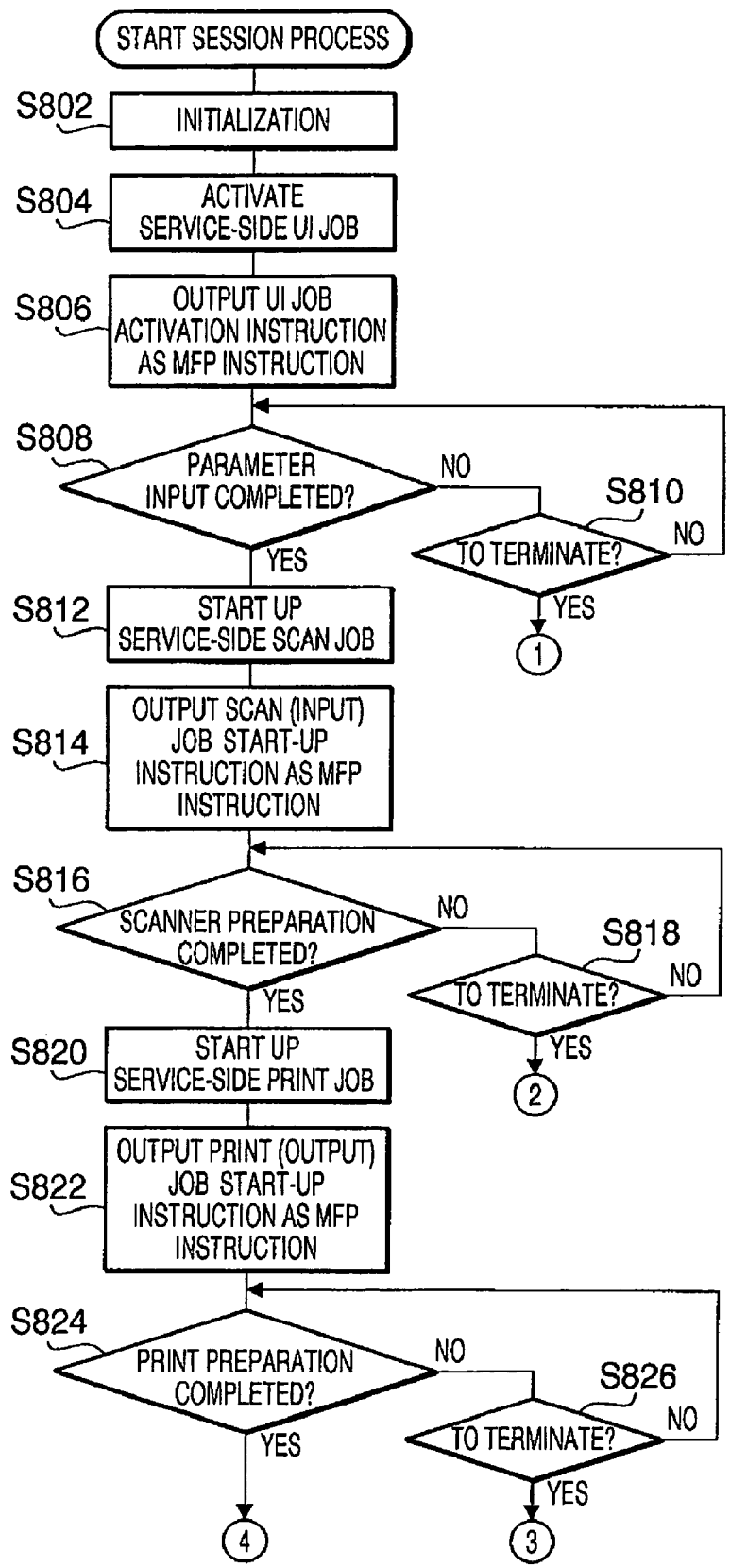
FIGS. 23 and 24 show a flowchart illustrating a session process executed by the function server in accordance with aspects of the present invention.

If it is determined that the received HTTP request is a service boot instruction (S702: YES), the process generates a session ID and transmission data representing the session ID. Further, the process secures resources necessary for performing the service, and the process corresponding to the request is booted (S708). Thereafter, the process proceeds to the next step S734. It should be noted that the process booted here is a session process (FIG. 23).

If it is determined that the request is not the service boot instruction (S702: NO), the process judges whether the HTTP request is a service completion instruction (S710).

If it is determined that the request is the service completion instruction (S710: YES), the process releases the session ID and the resources secured in S708, creates transmission data representing the completion of the service (S712), and proceeds to execute the next procedure (S734). If it is determined that the request is not the service completion instruction (S710: NO), the process judges whether service-related information, i.e., information related to a service (session or job) is included, or more specifically, whether an HTTP request transmitted by MFP 10 during execution of the session process or a job (UI job, input job, or output job) (S714).

If it is determined that the service-related information is included in the request (S714: YES), the process which has transmitted the HTTP request (session processing, UI job, input job, or output job) is identified (S716).

If the process cannot be identified (S718: NO), the control generates information for notifying of an error (i.e., error notification information), and then proceeds to S734.

If the process is identified (S718: YES), the control transfer the information transmitted by the HTTP request to the identified process (S722).

After S722 has been completed, if it is determined that the service-related information is not included (S714: NO), the storage area for information corresponding to the session ID or job ID is specified (S724).

If the storage area cannot be specified (S726: NO), the process proceeds to S720, generates the error notification information, and proceeds to S734. If the storage area has been specified (S726: YES), the process judges whether information to be returned to the MFP 10 exists in the storage area (S728).

Then, if there is no information to be returned to the MFP 10 (S728: NO), the process generates information representing "no MFP instruction" (S730) and proceeds to S734. If it is determined that information to be returned to the MFP 10 exists (S728: YES), the process generates an MFP control instruction based on the information to be returned (S732), and then the process proceeds to S734.

The process returns the information generated in S708, S712, S720, S730 and S732 to the MFP 10 as the HTTP responses (S734). Among the HTTP responses returned to the MFP 10: the transmission data generated in S708 is received by the MFP 10 in S204 of FIG. 14; the transmission data indication service completion, which is generated in S712, is received by MFP 10 in S208 of FIG. 14, which is judged in S222 and is determined "YES". Furthermore, the error notification information generated in S720 is received by the MFP 10 in S208 of FIG. 14, which information is judged and determined "NO" in S222, and then step s224 is executed. The information representing "no instruction" generated in S730 is received by the MFP 10 in 208 of FIG. 14, which information is judged and determined "YES" in S220. The MFP control instruction generated in S732 has a different content in each job, and is received by the MFP 10 executing a corresponding job.

If the service control information process (S714-S732) is performed (S736: YES), the process sets the storage address corresponding to the session ID or job ID to "transmission completed" (S738), and finishes the function server process. If the service control information process has not been executed (S736: NO), the process does not set the storage address, and finishes the function server process.

(3-2) Session Process

Figure 24:
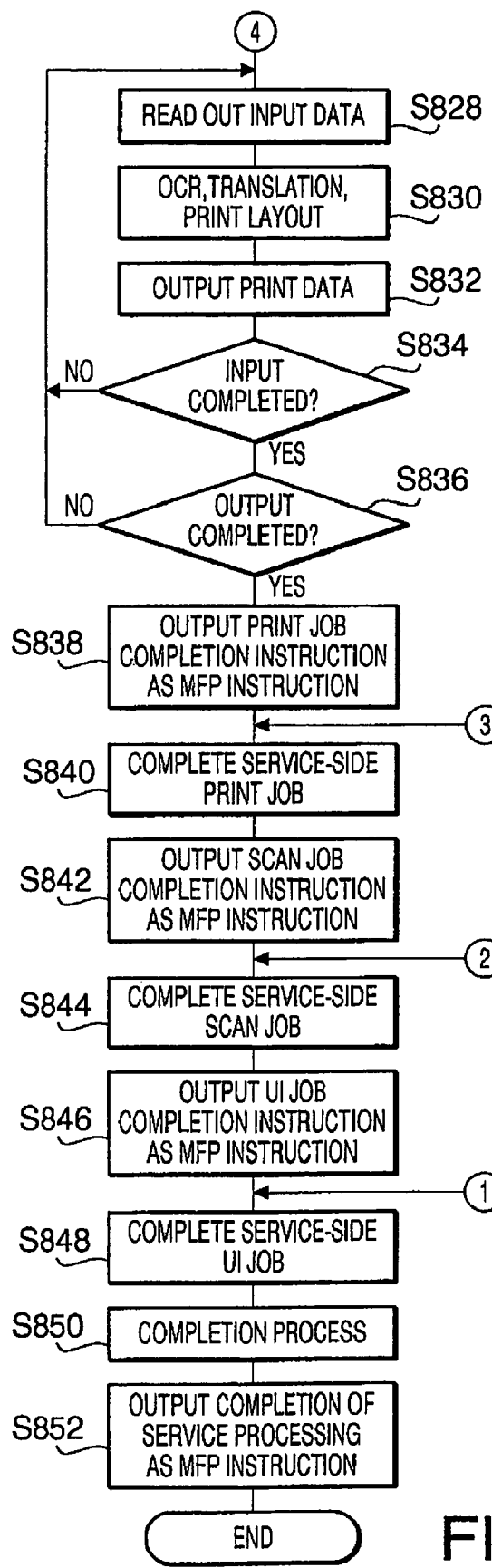

Next, the session process which is performed in parallel with the function server processing will be described referring to FIGS. 23 and 24. In the illustrative embodiment, the session processing regarding the translation copy service will be described as an example.

When the session processing is started, the process first executes initialization (S802). Then, the process starts up the service-side UI job (S804). The service-side UI job is a process performed in parallel with the session process and will be described in detail later.

Next, the process outputs the UI job start-up instruction as the MFP instruction (S806). Specifically, the process stores the UI job start-up instruction, together with the job ID and communication destination address, in the storage area for storing the return information. Then, based on the stored data, the MFP control instruction is generated in S732 of FIG. 21, which is transmitted as a start-up instruction to the MFP 10 in S734 of FIG. 22. The start-up instruction is received by the MFP 10 in S208 of FIG. 14, and based on the start-up instruction, the UI job is started up on the MFP 10 (S254 of FIG. 15).

Next, the process judges whether the parameter has been input from the MFP 10 (S808). As described later, in the UI job started up in S804, the parameter is obtained from the MFP 10, and a notification that the parameter is obtained is transmitted to the session process. Therefore, in S808, if the notification that the parameter is obtained is transmitted from the UI job, the process determines that parameter input from the MFP 10 has been completed.

If it is determined that parameter input is not completed (S808: NO), the process judges whether the UI job is terminated (S810). If acquisition of the parameter from the MFP 10 is not executed successfully the UI job is terminated and information representing the termination of the UI job is transmitted to the session process. Therefore, in S810, if such information is received (i.e., the termination of the UI job is notified), the process determines that the UI job is terminated.

If it is determined that the UI job is not terminated (S810: NO), the process returns to S808. If it is determined that the UI job is terminated (S810: YES), the process proceeds to S848.

If it is determined that the parameter input has been completed (S808: YES), a scan job, which is a type of service-end input job, is started up (S812). This scan job is a process performed in parallel with the session process, which will be described later.

Next, the process outputs the scan (input) job start-up instruction as the MFP instruction (S814). In this step, the process stores the scan job start-up instruction, together with the job ID and communication destination address, in the storage area for storing the return information. Then, based on the stored data, the MFP control instruction is generated in S732 of FIG. 22, and is transmitted as an activation instruction to the MFP 10 in S734 of FIG. 22. This start-up instruction is received by the MFP 10 in S208 of FIG. 14, and based on the received instruction, the input job is started up in the MFP 10.

Next, the process judges whether preparation of the scanner (reading unit 13) on the MFP 10 has been completed (S816). In the scan job started up in S812, notification of the completion of scanner preparation on the MFP 10 is received and notification of this is transmitted to the present session process. Therefore, in S816, if notification of the completion of scanner preparation is received from the scan job, it is determined that scanner preparation on the MFP 10 has been completed.

If it is determined in S816 that scanner preparation is not completed on the MFP 10 (S816: NO), the process judges whether the scan job is terminated (S818). In the scan job started up in S812, if notification that scanner preparation has been completed has not been received from the MFP 10 successfully, the scan job itself is terminated (completed), and the termination of the scan job is notified to the session process. Therefore, if notification of termination is received from the scan job, the process determines that the scan job has been terminated.

If it is determined that the scan job is not terminated (S818: NO), the process returns to S816. If it is determined that the scan job has been terminated (S818: YES), the process proceeds to S844.

If it is determined that the scanner preparation is completed (S816: YES), the print job, which is one type of service-side output job, is started up (S820). This print job is performed in parallel with the session process, which will be described in detail later.

Next, the print (output) job start-up instruction is output as the MFP instruction (S822). In this step, the process stores the print job start-up instruction, together with the job ID and communication destination address, in the storage area which stores return information. Based on this, the MFP control instruction is generated in S732 of FIG. 21, which is transmitted as the start-up instruction to the MFP 10 in S734 of FIG. 22. This start-up instruction is received by the MFP 10 in S208 of FIG. 14, and based on this instruction, the output job is started-up on the MFP 10 (S266 of FIG. 15).

Next, the process judges whether preparation of the printer (recording unit 14) on the MFP 10 has been completed (S824). In the print job started up in S820, a notification of completion of print preparation on the MFP 10 is received, notification of which is transmitted to the session process. Therefore, if notification of the completion of print preparation has been received from this scan job, it is determined that print preparation on the MFP 10 has been completed.

If it is determined that print preparation has not been completed on the MFP 10 (S824: NO), the process judges whether the print job is terminated (S826). In the print job started up in S820, if notification that print preparation has been completed on the MFP 10 has not been received successfully, the print job itself is terminated (completed), notification of which is transmitted to the session process. Therefore, if notification of termination has not been received from the print job, it is determined that the print job is terminated.

If it is determined that the print job has not been terminated (S826: NO), the process returns to S824. If it is determined that the scan job has been terminated (S826: YES), the process proceeds to S840.

If it is determined that print preparation has been completed (S824: YES), the input data acquired from the MFP 10 is retrieved (S828). In the scan job started up in S812, the image data read by the reading unit 13 of the MFP 10 is acquired from the MFP 10. Therefore, in S828, among data (input data) acquired and stored in the predetermined storage area, data corresponding to one page is retrieved.

Next, in S830, processed image data is generated by applying OCR processing, translation processing, print layout processing to the input data read in S828. Specifically, a text part in the image represented by the input data is recognized by applying the OCR processing on the input data retrieved in S828. Then, the text part is translated into text in a designated language by applying the translation processing to this text part. This translation processing is performed according to the parameter obtained in the UI job started up in S804, and the text part is translated into the language represented by this parameter. Then, based on the recognized and translated text part, image data for printing is generated in accordance with the designated print layout.

Next, the image data generated in S830 is output (S832). In this step, the image data generated in S830, together with the job ID and communication destination address, is stored in the storage area for storing the return information. Based on the data stored in the storage for storing the return information, the MFP control instruction is generated in S732 of FIG. 21, which is transmitted to the MFP 10 as the output data in S734 of FIG. 22. The output data is received by the MFP 10 in S520 of FIG. 20, and bases on the data, the image is output by the recording unit 14.

Subsequently, the process judges whether readout of all the input data in S828 (data area for all pages) has been completed (S824). If the readout has not been completed (S834: NO), the process returns to S828, while, if all the input data has been read out (S834: YES), the process judges whether output of the output data in S832 (storing in the storage area) has been completed (S836).

If output of the output data has not been completed (S836: NO), the process returns to S828, while, if the output has been completed (S836: YES), the print (output) job completion instruction is output as the MFP instruction (S838). In this step, processing for storing the print job completion instruction, together with the job ID, in the storage area for storing the return information is performed. Based on the stored data, the MFP control instruction is generated in S732 of FIG. 21 and is transmitted to the MFP 10 as the completion instruction in S734 of FIG. 22. This completion instruction is received by the MFP 10 in S208 of FIG. 14, and based on the instruction, the output job of the MFP 10 is terminated (completed) (S218 of FIG. 14).

After print job completion instruction has been output or it is determined that the print job has been terminated (S826: YES), the service-side print job started up in s820 is finished (S840).

Next, the scan (input) job completion instruction is output as the MFP instruction (S842). In this step, the process stores the scan job completion instruction, together with the job ID, in the storage area for storing the return information. Based on the stored data, the MFP control instruction is generated in S732, which is transmitted to the MFP 10 as the completion instruction in S734. This completion instruction is received by the MFP 10 in S208 of FIG. 14, and based on the instruction, the input job is terminated (completed) on the MFP 10 (S218 of FIG. 14).

When the scan job completion instruction is output, or it is determined that the scan job has been terminated (S818: YES), the service-side scan job started up in S812 is finished (S844).

Next, the UI job completion instruction is output as the MFP instruction (S846). In this step, the process stores the scan job completion instruction, together with the job ID, in the storage area for storing the return information. Based on the stored data, the MFP control instruction is generated in S732 of FIG. 21, which is transmitted to the MFP 10 as the completion instruction in S734 of FIG. 22. This completion instruction is received by the MFP 10 in S208 of FIG. 14, and based on the instruction, the UI job is terminated (completed) on the MFP 10 (S218 of FIG. 14).

In S850, a completion process such as releasing of resources secured in each job has been performed. Then, the service completion instruction has been output as the MFP instruction (S852), and the session process is completed.

In S848, the process stores the service completion instruction in the storage area for storing the return information. Based on the instruction, the MFP control instruction is generated in S732 of FIG. 21, which is transmitted to the MFP 10 as the completion instruction in S734 of FIG. 22. This completion instruction is received by the MFP 10 in S208 of FIG. 14, and based on the instruction, the session process on the MFP 10 is finished (S222 of FIG. 14).

(3-3) UI Job

Figure 25:
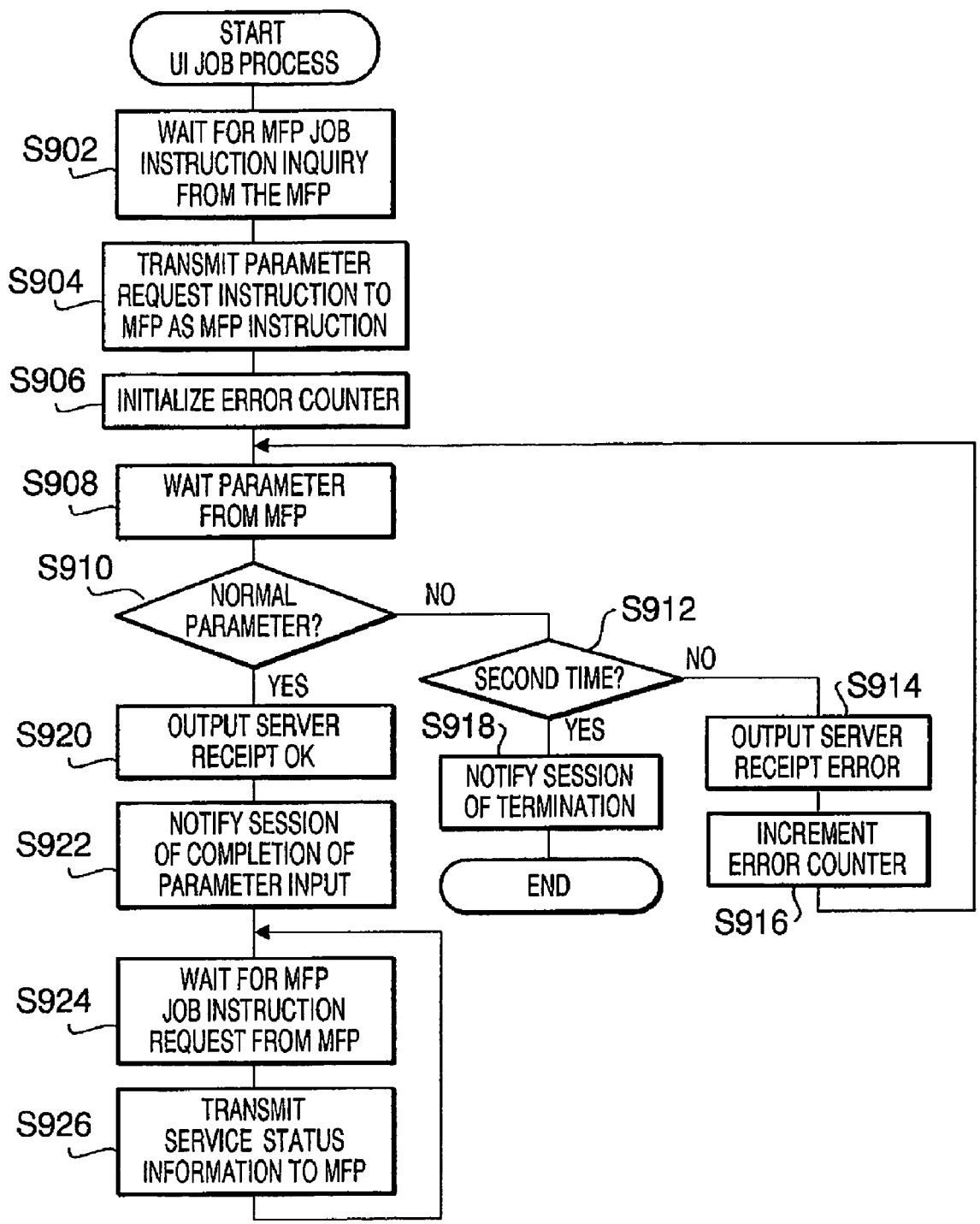
FIG. 25 shows a flowchart illustrating a UI job process executed by the function server in accordance with aspects of the present invention.

Next, UI job processing which is started up in S804 of FIG. 23 will be described referring to FIG. 25.

When the UI job is started, the process waits until the MFP job instruction inquiry is received from the MFP 10. When received the MFP job instruction inquiry (S902), the process returns a parameter request instruction that requests for parameter settings necessary for performing the service to the MFP 10 as the MFP instruction (S904). The MFP job instruction inquiry received in S902 is the HTTP request transmitted by the MFP 10 in S321 of FIG. 16. The MFP instruction transmitted in S904 is the HTTP response received by the MFP 10 in S323 of FIG. 16. Specifically, to the HTTP response, the service I/F information 36 (e.g., information corresponding to the translation copy service) has been added. When received the MFP instruction, the MFP 10 transmits the parameter in S321 of FIG. 16.

Next, an error count is initialized (S906). That is, a counter for counting the consecutive number of occurrences when the parameters cannot be received successfully is reset (i.e., set to "0").

Next, the process waits until the parameters are received from the MFP 10 that received the MFP instruction transmitted in S904. When received the parameters (S908), the process judges whether the parameters have been received successfully (S910).

If it is determined that the parameter has not been received successfully (S910: NO), the process judges whether such a situation has occurred consecutively by a predetermined number of times (twice in this illustrative embodiment) based on the value of the error counter (S912). If it has not occurred consecutively by the predetermined number of times (S912: NO), the process outputs the server receipt status for notifying that the parameter has not been received successfully (server reception NG; abnormal reception) in S914, and counts up the error counter (S926). Then, the process returns to S908.

In S914, the process stores the server receipt status in the storage area for storing the return information. Based on the server receipt status, the MFP control instruction is generated in S732 of FIG. 21, and transmitted as the server receipt status to the MFP 10 in S734 of FIG. 22. This server receipt status is received by the MFP 10 in S323 of FIG. 16, and based on the received information, the MFP 10 re-transmits the parameters (S341, S343, etc. in FIG. 16).

If a condition where the parameter cannot be received successfully occurs consecutively by a predetermined number of times (S910: YES), the process notifies the session process of termination (completion) of the UI job (S918), and terminates the UI job. The notification in S918 is received by the session process in S810 of FIG. 23.

If it is determined that the parameter has been received successfully (S910: YES), the process outputs the server receipt status for notifying that the parameter has been received successfully (server reception OK; Normal reception) (S920). In this step, the process stores the server receipt status in the storage area for storing the return information.

Based on the stored information, the MFP control instruction is generated in S732 of FIG. 21, which is transmitted to the MFP 10 as the server receipt status in S734 of FIG. 22. This server receipt status is received by the MFP 10 in S323 of FIG. 16. Based on the thus received server receipt status, it is verified in the MFP 10 that the parameter need not be retransmitted (S341, S343, etc. in FIG. 16).

Next, the process notifies the session process of the completion of parameter input (parameter acquisition) (S922). This notification is received by the session process in S808 of FIG. 23.

When S922 is completed, the process waits until the MFP job instruction inquiry is received from the MFP 10. When the MFP job instruction inquiry is received (S924), the process output the service status information (S926) repeatedly until the UI job is terminated (completed) by another process (e.g., S844 of FIG. 24). In S926, the process stores the service status information in the storage for storing the return information. Based on the stored information, the MFP control instruction is generated in S732 of FIG. 21, which is transmitted to the MFP 10 in S734 of FIG. 22 as the service status information.

(3-4) Scan Job

Next, a scan job process which is started in S812 of FIG. 23 will be described referring to FIG. 26.

When the scan job is started, the process waits until the MFP status information is received from the MFP 10. When the MFP status information is received (S1002), the error counter is initialized (S1004) as in S906 of FIG. 25, and the MFP parameter is output (S1006). The MFP status information received in S1002 is the HTTP request transmitted from the MFP 10 in S408 of FIG. 19. In response to the MFP status information, the process returns the MFP parameters as the HTTP response in S1006. The MFP parameter has been received in S908 of FIG. 25, and is a parameter corresponding to the MFP 10, which is the transmission source of the MFP status information received in S1002.

From the MFP 10 that received the MFP parameter, the MFP reception status indicating whether the MFP parameter was received successfully is transmitted from the MFP 10. Therefore, based on the MFP reception status, the process judges whether MFP parameter has been received successfully (S1008). Specifically, if the MFP reception status indicates the abnormal reception (NG), the process determines that the reception was failed, and if the normal reception (OK) is indicated, the process determines that reception has been performed successfully.

If it is determined that the MFP parameter has not been received successfully by the MFP 10 (S1008: NO), the process judges whether such a situation has occurred consecutively by a predetermined number of occurrence (twice in this illustrative embodiment) is checked, referring to the value of the error counter (S1010). If such a situation has not occurred consecutively by the predetermined number of times (S1010: NO), the process increments the error counter (S1012), and returns to S1006.

If the state where the parameter has not been received successfully occurs consecutively by the predetermined number of times (S1010: YES), the process notifies the session process of the termination (completion) of the scan job (S1014), and outputs the notification instruction for notifying of the abnormal completion as the service status information (S1016). This notification in S1014 is received by the session processing in S818 of FIG. 23. In S1016, the process stores the notification instruction in the storage area for storing the return information. Based on the thus stored information, the MFP control instruction is generated in S732 of FIG. 21, which is transmitted to the MFP 10 as the notification instruction in S734 of FIG. 22. The notification instruction is received by the MFP 10 in S410 of FIG. 19.

If it is determined that the MFP parameter has been received successfully by the MFP 10 (S1008: YES), it is determined that scanner (reading unit 13) preparation has been completed in the MFP 10, and the process notifies the session process of the completion of the scanner preparation (S1018). The notification is received by the session process in S816 of FIG. 23.

Next, the process outputs an input data request requesting for the transmission of data to be processed by the function server 30. That is, the process stores the input data request in the storage area for storing the return information (S1020). Based on the stored data, the MFP control instruction is generated in S732 of FIG. 21, which is transmitted to the MFP 10 as the input data request in S734 of FIG. 22. The input data request is received by the MFP 10 in S420 of FIG. 19, and then, the user operates the MFP 10 and the input data is transmitted from the MFP 10.

When the input data is received from the MFP 10, which received the input data request, is received (S1022), if reception of the input data is completed normally (S1024: YES), a notification instruction for notifying of normal completion is output as the service status information (S1026), and then, the scan job is completed. In S1026, the process stores the notification instruction in the storage area for storing the return information. Based on the stored information, the MFP control instruction is generated in S732 of FIG. 21, which is transmitted as the notification instruction to the MFP 10 in S734 of FIG. 22. The notification instruction is received by the MFP 10 in S432 of FIG. 19.

If reception of the input data has not been completed normally (S1024: NO), the process proceeds to S1016, outputs the notification instruction for notifying of the abnormal completion as the service status information, and completes the scan job. The notification instruction is received by the MFP 10 in S423 of FIG. 19.

(3-5) Print Job

Figure 27:
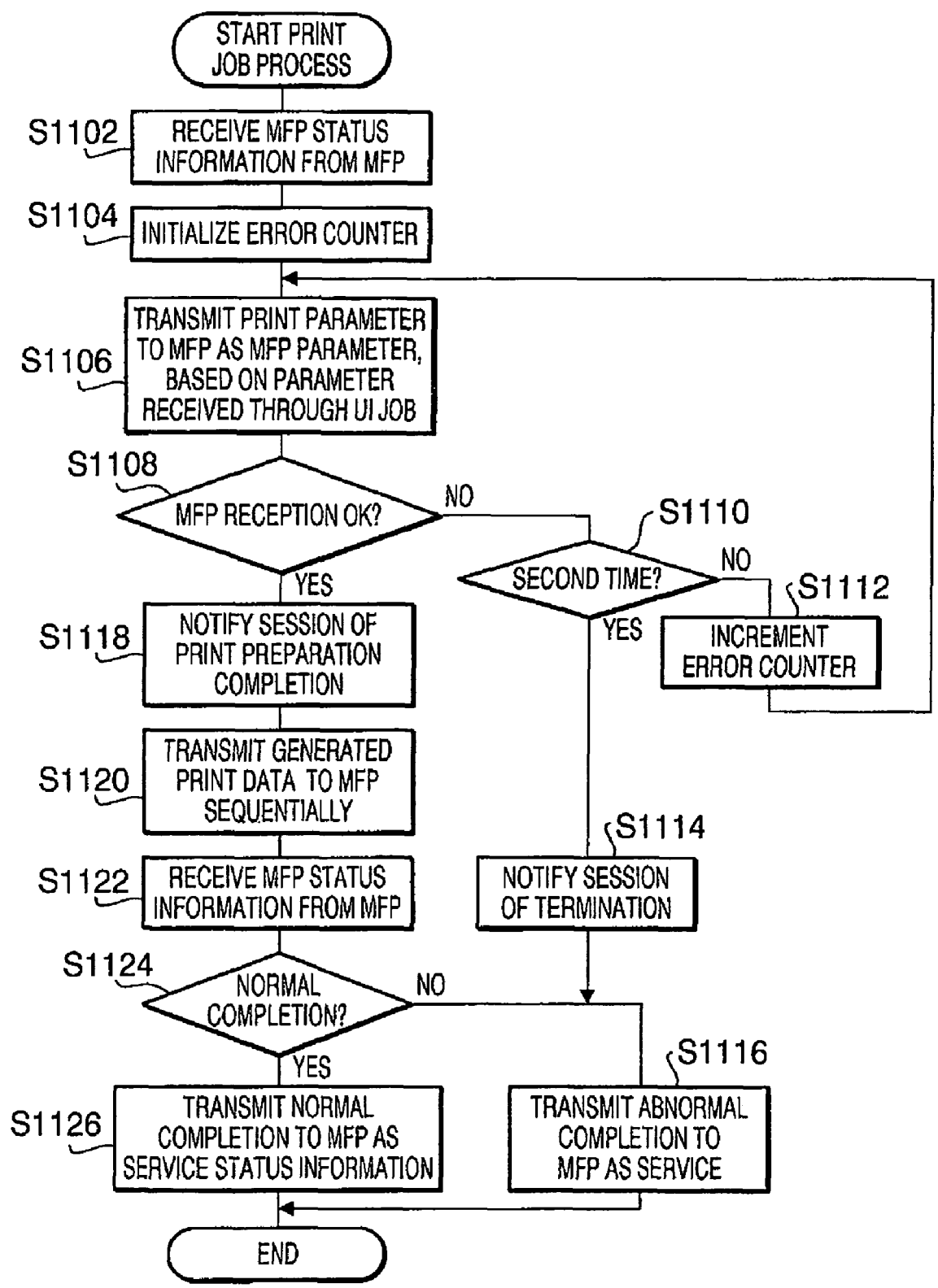
FIG. 27 shows a flowchart illustrating a print job process executed by the function server in accordance with aspects of the present invention.

Next, the print job processing which is started in S820 of FIG. 23 will be described referring to FIG. 27.

When print job is started, the process waits until the MFP status information is received from the MFP 10. When the MFP status information is received (S1102), the error counter is initialized (S1104) as in S906 of FIG. 25, and then, the MFP parameter is output (S1106). The MFP status information received in S1102 is the HTTP request transmitted from the MFP 10 in S508 of FIG. 20, and the MFP parameter is returned in response to the HTTP request, as the HTTP response, in S1106. The MFP parameter is received in S908 of FIG. 25, and is a parameter corresponding to the MFP 10 which is the transmission source of the MFP status information received in S1102.

Figure 26:
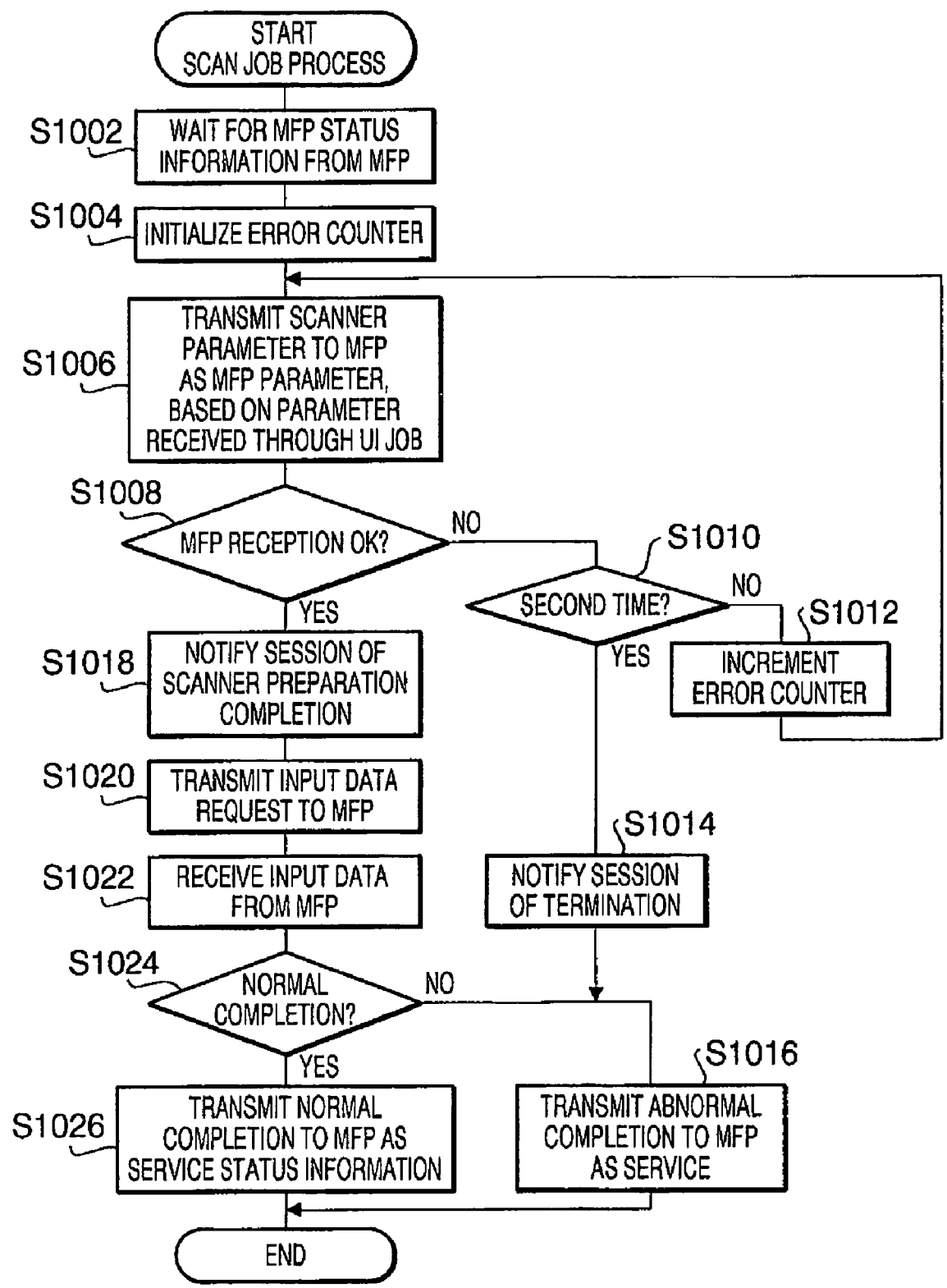
FIG. 26 shows a flowchart illustrating a scan job process executed by the function server in accordance with aspects of the present invention.

Since the MFP reception status indicating whether the MFP parameter was received successfully is transmitted from the MFP 10 which received the MFP parameter, the process judges whether the MFP parameter has been received successfully by the MFP 10 (S1108) in accordance with the MFP reception status, as in S1008 of FIG. 26.

If it is determined that the MFP parameter has not been received successfully by the MFP 10 (S1108: NO), the process judges whether such a situation has occurred consecutively by a predetermined number of times (twice in the illustrative embodiment) based on the value of the error counter (S1110). If such a situation is occurred consecutively by the predetermined number of times (S1110: NO), the process increments the error counter (S1112) and returns to S1106.

If a state where the parameter cannot be received successfully occurs consecutively by the predetermined number of times (S1110: YES), termination (completion) of the print job is notified to the session process (S1114), and then, a notification instruction notifying of an abnormal completion is output as the service status information (S1116). This notification in S1114 is received by the session processing in S826 of FIG. 23. Further, in S1116, the notification instruction is stored in the storage area for storing the return information. Based on the stored information, the MFP control instruction is generated in S732 of FIG. 21, which is transmitted to the MFP 10 as the notification instruction in S734 of FIG. 22. This notification instruction is received by the MFP 10 in S510 of FIG. 20.

If it is determined that the MFP parameter has been received successfully by the MFP 10 (S1108: YES), the process determines that preparation for printing (by the recording unit 14) has been completed in the MFP 10 upon receipt of the MFP parameter, and completion of print preparation is notified to the session process (S1118). This notification is received by the session process in S824 of FIG. 23. In the session process, in response to receipt of this notification, steps S828 through S836 of FIG. 24 are performed and print data is transmitted.

Next, the process converts the print data generated in the session process (S832 of FIG. 24) in to print data that can be processed by the MFP 10, and stores the converted to data in the storage area for storing the transmission information (S1120). Based on the thus stored information, the MFP control instruction is created in S732 of FIG. 21, which is transmitted to the MFP 10 as the notification instruction in S734 of FIG. 22. The notification information is received by the MFP 10 in S520 of FIG. 20.

Figure 20:
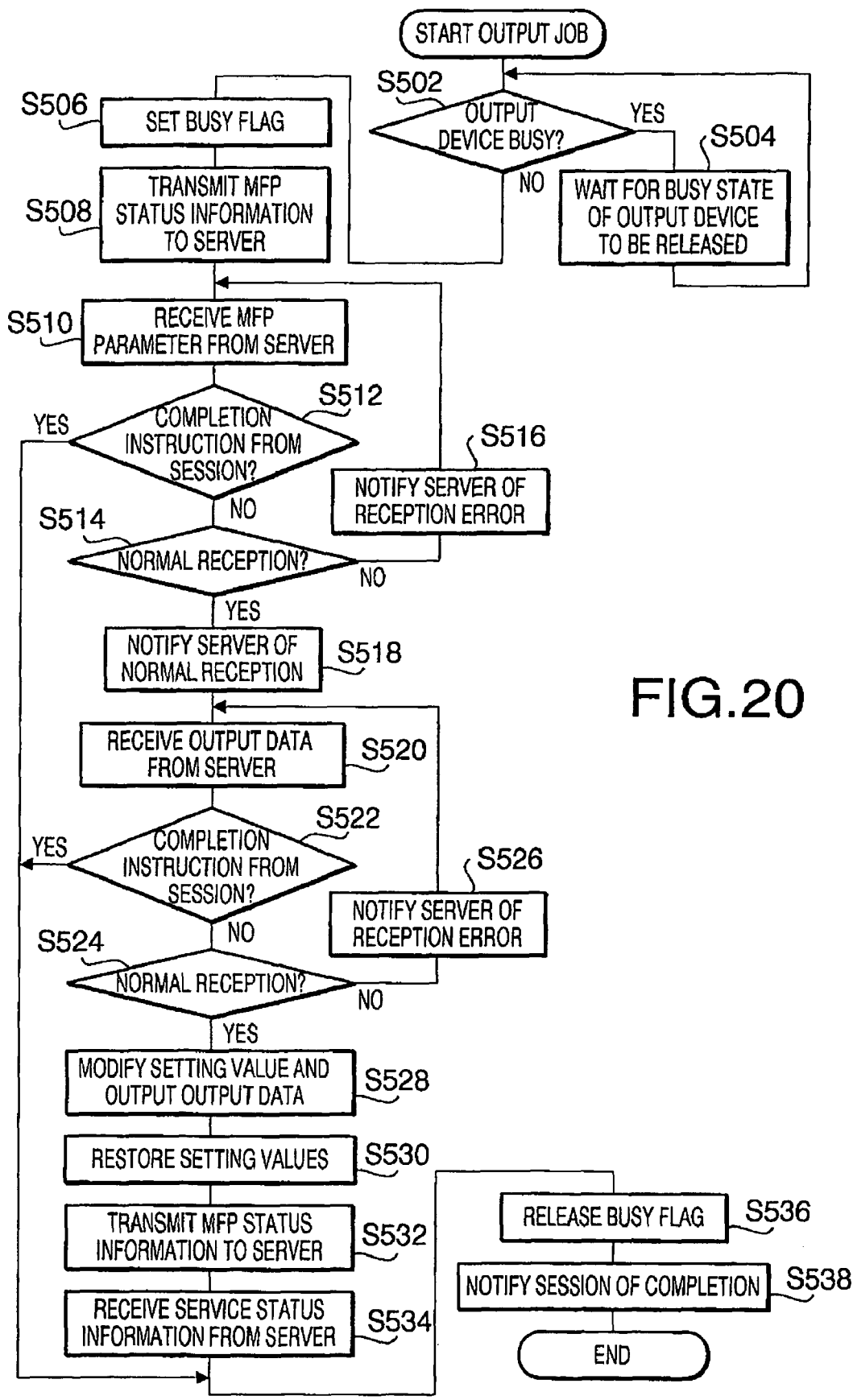
FIG. 20 is a flowchart illustrating an output job process executed by the MFP in accordance with aspects of the present invention.

The MFP 10, which received the print data, transmits the MFP status information as the HTTP request (S532 of FIG. 20).

When the MFP status information is received from the MFP 10 that received the print data (S1122), if the MFP status information has been received successfully (S1124: YES), the process outputs the notification instruction for notifying of the normal completion as the service status information (S1126), and finishes the print job. In S1126, the notification information is stored in the storage area for storing the return information. Based on the stored information, the MFP control instruction is generated in S732 of FIG. 21, which is transmitted to the MFP 10 as the notification instruction. The notification instruction is received by the MFP 10 in S534 of FIG. 20.

If the reception of MFP status information has not been completed successfully (S1124: NO), the process proceeds to S1116, where the process outputs the notification instruction for notifying of the abnormal completion as the service status information, and then completes the print job. This notification instruction is received by the MFP 10 in S534 of FIG. 20.

In the service providing system configured as above, the MFP 10 receives a service from the function server 30 and operates to realize the provided function. Before the service is provided from the function server 30 to the MFP 10, the service definition information 25, which serves as a menu for allowing a user to determine a service to be used, is downloaded from the directory server 20 to the MFP 10. When the downloading is performed, the type information of the MFP 10 is transmitted to the directory server 20 (see S113 of FIG. 9), and the directory server 20 transmits appropriate service definition information 25 which meets the type and function of the MFP 10 in accordance with the received type information (see S75, S77 of FIG. 7). With this configuration, the MFP 10 can output a menu which fully supports the function/characteristics of the MFP 10. For example, if the MFP 10 has a display capable of only three lines of characters/letters, the directory server 20 transmits the service definition information 25 (i.e., a menu) for three-line display. If the display of the MFP 10 has ten lines of displaying area, the service definition information 25 for ten-line display may be transmitted from the directory server 20 to the MFP 10.

According to the illustrative embodiment, the service definition information 25 is configured to include not only the Title items representing displayed titles and Link_Title items representing display titles of links, but also Description items representing detailed explanation information of the displayed titles and Link_Description items representing the detailed explanation of the displayed titles of the links are contained in one file (see FIGS. 3 and 4). In the MFP 10, among the above items, the Title items and Link_Title items must be displayed on the display 52 when the user uses the corresponding services, while the Description items and Link_Description items are displayed only when the user depresses one of the detailed explanation keys (i.e., the display key 53, print key 54, sound key 55, sound+display key 56, sound+print key 57 and recommendation key 58) (see S123, S124 of FIG. 9).

Because of the above configuration, when the user understands the contents of the menu, information unnecessary for the user will not be output, which allows the user to operate swiftly. On the other hand, when the user wishes detailed explanations of the menu items, the user can obtain the detailed explanation of each menu item simply by depressing a detailed explanation key. According to the illustrative embodiment, the MFP 10 obtains not only the detailed explanation information on the Title items and Link_Title items, but also that information on the Description items and Link_Description items in one session of communication, when the detailed explanation is displayed, the MFP 10 need not perform a communication procedure with the directory server. That is, the MFP 10 can output the detailed explanation on each item at high response.

When the user depresses the sound+display key 56 or the sound+print key 56 or sound+print key 57, the detailed explanation is output by means of the sound output and display output, or sound output and print output (see FIGS. 29 through 32). Further, the outputs above can be performed at predetermined timings.

Therefore, according to the illustrative embodiment, the detail explanation can be provided to the user in various ways. Further, it is possible to have the user understand general configuration of the menu, and next, have the user understand respective functions. Optionally or alternatively, it is possible to provide the output (e.g., printed material) first, and then provide the explanation of the output with a voice message. Thus, according to the illustrative embodiment, the user can easily understand each service in detail.

Further, according to the illustrative embodiment, when the user does not know which output method is appropriate to obtain the detailed explanation, by operating the recommendation key 58, the detailed explanation can be output using an output method, which a designer of the service definition information 25 think appropriate. Therefore, the system is very operable for the user.

The present invention need not be limited to the above-described illustrative embodiment, but various modifications can be made without departing from aspects of the invention.

For example, in the above-described illustrative embodiment, the MFP 10 is used as the terminal device of the network system. However, the terminal device may be any device if it can receive the service provided by the function server 30 and realize it. Examples of such a device may be a printer, a scanner and a facsimile device.

In the service providing system according to the illustrative embodiment is described to include only one MFP 10, one directory server 20 and one function server 30. This configuration is for simplifying the description, and the service providing system according to the present invention may have various configurations including that of the above-described illustrative embodiment. For example, in the service providing system according to aspects of the present invention may include more than one MFP 10. That is, such a system may be configured such that each of the MFP's 10 may receive the service definition information 25 from a common directory server 20, and requests a common function server 30 for a service.

According to aspects of the invention, the directory server 20 (or part of the directory server 20) and/or the function server 30 (or a part of the function server 30) may be integrated as a single device.

Alternatively, according to aspects of the invention, the directory server 20 (or part of the directory server 20) and/or the function server 30 (or part of the function server 30) may be included in the MFP 10.

The service providing system according to the illustrative embodiment is configured such that only the service definition information 25 includes the detailed explanation information. This may be modified such that the service I/F information 36 also include detailed explanation information similar to the service definition information 25. Such a modification can answer questions the user may have when inputting concrete parameters for the service with providing the above-described advantages regarding the service definition information.

What is claimed is:
1. A network system, comprising:
a directory server configured to provide service definition information explaining a function of a service provided through a network, the service definition information including in a single file both main information, output when a service is used, and a plurality of pieces of auxiliary information, each piece of auxiliary information includes outputting unit designation information designating an outputting unit suitable for outputting the piece of auxiliary information;
and a multi-function terminal device configured to receive, for use, the service definition information provided by the directory server, the multi-function terminal device being provided with a plurality of outputting units of different types corresponding respectively to the plurality of pieces of auxiliary information,
the directory server including:
a server communication unit configured to communicate with the multi-function terminal device;
a service definition information storing unit configured to relate the main information to the plurality of pieces of the auxiliary information and store the main information and the plurality of pieces of the auxiliary information as the service definition information; and
a service definition information transmission control unit retrieving the service definition information from the service definition information storing unit and transmit- ting the retrieved service definition information to the multi-function terminal device through the server communication unit, and the multi-function terminal device including:

a terminal communication unit configured to communicate with the directory server;

the plurality of outputting units configured to perform an output operation in accordance with information;

an instruction receiving unit configured to receive an instruction input by a user; and an output control unit configured such that, (a) when the output control unit receives the service definition information from the directory server through the terminal communication unit, the output control unit controls a predetermined outputting unit of the plurality of outputting units of different types to output the main information contained in the received service definition information, and (b) when the instruction receiving unit receives a specific instruction by the user after the output control unit has received the service definition information, the output control unit selects a specific outputting unit from among the plurality of outputting units of different types on the basis of the specific instruction, and further selects a specific piece of auxiliary information from among the plurality of pieces of auxiliary information with reference to the plurality of pieces of outputting unit designating information included in the plurality of pieces of auxiliary information, the selected specific piece of auxiliary information including the outputting unit designating information designating the selected specific outputting unit, in order to cause the selected specific outputting unit to output the selected specific piece of auxiliary information contained in the received service definition information.

2. The network system according to claim 1, wherein the plurality of pieces of auxiliary information include explanation information corresponding to the main information.

3. The network system according to claim 1, wherein the output control unit of the multi-function terminal device controls the plurality of outputting units respectively corresponding to the plurality of pieces of the auxiliary information to output the respective auxiliary information in parallel at predetermined timings, respectively.

4. The network system according to claim 1, wherein the output control unit of the multi-function terminal device controls the plurality of outputting units to output the plurality of pieces of the auxiliary information one after another at predetermined timings.

5. The network system according to claim 1, wherein the output control unit controls the designated outputting unit, in accordance with the outputting unit designating information, to output the auxiliary information if the instruction receiving unit receives a predetermined input instruction.

6. The network system according to claim 1, wherein the plurality of outputting units includes at least one of a displaying unit configured to display an image, a sound output unit configured to output sound, and a printing unit configured to print an image on a recording medium.

7. The network system according to claim 1, wherein the directory server includes an inquiry unit configured to inquire a type from the multi-function terminal device via the server communication unit, wherein the service definition information stored in the service definition information storing unit includes the main information and the auxiliary information, wherein the main information and the auxiliary information correspond to the type of the multi-function terminal device and can be output by the outputting units of the multi-function terminal device, wherein the service definition information transmission control unit retrieves the service definition information corresponding to the type of the multi-function terminal device obtained by the inquiry unit from the service definition information storing unit, and wherein the multi-function terminal device further includes a type replaying unit, the type replaying unit transmits the type of the multi-function terminal device inquired by the directory server via the terminal communication unit to the directory server via the terminal communicating unit.

8. A multi-function terminal device configured to receive service definition information explaining a function of a service to be used from a directory server through a network, the service definition information including in a single file both main information, output when a service is used, and a plurality of pieces of auxiliary information, each piece of auxiliary information includes outputting unit designation information designating an outputting unit suitable for outputting the piece of auxiliary information;

and the multi-function terminal device configured to receive, for use, the service definition information provided by the directory server, the multi-function terminal device comprising:

a terminal communication unit configured to communicate with the directory server;

a plurality of outputting units of different types corresponding respectively to the plurality of pieces of auxiliary information, each outputting unit configured to output information;

an instruction receiving unit configured to receive an instruction input by a user; and an output control unit configured such that, (a) when the output control unit receives the service definition information from the directory server through the terminal communication unit, the output control unit controls a predetermined outputting unit of the plurality of outputting units of different types to output the main information contained in the received service definition information, and (b) when the instruction receiving unit receives a specific instruction by the user after the output control unit has received the service definition information, the output control unit selects a specific outputting unit from among the plurality of outputting units of different types on the basis of the specific instruction, and further selects a specific piece of auxiliary information from among the plurality of pieces of auxiliary information with reference to the plurality of pieces of outputting unit designating information included in the plurality of pieces of auxiliary information, the selected specific piece of auxiliary information including the outputting unit designating information designating the selected specific outputting unit, in order to cause the selected specific outputting unit to output the selected specific piece of auxiliary information contained in the received service definition information.

9. A non-transitory computer readable medium having a program stored thereon, said program comprising computer readable instructions causing a computer to function as a multi-function terminal device configured to receive service definition information explaining a function of a service to be used from a directory server through a network, the service definition information including in a single file both main information, output when a service is used, and a plurality of pieces of auxiliary information, each piece of auxiliary information includes outputting unit designation information designating an outputting unit suitable for outputting the piece of auxiliary information, wherein the computer, when functioning as the multi-function terminal device, comprises:

a terminal communication unit configured to communicate with the directory server;

a plurality of outputting units of different types corresponding respectively to the plurality of pieces of auxiliary information, each outputting unit configured to output information;

an instruction receiving unit configured to receive an instruction input by a user; and an output control unit configured such that, (a) when the output control unit receives the service definition information from the directory server through the terminal communication unit, the output control unit controls a predetermined outputting unit of the plurality of outputting units of different types to output the main information contained in the received service definition information, and (b) when the instruction receiving unit receives a specific instruction by the user after the output control unit has received the service definition information, the output control unit selects a specific outputting unit from among the plurality of outputting units of different types on the basis of the specific instruction, and further selects a specific piece of auxiliary information from among the plurality of pieces of auxiliary information with reference to the plurality of pieces of outputting unit designating information included in the plurality of pieces of auxiliary information, the selected specific piece of auxiliary information including the outputting unit designating information designating the selected specific outputting unit, in order to cause the selected specific outputting unit to output the selected specific piece of auxiliary information contained in the received service definition information.

10. A multi-function terminal device configured to receive service definition information explaining a function of a service to be used from a directory server through a network, the service definition information including in a single file both main information, output when a service is used, and a plurality of pieces of auxiliary information, each piece of auxiliary information includes output means designation information designating an output means suitable for outputting the piece of auxiliary information, the multi-function terminal device comprising:

terminal communicating means for communicating with said directory server;

output means for performing an output operation in accordance with information;

input means for receiving a predetermined instruction input by a user; and an output control unit configured such that, (a) when the output control unit receives the service definition information from the directory server through the terminal communication unit, the output control unit controls a predetermined output means of a plurality of output means of different types to output the main information contained in the received service definition information, and (b) when the input means receives a specific instruction by the user after the output control unit has received the service definition information, the output control unit selects a specific output means from among the plurality of output means of different types on the basis of the specific instruction, and further selects a specific piece of auxiliary information from among the plurality of pieces of auxiliary information with reference to the plurality of pieces of output means designating information included in the plurality of pieces of auxiliary information, the selected specific piece of auxiliary information including the output means designating information designating the selected specific output means, in order to cause the selected specific output means to output the selected specific piece of auxiliary information contained in the received service definition information.

* * * * *